(12) United States Patent
Gross, IV et al.

(10) Patent No.: US 8,825,900 B1
(45) Date of Patent: Sep. 2, 2014

(54) METHOD AND APPARATUS FOR STATELESS TRANSPORT LAYER TUNNELING

(75) Inventors: Jesse E. Gross, IV, San Francisco, CA (US); W. Andrew Lambeth, San Mateo, CA (US)

(73) Assignee: Nicira, Inc., Palo Alto, CA (US)

( * ) Notice: Subject to any disclaimer, the term of this patent is extended or adjusted under 35 U.S.C. 154(b) by 404 days.

(21) Appl. No.: 13/181,492

(22) Filed: Jul. 12, 2011

Related U.S. Application Data

(60) Provisional application No. 61/471,897, filed on Apr. 5, 2011, provisional application No. 61/479,680, filed on Apr. 27, 2011, provisional application No. 61/501,433, filed on Jun. 27, 2011.

(51) Int. Cl.
*G06F 15/173* (2006.01)
*H04L 12/56* (2006.01)
*H04L 12/46* (2006.01)

(52) U.S. Cl.
CPC ............ *H04L 47/31* (2013.01); *H04L 12/4645* (2013.01)
USPC .......................................................... 709/238

(58) Field of Classification Search
CPC ............................ H04L 47/31; H04L 12/4645
USPC ........... 709/249, 251, 252, 253, 238; 370/389
See application file for complete search history.

(56) References Cited

U.S. PATENT DOCUMENTS

| | | | |
|---|---|---|---|
| 6,006,275 A * | 12/1999 | Picazo et al. ................ | 709/249 |
| 6,697,338 B1 | 2/2004 | Breitbart et al. | |
| 6,912,221 B1 | 6/2005 | Zadikian et al. | |
| 6,963,585 B1 | 11/2005 | Le Pennec et al. | |
| 7,042,912 B2 | 5/2006 | Ashwood Smith et al. | |
| 7,054,308 B1 | 5/2006 | Conway | |
| 7,283,473 B2 | 10/2007 | Arndt et al. | |
| 7,342,916 B2 | 3/2008 | Das et al. | |
| 7,359,971 B2 | 4/2008 | Jorgensen | |
| 7,752,301 B1 | 7/2010 | Maiocco et al. | |
| 7,792,987 B1 | 9/2010 | Vohra et al. | |
| 7,948,986 B1 | 5/2011 | Ghosh et al. | |

(Continued)

FOREIGN PATENT DOCUMENTS

WO    WO 2010/041996    4/2010

OTHER PUBLICATIONS

Bhatia, Sapan, et al., "Trellis: A Platform for Building Flexible, Fast Virtual Networks on Commodity Hardware," Roads'08, Dec. 9, 2008, pp. 1-6, Madrid, Spain, ACM.

(Continued)

*Primary Examiner* — Adnan Mirza
(74) *Attorney, Agent, or Firm* — Adeli LLP

(57) ABSTRACT

Some embodiments of the invention provide a method of tunneling a data packet by encapsulating the data packet with a protocol header and specifying information in the fields of the header in a manner that a network switch can offload processing tasks to its network interface controller. The switch on a transmit side sends the processed data packet through the tunnel to another switch on a receive side. The two sides represent the two ends of the tunnel established between the two switches. Each of the transmit and received side switches is controlled by a switch controller, which in some embodiments is implemented as software. The switch controllers and network interface controllers together process the data packet which is being transferred through the tunnel between the switches.

26 Claims, 24 Drawing Sheets

(56) References Cited

U.S. PATENT DOCUMENTS

| | | |
|---|---|---|
| 7,970,917 B2 | 6/2011 | Nakano et al. |
| 8,060,875 B1 | 11/2011 | Lambeth |
| 8,089,871 B2 | 1/2012 | Iloglu et al. |
| 8,161,152 B2 | 4/2012 | Ogielski et al. |
| 8,199,750 B1 * | 6/2012 | Schultz et al. ............ 370/389 |
| 8,339,959 B1 | 12/2012 | Moisand et al. |
| 8,611,351 B2 | 12/2013 | Gooch et al. |
| 8,625,616 B2 | 1/2014 | Vobbilisetty et al. |
| 8,650,618 B2 | 2/2014 | Asati et al. |
| 2003/0058850 A1 | 3/2003 | Rangarajan et al. |
| 2005/0027881 A1 | 2/2005 | Figueira et al. |
| 2005/0053079 A1 | 3/2005 | Havala |
| 2006/0206655 A1 | 9/2006 | Chappell et al. |
| 2008/0049621 A1 | 2/2008 | McGuire et al. |
| 2008/0225853 A1 | 9/2008 | Melman et al. |
| 2008/0291910 A1 | 11/2008 | Tadimeti et al. |
| 2009/0279536 A1 | 11/2009 | Unbehagen et al. |
| 2009/0292858 A1 | 11/2009 | Lambeth et al. |
| 2010/0131636 A1 | 5/2010 | Suri et al. |
| 2010/0214949 A1 | 8/2010 | Smith et al. |
| 2011/0085557 A1 | 4/2011 | Gnanasekaran et al. |
| 2011/0085559 A1 | 4/2011 | Chung et al. |
| 2011/0134931 A1 | 6/2011 | Merwe et al. |
| 2011/0310899 A1 | 12/2011 | Alkhatib et al. |

OTHER PUBLICATIONS

Caesar, Matthew, et al., "Design and Implementation of a Routing Control Platform," NSDI '05: 2nd Symposium on Networked Systems Design & Implementation, Apr. 2005, pp. 15-28, Usenix Association.

Farinacci, D., et al., "Generic Routing Encapsulation (GRE)," Mar. 2000, pp. 1-9, The Internet Society (RFC 2784).

Touch, J., et al., "Transparent Interconnection of Lots of Links (TRILL): Problem and Applicability Statement," May 2009, pp. 1-17, IETF Trust, RFC 5556.

Luo, Jianying, et al., "Prototyping Fast, Simple, Secure Switches for Ethane," Month Unknown 2007, 6 pages, USA.

Shenker, Scott, et al., "The Future of Networking, and the Past of Protocols," Dec. 2, 2011, 30 pages, USA.

* cited by examiner

US 8,825,900 B1

METHOD AND APPARATUS FOR STATELESS TRANSPORT LAYER TUNNELING

CLAIM OF BENEFIT TO PRIOR APPLICATIONS

This application claims benefit to U.S. Provisional Patent Application 61/471,897, filed on Apr. 5, 2011; U.S. Provisional Patent Application 61/479,680, filed on Apr. 27, 2011; and U.S. Provisional Patent Application 61/501,433, filed on Jun. 27, 2011. All of the above provisional applications are incorporated herein by reference.

BACKGROUND

As known in the art, tunneling is encapsulating messages formatted in one communication protocol (i.e., messages having headers of one protocol) with headers of another communication protocol. The messages are encapsulated at one end of a communication link that uses the latter protocol and de-capsulated at another end of the communication link. Then, the de-capsulated messages may be carried to the destinations over a network that implements the former protocol in which the messages are formatted.

Tunneling is used for different purposes. For example, tunneling is used in order to carry the messages formatted in one protocol over a delivery network that uses another protocol. These two protocols may be of the same protocol type or different protocol types of one layer of the Open Systems Interconnection model (OSI model). In addition, these two protocols may be of different layers of the OSI model. Tunneling is also used to take advantage of the security functions provided by the encapsulating protocol when the protocol of the encapsulated messages provides little or no security functions. Another use of tunneling might be for delivering messages that have addresses that are not compatible with the addresses of the delivery network by using compatible addresses in the headers of the encapsulating protocol.

A tunnel can be built between two network nodes (e.g., routers, switches, servers, etc.). For example, two network switches could be at two ends of a communication link that uses an encapsulating protocol to transmit encapsulated messages between the two switches. These network switches may have network interface controllers that may allow the network switches to offload some of a protocol stack to the network interface controllers. By offloading, the network switches save their computing resources and use them to perform other tasks. Therefore, these network switches can improve their performances by offloading. However, some types of protocols partially allow or do not allow at all for offloading. When one such protocol is used as an encapsulating protocol, the network switches may not fully utilize their network interface controllers' capabilities.

BRIEF SUMMARY

Some embodiments of the invention provide a novel method of tunneling a data packet by encapsulating the data packet with a protocol header and specifying information in the fields of the header in a manner that a network node (e.g., a switch, a router, a server, etc.) can offload processing tasks to its network interface controller (NIC). The switch on a transmit side sends the processed data packet through the tunnel to another switch on a receive side. The two sides represent the two ends of the tunnel established between the two switches. Each of the transmit and received side switches is controlled by a switch controller, which in some embodiments is implemented in software. The switch controllers and network interface controllers together process the data packet which is to be transferred through the tunnel that is established between the switches.

The network interface controllers (also called network interface cards) are hardware components (with software that drives them) of the switches in some embodiments. The switch controllers of the switches "offload" some of the processing tasks to the NICs of the switches when the NICs are capable of performing those processing tasks. Some examples of the processing tasks include calculating checksum values for the packets to transmit and segmenting a packet in to smaller packets to conform to the sizes that the delivering network mandates. Some NICs are configured to perform those offloadable tasks only on packets formatted in a particular protocol (e.g., Transmission Control Protocol (TCP)). These NICs will not perform offloadable tasks when the packets are not formatted in the particular protocol.

Different NICs have different sets of offloadable tasks that the NICs can perform. In some embodiments, the switch controller of a switch on the transmit side determines which offloadable processing tasks that the NIC of the switch supports. Based on the determination, the switch controller performs those offloadable tasks that are not supported by the NIC. The switch then sends the processed data packet to the network controller, which in turn performs other tasks to process the data packet further.

The processed data packet may be broken into smaller packets such that the smaller packets can traverse the delivery network (e.g., the Internet) and arrive at their destination. The destination may be a receive side switch that includes a NIC and a switch controller that controls the receive side switch. The NIC of the receive side receives the data packets that the switch on the transmit side sends. That is, the information included in the header fields of the encapsulating protocol directs the packets to the receive side switch. The NIC performs those processing tasks that the NIC is capable of performing and passes the processed data packets to the switch controller. The switch controller in turn performs the rest of the processing tasks in order to finish de-capsulating and reassembling the original data packet.

In some embodiments, the encapsulating protocol is TCP, which includes a number of typical fields in the protocol header. As known in the art, these fields are interpreted in a standardized way. For example, the source port number field is expected to include a value that represents the source port number of the TCP packet.

In some embodiments, the switch controller of the transmit side switch specifies information in some of the fields of the TCP header in such a way that causes the NIC of the transmit side switch to perform certain offloadable tasks differently or to perform certain offloadable tasks that the NIC would not perform otherwise. For example, the switch controller of the transmit side in some embodiments divides the sequence number field of the TCP header into upper and lower fields and then specifies the length of the encapsulated packet in the upper field and offset value in the lower field. Upon receiving a packet with this TCP header, the NIC of the transmit side switch breaks the packet into smaller packet segments as necessary and replicates the TCP header for each of the smaller packet segments. The NIC, however, will increment the offset value of the lower field for each packet segment after the first packet segment.

The NIC of the transmit side switch performs other offloadable tasks that the NIC is capable of performing. Some of the offloadable tasks include gathering pieces of data for the packet that are scattered in different locations of memory of the transmit switch. The NIC receives the pointers to the memory locations from the switch controller and assembles the data to send as part of the packet. The offloadable tasks also include Virtual Local Area Network (VLAN) acceleration, which is a process of placing a VLAN tag in between fields of a header.

In some embodiments, the information specified in the encapsulating TCP header is interpreted by the switch controller of the receive side switch in a way that is different than the standardized way of interpreting the fields of a TCP header. For example, the switch controller of the transmit side specifies a packet identifier value in the acknowledgment field of the encapsulating TCP header. The switch controller of the receive side interprets the value in the acknowledgement field of the TCP header as a packet identifier instead of interpreting it as an acknowledgment value as it would be interpreted in the standardized way. As another example, the switch controller of the transmit side specifies a stream identifier value in the source port field of the encapsulating TCP header. The switch controller of the receive side interprets this value in the source port field of the header as a stream identifier.

In addition to the encapsulating TCP header, the switch controller of the transmit side, in some embodiments, adds other encapsulating headers on top of the encapsulating header. For example, some embodiments add an Ethernet header and Internet Protocol (IP) header on top of the encapsulating TCP header. Moreover, some embodiments define a protocol header called a Stateless TCP Tunneling (STT) header to encapsulate a packet. An STT header in some embodiments carries in its fields information that the switch controller of the receive side uses to extract and restore the original encapsulated packet before sending it out to the destination specified by the headers of the original packet. For instance, an STT header may include data that represents the type of the protocol in which the encapsulated packet is originally formatted. The STT header fields are populated with the information by the switch controller of the transmit side and interpreted by the switch controller of the receive side.

Some embodiments do not provide reliable transmission of the packets even though TCP headers encapsulate the packets. That is, the switch of some embodiments does not request for re-transmission of lost or corrupt packets and allow those packets to drop. The switch on the transmit side of a tunnel in some embodiments also does not perform handshaking process before sending the packets to the switch on the receive side. As such, the switch on the transmit side and the switch on the receive side communicate with each other connectionless.

While some embodiments use a TCP header as an encapsulating header, other embodiments may utilize a header of other type of protocol. For instance, some embodiments use a User Datagram Protocol (UDP) header as an encapsulating header.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

Figure 1:
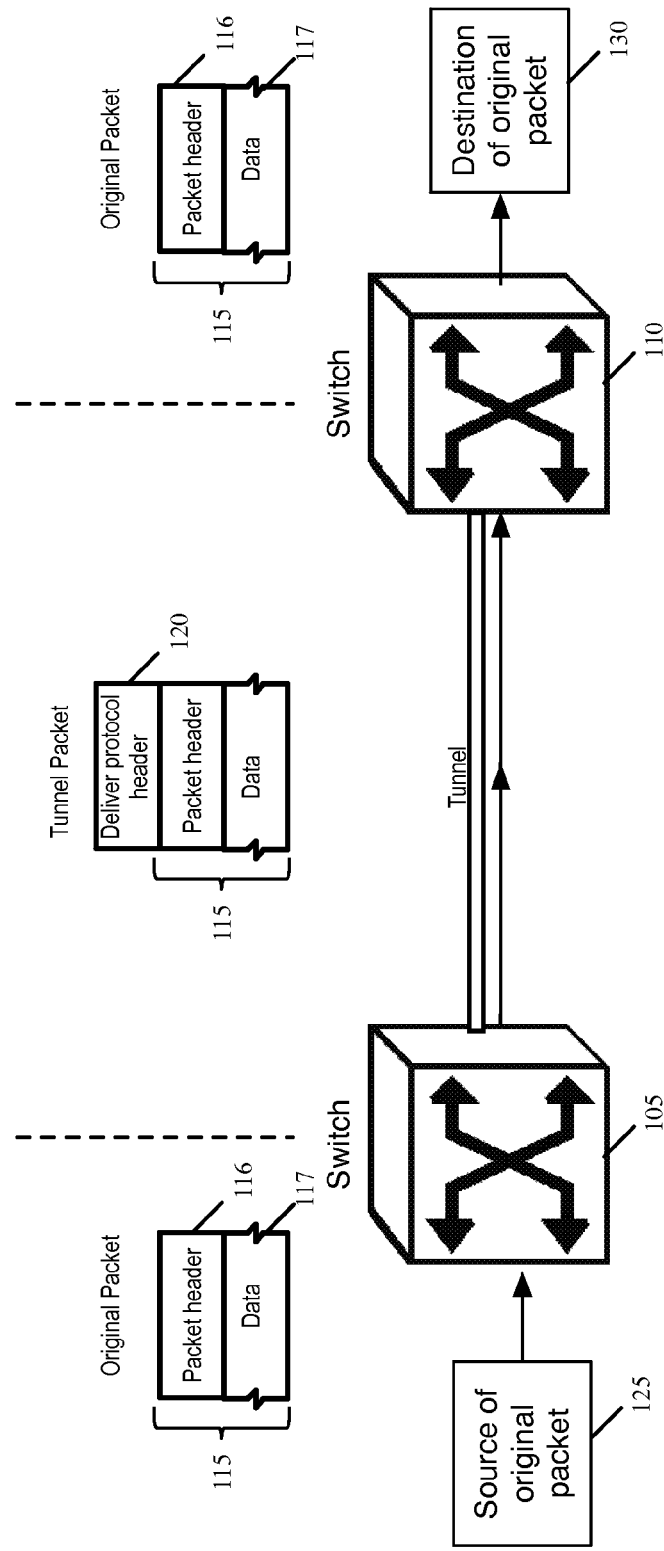
FIG. 1 conceptually illustrates a delivery of a data packet through a tunnel established between two network switches.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a novel method of tunneling a data packet by encapsulating the data packet with a protocol header and specifying information in the fields of the header in a manner that a network switch can offload processing tasks to its network interface controller. The switch on a transmit side sends the processed data packet through the tunnel to another switch on a receive side. The two sides represent the two ends of the tunnel established between the two switches. Each of the transmit and received side switches is controlled by a switch controller, which, in some embodiments, is implemented in software. The switch controllers and network interface controllers together process the data packet which is to be transferred through the tunnel that is established between the switches.

Several types of switches are used by some embodiments. One type of switch is formed of at least one network interface controller, dedicated circuits that perform switching functions, and the software switch controller that controls and directs the circuits to perform the functions. Another type of switch is formed of at least one network interface controller and software switch controller that performs switching functions. An example of the latter type of switch may be a server running an operating system (e.g., Linux, UNIX, Windows, etc.) on which the software switch controller to execute and having one or more network interface controllers.

Tunneling is encapsulating a data packet that includes a header of a first communication protocol with a header of a second communication protocol in order to transmit the data packet over a delivery network that implements the second communication protocol. A tunnel is deemed established when two network nodes of the delivery network are set up to deliver packets from a first of the two network nodes to a second of the two network nodes using the encapsulating protocol. The network nodes of the delivery network may include switches, routers, workstations, servers, virtual machines, or any devices that can transmit and/or receive data packets.

A data packet typically consists of a header and user data. The header of a packet includes control information that is necessary for the delivery network to deliver the packets from the node that transmits the data packets to the node to which the packets are to be delivered. The user data of the packet is data that is to be delivered from one node to another. The user data is also called a payload. A data packet may include headers of one or more communication protocols. When a data packet includes more than one header, the outer-most header is followed by other headers. The inner-most header is usually the last header of the headers before the payload of the packet. For the network that implements the protocol of the outer-most header of a packet, the network considers only the outer-most header of the packet as the header and the other headers and the user data of the packet are together considered as the payload of the packet.

FIG. 1 conceptually illustrates a delivery of a data packet from one network node to another network node through a tunnel established between two switches that lie between the two nodes in the network. Specifically, this figure illustrates that a network switch 105 encapsulates a data packet 115 with a delivery protocol header 120 to deliver the data packet 115 to a network switch 110. This figure also illustrates that the data packet 115 originates from the source 125 and is delivered to the destination 130 through a network that includes the switches 105 and 110 as network nodes.

The source 125 is a network node. The network node communicates with the switch 105 using a protocol that both understand. The source 125 prepares the data packet 115 in some cases or the source receives the data packet 115 prepared by another network node (not shown). In some cases, the source 125 is a virtual machine. The source 125 may be configured in the same physical machine in which the switch 105 is configured to run.

The data packet 115 is a data packet to be sent from the source 125 to the destination 130. As shown, it includes a packet header 116 and data 117. The packet header 116 in turn may include a set of headers. The set of headers may include several different protocol headers for different layers of the OSI model. For instance, the packet header 116 may include a header of a transport layer protocol (e.g., a TCP header), a header of a network layer protocol (e.g., an IP header), a header of a data link layer protocol (e.g., an Ethernet header). The packet header 116 includes information for the switches 105 and 110 to direct the packet 115 to the destination 130. The data 117 includes the user data that the source 125 is sending to the destination 130.

The switch 105 is a network switch that processes and routes data packets that the switch receives over the connections that the switch has with the source 125 and the switch 110. In some embodiments, the switch 105 includes a switch controller and a NIC (not shown). Different embodiments implement the switch controller differently. In some embodiments, the switch controller is implemented in software executed by a microprocessor or multi-core processor. In other embodiments, the switch controller is implemented in hardware, e.g., processing unit(s) that include a Field Programmable Gate Array (FPGA), an ASIC, or various other electronic components for executing instructions that are stored on the processor. Yet, in other embodiments, the switch controller is partially implemented in software and partially implemented in hardware.

The switch controller of the switch 105 in some embodiments adds the delivery protocol header 120 to the data packet 115. The deliver protocol header is a header of a protocol that the two switches 105 and 110 use to send and receive data packets. The switch controller of the switch 105 in some embodiments specifies information in the delivery protocol header in such a way that the NIC of the switch 105 perform certain offloadable tasks to process the data packet 115. The switch controller performs the rest of the processing tasks that need to be performed on the data packet 115. The offloadable tasks and performing of the offloadable tasks by switch controllers and NICs are discussed further below.

The switch 110 is another network switch. In some embodiments, the switch 110 also includes a switch controller and a NIC (not shown). When the switch 110 receives the encapsulated packet 115, the switch 110 in some embodiments processes the encapsulating header 120 and the encapsulated packet 115 in order to restore the packet 115 to the original form. Specifically, the NIC of the switch 110 processes the delivery protocol header and the encapsulated packet 115 as much as it is capable of processing and makes the processed result available for the switch controller of the switch 110 to process further. The switch controller performs the rest of the processing necessary to restore the packet 115 in the original form. The switch 130 then routes the restored packet 115 to the destination 130 using the information included in the packet header 116.

The destination 130 is a network node. The destination 130 communicates with the switch 110 using a protocol that both understand. The destination 130 receives the data packet 115. In some cases, the destination 130 is a virtual machine. The destination 130 may be configured in the same physical machine in which the switch 110 is configured.

An example operation of the source 125, the destination 130, and the two switches 105 and 110 will now be described. The source 125 prepares the data packet 115 to send to the destination 130. The source 125 specifies information in the packet header 116 such that the switches 105 and 110 can direct the packet 115 to the destination 130 using the information.

The switch 105 receives from the source 125 the packet 115 and sees that the packet is directed to the destination 130. The switch controller of the switch 105 determines that the packet 115 should be sent to the switch 110 in order for the packet to reach the destination 130. In this example, the addresses specified in the packet header 116 is not compatible with the addresses used in the network segment to which the switches 105 and 110 belong. Consequently, the switch controller determines that the switch would send the packet 115 to the switch 110 using another protocol header that would specify the addresses that are compatible with the network segment. The switch controller of the switch 105 then adds delivery protocol header 120 to the packet 115 to form a tunnel packet that consists of the delivery protocol header and the packet 115. The switch controller of the switch 105 specifies information in the delivery protocol header 120. The NIC of the switch 105 uses some of the information to perform offloadable tasks to further process the packet 115. The NIC sends out the packet through the tunnel.

While FIG. 1 illustrates several network nodes in a network, the network may include other network nodes (not shown) between the switch 105 and the switch 110. The packet 115 will be processed and/or relayed by some of these other network nodes. The network nodes will use the information included in the delivery protocol header 120 to direct the packet 115 from the switch 105 to the switch 110. Once the switch 110 receives the packet 115, the NIC and the switch controller of the switch 110 processes the tunnel packet and restores the packet 115 to the original form as the packet was sent out from the source 125. Then the switch 110 routes the packet 115 to the destination 130.

Figure 2:
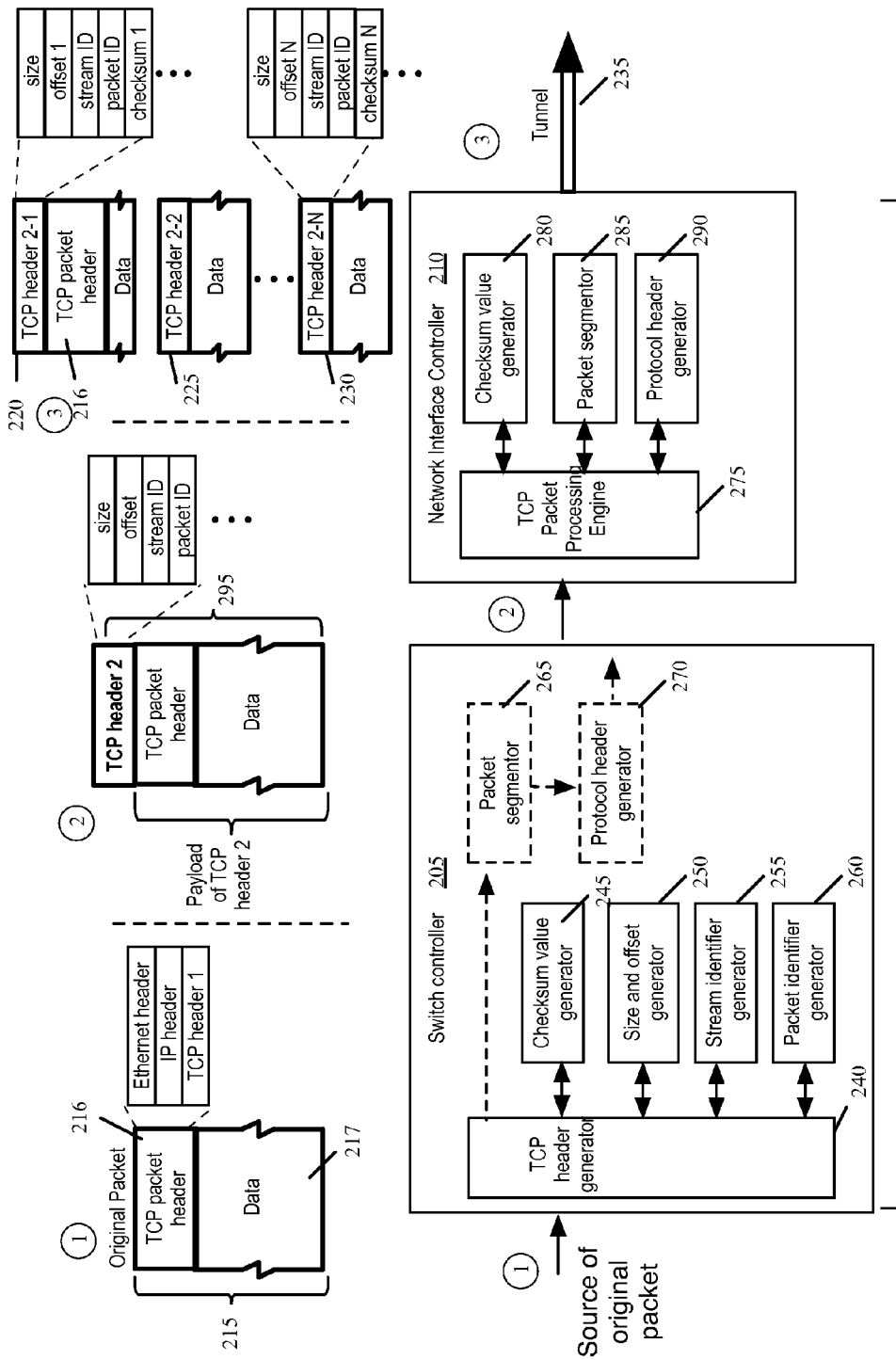
FIG. 2 conceptually illustrates that a network switch receives and processes a data packet and then sends out the resulting data packets through a tunnel.

FIG. 2 conceptually illustrates that a network switch receives and processes a data packet and then sends out the resulting data packets through a tunnel. Specifically, this figure illustrates that a switch controller 205 offloads some offloadable tasks to a NIC 210 to process a data packet 215. The switch controller 205 and the NIC 210 process the data packet 215 and transmit the resulting data packets 220, 225, and 230 to a tunnel 235. FIG. 2 illustrates the encircled numbers 1, 2, and 3 in order to show that the packets depicted in the upper portion of this figure are inputs and/or outputs of the controllers and tunnels depicted in the lower portion of this figure. Similar encircled numbers are used in other figures of this application.

The data packet 215 is a data packet that includes a TCP packet header 216 and data 217. The TCP packet header includes control information for network nodes to read and direct the packet to its destination. The data 217 includes the user data that is to be delivered to the destination. As shown, the TCP packet header 216 includes an Ethernet header, an IP header, and a TCP header 1, which represents the protocols in the data link layer, the network layer, and the transport layer of the OSI model, respectively. The data packet 215 is sent from a source (not shown), which has prepared the headers and the data in the packet 215.

A switch 201 includes the switch controller 205 and the NIC 210. This switch is similar to the switch 105 described above by reference to FIG. 1. The switch 201 processes incoming packets and sends the processed packets towards the respective destinations. As shown, the switch controller 205 in some embodiments includes a TCP header generator 240, a packet segmentor 265, and a protocol header generator 270. The TCP header generator 240 generates values that the switch controller 215 specifies in the TCP header 2 depicted by the encircled number 2 in the upper portion of this figure. The TCP header generator 240 generates the values using a checksum value generator 245, a size and offset generator 250, a stream identifier generator 255, and a packet identifier generator 260. In some embodiments, the switch controller 205 encapsulates the data packet 215 with the TCP header 2 by prepending the TCP header 2 to the data packet 215. As a result, the data packet 215 becomes the payload of a data packet 295 with the TCP header 2. As will be described further below, the values specified in the TCP header 2 are used by a switch controller of the switch on the receive side in order to restore the data packet 215 to the original form.

The TCP header generator 240 uses the checksum value generator 245 to generate a checksum value. A checksum value is a value used by the destination network node to validate the fidelity of the data carried by the packet. However, generating a checksum value for the data 215 is one of offloadable tasks that the switch controller 205 can offload to the NIC 210 in some embodiments because those tasks are supported by the NIC 210. Thus, the TCP header generator 240 does not generate a checksum value for validating the data 215 in these embodiments. Instead, the TCP header generator 240 leaves up to the NIC 210 to generate a checksum value for validating the data 215. In some embodiments, the TCP header generator 240 still generates a checksum value using the checksum value generator 245. This checksum value is for validating an IP header (not shown) that may be prepended to the TCP header 2. The checksum value generator 245 generates this checksum value using the values in the fields of the IP header.

The TCP header generator 240 uses the size and offset generator 250 to generate the size and offset values to specify in the TCP header 2. The size and offset generator 250 measures the size (e.g., in number of bits) of the packet 215, which has become the payload of the TCP header 2 as described above. The offset value is used for any data packets into which the data packet 215 may be segmented. The size and offset generator 250 sets the offset value as zero in some embodiments.

The TCP header generator 240 generates a stream identifier using the stream identifier generator 255. The stream identifier is a value that uniquely identifies the stream to which the packet 215 belongs. Packets in the same stream share common properties. For example, the packets may have the same specific source and the same specific destination. In some embodiments, the stream identifier generator 255 generates a stream identifier value using the information it reads from the TCP packet header 216.

The TCP header generator 240 generates a packet identifier using the packet identifier generator 255. The packet identifier is a value that identifies the packet 215. As will be described below, the switch controller 205 or the NIC 210 may segment the packet 215 into smaller packets so that the sizes of the packets conform to the requirements of the delivery network. When such segmentation happens, the switch controller 205 or the NIC 210 will specify the packet identifier in each of the headers of the packets into which the packet 215 is segmented. The switch of the receive side uses the packet identifier to prevent the packets that are not segmented from the packet 215 from being reassembled together with packets that are segmented from the packet 215.

In some embodiments, the switch controller 205 determines which of the offloadable tasks that the NIC 210 is capable of performing. A driver for the NIC 210 may provide information regarding the NIC's capabilities. The switch controller 205 does not perform any offloadable tasks that the NIC will perform. For instance, the switch controller 205 will not use a packet segmentor 265 and the protocol header generator 270 when the switch controller 205 determines that the NIC 210 performs packet segmentation and protocol header generation. The packet segmentor 265 and the protocol header generator 270 are depicted as dotted boxes in this figure to indicate that the segmentor and generator are not used by the TCP header generator 240. The switch controller 205 in some embodiments does not make this determination for each packet the switch controller receives. Instead, the switch may determine the capabilities of the NIC once and stores the result for processing the subsequent data packets.

As shown, the TCP header 2 includes the values generated by the TCP header generator 240. The TCP header 2 encapsulates the packet 215 and thus the packet 215 is the payload of the TCP header 2. The TCP header 2 includes all the fields that a standard TCP header includes. However, as will be described further below, the values specified in some of the fields in the TCP header 2 are used for different purposes than the purposes as defined or specified by the standard. For instance, the stream identifier value generated by the TCP header generator 240 is specified in the source port field of the TCP header 2. The switch controller of the receive side will not use the value in the source port field as a value that identifies the source port. Instead, the switch controller will use the value as an identifier of the stream to which the packet belongs. For this reason, a TCP header like the TCP header 2 will be referred to as a pseudo TCP header in this application.

The NIC 210 of the transmit side switch includes a TCP packet processing engine 275. The TCP packet processing engine 275 uses a checksum value generator 280, a packet segmentor 285, and a protocol header generator 290 to perform the offloadable tasks that are offloaded to the NIC 210 from the switch controller 205. The packet segmentor 285 breaks the packet 295 that includes the TCP header 2 and the packet 215 into smaller packets so that these smaller packets can be carried over the network that requires smaller sizes of packets than the size of the packet 215. Since the packet 215 is the payload of the packet 295, the packet segmentor 285 divides the packet 215 into N segments. N is a number of smaller packets into which the packet 295 needs to be segmented in order to meet the size requirement of the delivery network. For instance, when the packet 215 is 64 kilobytes long and the delivery network requires packets to be smaller than 1500 bytes, the packet 215 is broken into about 43 smaller packets. As shown, the TCP packet header 216 is in the smaller packet 220. The TCP packet header 216 is in the smaller packet 220 because the TCP packet header 216 is part of the payload of the packet 295 that is segmented into the smaller packets and the TCP packet header 216 itself is not big enough to be segmented into different packets. The size of the TCP packet header 216 is in tens of bytes. However, in those rare cases when the TCP packet header 216 is considered too big to be included in one packet, the TCP packet header 216 will be segmented into different packets.

The protocol header generator 290 generates a header for each smaller packet that is segmented from packet 215. In some embodiments, the protocol header generator 290 replicates the TCP header 2 for each of the smaller packets 220, 225, and 230. The replicate TCP headers are TCP headers 2-1 through 2-N. The protocol header generator 290 also increments the offset value specified in each of the TCP headers 2-1 through 2-N. The offset value for a smaller packet indicates the location of its payload from the beginning of the payload of the packet from which the smaller packet is segmented. In other words, the offset value for a smaller packet indicates the amount of the payload of the original packet that has been included in the previous smaller packets. For instance, when the size of the first smaller packet 220 is 1500 bytes, the protocol header generator 290 specifies about 1460 bytes (i.e., 1500 bytes minus about 40 bytes for the size of the headers) in the TCP header 2-2 of the smaller packet 225. The protocol header generator 290 specifies zero as offset value in the TCP header 2-1 because the data that the smaller packet 220 includes is a beginning portion of the payload of the packet 295 and the offset value set by the size and offset generator 250 is zero.

The TCP packet processing engine 275 uses the checksum value generator 280 to generate a checksum value for each of the smaller packets 220, 225, and 230. These checksum values are for validating the fidelity of the payloads that these smaller packets carry. The switch on the receive side will compute checksum values for the smaller packets to validate the packets when the packets arrive at the switch on the receive side. Having the TCP packet processing engine 275 of the NIC 230 to perform checksum computation for the smaller packets, the switch controller 205 has offloaded this checksum computation task to the NIC 230. As shown, the TCP headers 2-1 through 2-N have their own checksum values, checksum 1 through N.

Some NICs are configured to perform offloadable tasks only on packets formatted in a particular protocol. These NICs will not perform offloadable tasks when the packets are not formatted in the particular protocol. For instance, the NIC 201 is configured to perform the offloadable tasks only when packets received from the switch controller 205 are formatted in TCP.

A tunnel 235 is a conceptual representation of the encapsulation of the packet 215 with the TCP header 2. Being delivered through a tunnel means that the packet 215 is delivered to another end of the tunnel using the control information included in the encapsulating header, the TCP header 2, and without using the information included in the encapsulated packet.

In some embodiments, the switch on the transmit side in some embodiments does not perform handshaking process before sending the packets to the receive side. That is, the switch on the transmit side sends the packets to the receive side without first ensuring that the switch on the receive side is available and ready to receive the data packets sent from the switch on the transmit side.

An example operation of the switch on the transmit side will now be described. The switch controller 205 receives the data packet 215 from the source. The switch controller 205 then determines which of offloadable tasks the NIC 210 is capable of performing. In this example, the NIC is capable of performing checksum value generation, packet segmentation, and protocol header generation. The switch controller 205 then skips those offloadable tasks and lets the NIC 210 perform those tasks.

The TCP header generator 240 generates a checksum value using the checksum value generator 245. The checksum value generator 245 generates this checksum value using the information included in an IP header (not shown) that is added before the packet 295. The size and offset generator 250 measures the size of the packet 215 and sets the offset value as zero in this example. The stream generator 255 generates a stream identifier value using the information included in the TCP packet header 216. The TCP header generator 240 specifies these generated values in the TCP header 2. The TCP header generator 240 also specifies other control information in the TCP header 2. That is, the TCP header generator 240 fills in all the fields of the TCP header 2 that need to be filled in with information.

In this example, the size of the packet 295 is bigger than the delivery network mandates. The NIC 210 segments the packet 295 to conform to the requirements of the deliver network. The size of the payload of the packet 295 is 64 kilobyte and the required maximum size of a packet to deliver by the delivery network is about 10 kilobytes in this example. Therefore, the NIC segments the payload of the packet 295 into seven smaller packets. The protocol header generator 290 replicates the TCP header 2 and adds a replicate header to each of the seven smaller packets 2-1 through 2-N with N being 7. The checksum value generator 280 generates a checksum value for each of the smaller packets. The NIC places the TCP packet header 216 in the smaller packet 220 as part of payload of the smaller packet 220. The NIC sends the seven smaller packets to the network. The NIC sends the smaller packets using the information specified in each of the headers 2-1 through 2-N without using the information specified in the TCP packet header 216.

Figure 3:
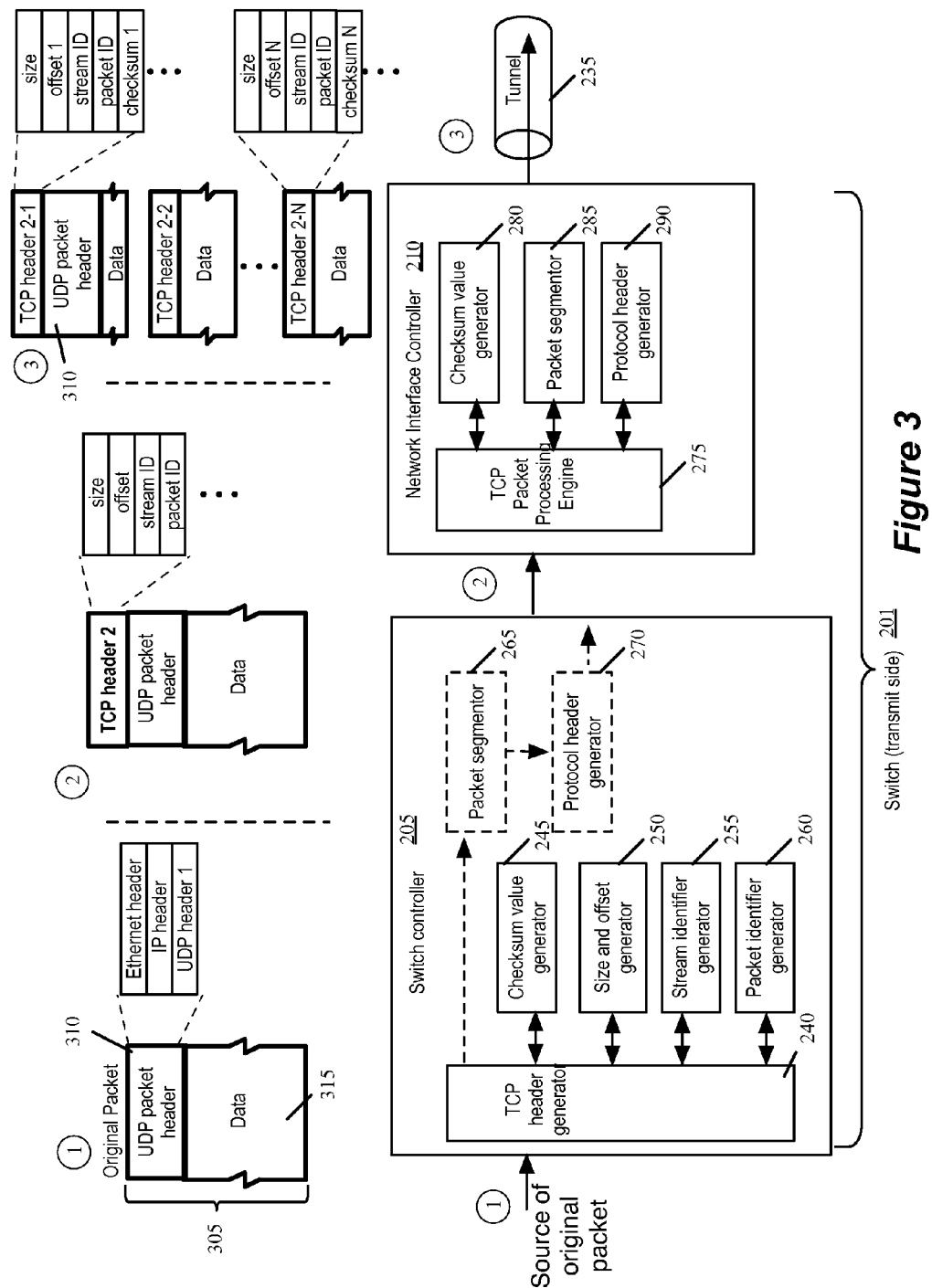
FIG. 3 conceptually illustrates that a network switch receives and processes a data packet and then sends out the resulting data packets through a tunnel.

FIG. 3 conceptually illustrates that a network switch receives and processes a data packet and then sends out the resulting data packets through a tunnel. Specifically, this figure illustrates that the switch controller 205 offloads some of offloadable tasks to the NIC 210 to process a data packet 305. This figure is identical to FIG. 2 described above, except that the packet 215 is replaced with the packet 305. This figure illustrates the processing techniques that are described above by reference to FIG. 2 can be applied to a packet of any type of protocol. For instance, the packet 305 is a User Datagram Protocol (UDP) packet.

The packet 305 includes UDP packet header 310 and data 315. The UDP packet header includes control information for network nodes to read and direct the packet to its destination. The data 315 includes the user data to deliver to the destination. As shown, the packet header 310 in some embodiments includes an Ethernet header, an IP header, and a UDP header, which represents the protocols in the data link layer, the network layer, and the transport layer of the OSI model, respectively. The data packet is sent from the source, which has prepared the headers and the data in the packet 305. The operation of the switch on the transmit side that includes the switch controller 205 and the NIC 210 is the same as described above by reference to FIG. 2.

Figure 4:
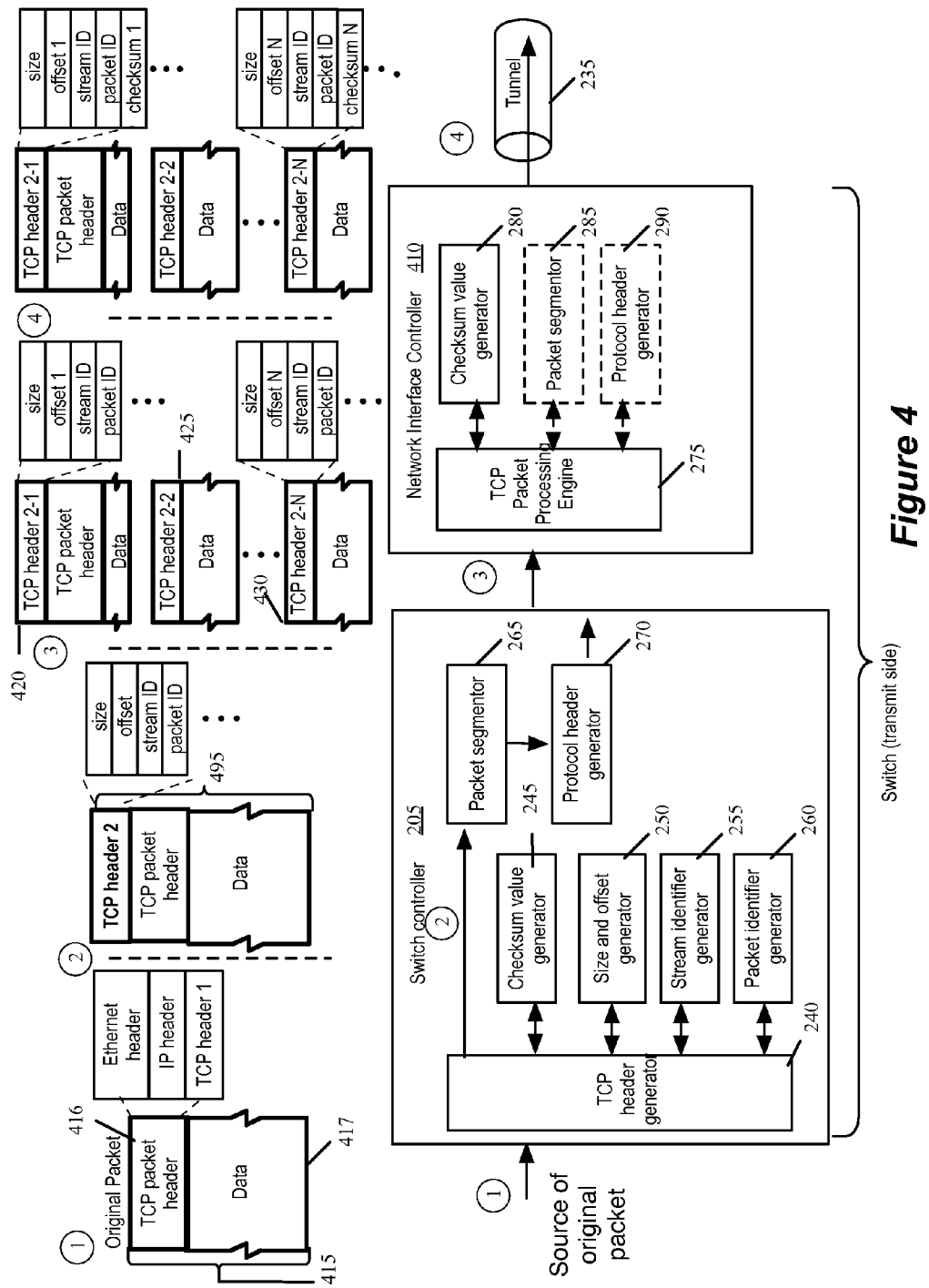
FIG. 4 conceptually illustrates that a network switch receives and processes a data packet and then sends out the resulting data packets through a tunnel.

FIG. 4 conceptually illustrates that a network switch receives and processes a data packet and then sends out the resulting data packets through a tunnel. Specifically, this figure illustrates that the switch controller 205 is not able to offload some of offloadable tasks to a NIC 410 to process a data packet 415. The switch controller 205 and the NIC 410 process the data packet 415 and transmit the resulting data packets 420, 425, and 430.

The data packet 415 is similar to the data packet 215 described above by reference to FIG. 2. The switch includes the switch controller 205 and the network interface controller 410. The switch controller 205 does not perform any offloadable tasks that the NIC 410 will perform. Generating a checksum value for the data 417 is one of offloadable tasks that the switch controller 215 can offload to the NIC 410 in some embodiments. Thus, the TCP header generator 240 does not generate a checksum value for validating the data 417 in these embodiments. Instead, it leaves up to the NIC 410 to generate a checksum value for validating the data 217.

The switch controller 205 will use a packet segmentor 265 and the protocol header generator 270 when the switch controller 205 determines that the NIC 410 is not able to perform packet segmentation and protocol header generation. The packet segmentor 265 breaks the packet 295 that includes the TCP header 2 and the packet 415 into smaller packets so that these packets can be carried over the network that requires smaller sizes of packets. Since the packet 415 is the payload of a packet 495, the packet segmentor 265 divides the packet 415 into N segments. N is a number of smaller packets that the packet 495 needs to be segmented into in order to meet the size requirement of the delivery network. As shown, the TCP packet header 416 is in a smaller packet 420. The TCP packet header 416 is in the smaller packet 420 because the TCP packet header 416 is part of the payload of the packet 495 that is segmented into the smaller packets and the TCP packet header 416 itself is not big enough to be segmented into different packets.

The protocol header generator 270 generates a header for each smaller packet that is segmented from packet 415. In some embodiments, the protocol header generator 270 replicates the TCP header 2 for each of the smaller packets 420, 425, and 430. The replicate TCP headers are TCP headers 2-1 through 2-N. The protocol header generator 270 also increments the offset value specified in each of the TCP headers 2-1 through 2-N. The offset value for a smaller packet indicates the location of its payload from the beginning of the payload of the packet from which the smaller packet is segmented. The protocol header generator 270 specifies zero as offset value in the TCP header 2-1 because the data that the smaller packet 420 includes is a beginning portion of the payload of the packet 495 and the offset value set by the size and offset generator 250 is zero.

The TCP packet processing engine 275 uses the checksum value generator 280 to generate a checksum value for each of the smaller packets 420, 425, and 430. These checksum values are for validating the fidelity of the payloads that these smaller packets carry. The switch on the receive side will compute checksum values for the smaller packets to validate the packets when the packets arrive at the switch on the receive side. Having the TCP packet processing engine 275 of the NIC 230 to perform checksum computation for the smaller packets, the switch controller has offloaded this task to the NIC 230. As shown by the packets depicted by the encircled number 4, the TCP headers 2-1 through 2-N have their own checksum values, checksum 1 through N. The packet segmentor 285 and the protocol header generator 290 are depicted as dotted boxes in this figure to indicate that the segmentor and generator are not present in the NIC 410.

An example operation of the switch on the transmit side will now be described. The switch controller 205 receives the data packet 415 from the source. The switch controller 205 then determines which of offloadable tasks the NIC 410 is capable of performing. In this example, the NIC is capable of performing checksum value generation but is not capable of performing packet segmentation and protocol header generation.

The TCP header generator 240 generates a checksum value using the checksum value generator 245. The checksum value generator 245 generates this checksum value using the information included in an IP header (not shown) that is added before the packet 495. The size and offset generator 250 measures the size of the packet 415 and sets the offset value as zero in this example. The stream generator 255 generates a stream identifier value using the information included in the TCP packet header 416. The TCP header generator 240 specifies these generated values in the TCP header 2. The TCP header generator 240 also specifies other control information in the TCP header 2. That is, the TCP header generator 240 fills in all the fields of the TCP header 2 that need to be filled in with information.

In this example, the size of the packet 495 is bigger than the delivery network mandates. The packet segmentor 265 of the switch controller 205 segments the packet 495 to conform to the requirements of the deliver network. The size of the payload of the packet 495 is 64 kilobyte and the required maximum size of a packet to deliver by the delivery network is about 10 kilobytes in this example. Therefore, the packet segmentor 265 segments the payload of the packet 495 into seven smaller packets. The packet segmentor 265 places the TCP packet header 416 in the smaller packet 420 as part of payload of the smaller packet. The protocol header generator 270 of the switch controller 205 replicates the TCP header 2 and adds a replicate header to each of the seven smaller packets 2-1 through 2-N with N being 7 as shown by the packets depicted by the encircled number 3. The switch controller then sends the packets to the NIC 410 for further processing of the packets.

The checksum value generator 280 of the NIC generates a checksum value for each of the smaller packets as shown by the packets depicted by the encircled number 4. The NIC sends the seven smaller packets to the network. The NIC sends the smaller packets using the information specified in each of the headers 2-1 through 2-N without using the information specified in the TCP packet header 416.

Figure 5:
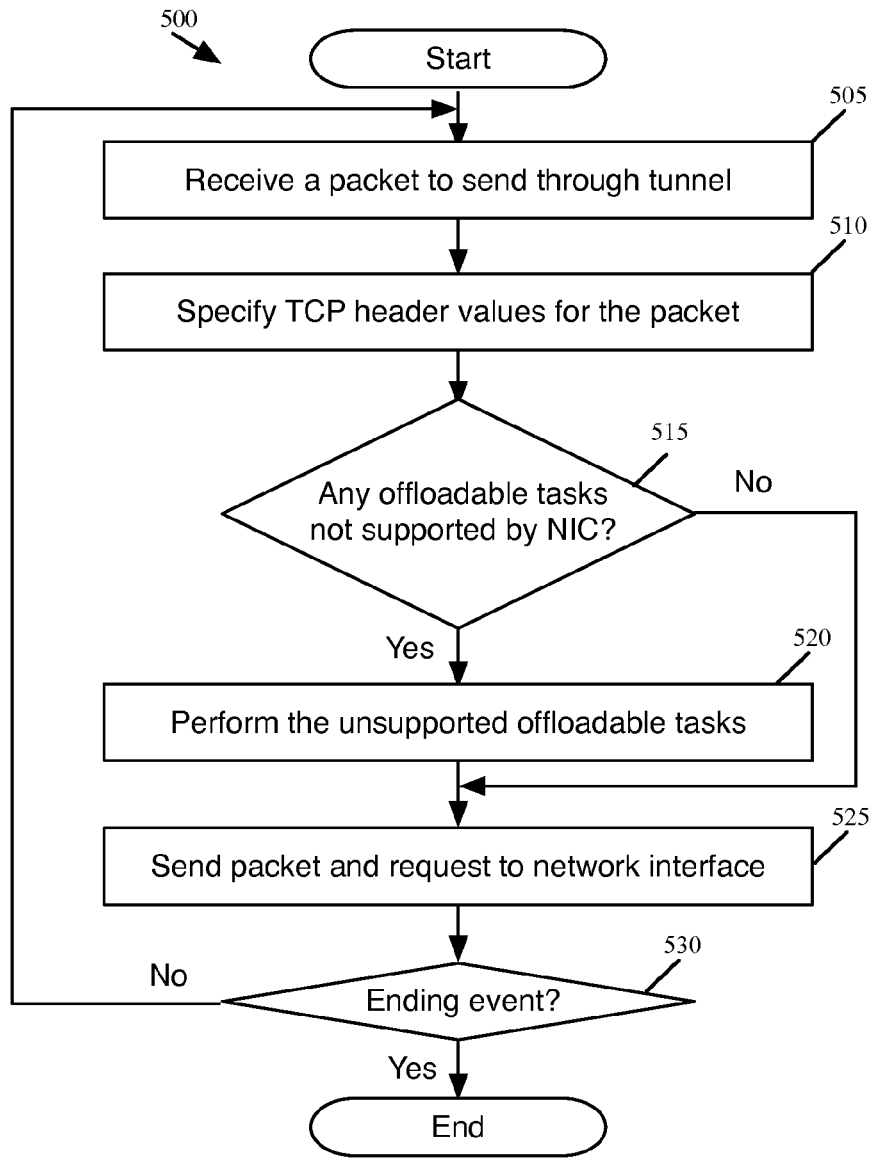
FIG. 5 conceptually illustrates a process of some embodiments for processing a data packet to send to a NIC for further processing.

FIG. 5 conceptually illustrates a process 500 of some embodiments for processing a data packet to send to a NIC for further processing. Process 500 in some embodiments is performed by a switch controller of a switch on a transmit side such as the switch controller 205 described above by reference to FIG. 2. The switch includes the switch controller and the NIC. In some embodiments, the process starts when the switch is set up and turned on to accept incoming packets to process and route. The process begins by receiving (at 505) a data packet to send through a tunnel. As described above, sending a packet through a tunnel means encapsulating the packet with a header and using the control information in the encapsulating header to send the packet to a destination. The received data packet in some embodiments includes one or more headers representing the different layers of the OSI model and a user data or payload.

The process then specifies (at 510) TCP header values for the packet to send through the tunnel. The process encapsulates the packet with this pseudo TCP header. More specifically, the process prepares a pseudo TCP header that will contain control information to send the received data packet through the tunnel. The process also specifies other information for a receive side switch to restore the packet. Such information includes a stream identifier, a packet identifier, a size of the packet, and an offset value. The process also specifies a checksum value in the TCP that the process generates using the information from the header of the packet.

Next, the process determines (at 515) whether there are any offloadable tasks that the NIC does not support. As described above, offloadable tasks in some embodiments include calculating checksum values, segmenting the packet into smaller packets, gathering data pieces from different memory locations, placing a VLAN tag in between fields of a protocol header, etc. It is to be noted that some NICs are configured to perform supported offloadable tasks only on packets formatted in a particular protocol (e.g., TCP). These NICs will not perform the supported offloadable tasks when the packets are not formatted in the particular protocol.

Different embodiments determine the capabilities of the NIC differently. For instance, the process obtains information about the NIC's capabilities from a driver for the NIC in some embodiments. The driver for the NIC may be part of the Operating System (OS) of the switch. When the process determines (at 515) that there are no offloadable tasks that the NIC is incapable of performing, the process proceeds to 525, which will be described further below.

When the process determines (at 515) that there are offloadable tasks that the NIC does not support, the process performs those unsupported offloadable tasks. For instance, when the NIC does not support segmenting the received data packet into smaller packets to conform to the requirements of the delivery network, the process segments the packet into smaller packets.

Next, process sends (at 525) the processed packet along with the pseudo TCP header and other headers to the NIC so that the NIC further processes the packets. The degree to which the packet is processed depends on the offloadable tasks that the NIC supports. That is, the more offloadable tasks that the NIC is capable of performing, the more the NIC is to process the packets being sent to the NIC by the process.

Process 500 then determines (at 530) whether there has been an ending event. Some examples of ending events include shutting down the switch that includes the switch controller and the NIC. When the process determines (at 530) that an ending event has occurred, the process ends. Otherwise, the process loops back to 505 to receive another packet.

One of ordinary skill in the art will recognize that process 500 is a conceptual representation of the operations used to process a data packet before sending it down to a NIC. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. For instance, the process may not have to perform operation 515 every time the process receives a data packet to send through the tunnel. The process may store the information about the NIC's capabilities and use it for future packets it will receive.

Figure 6:
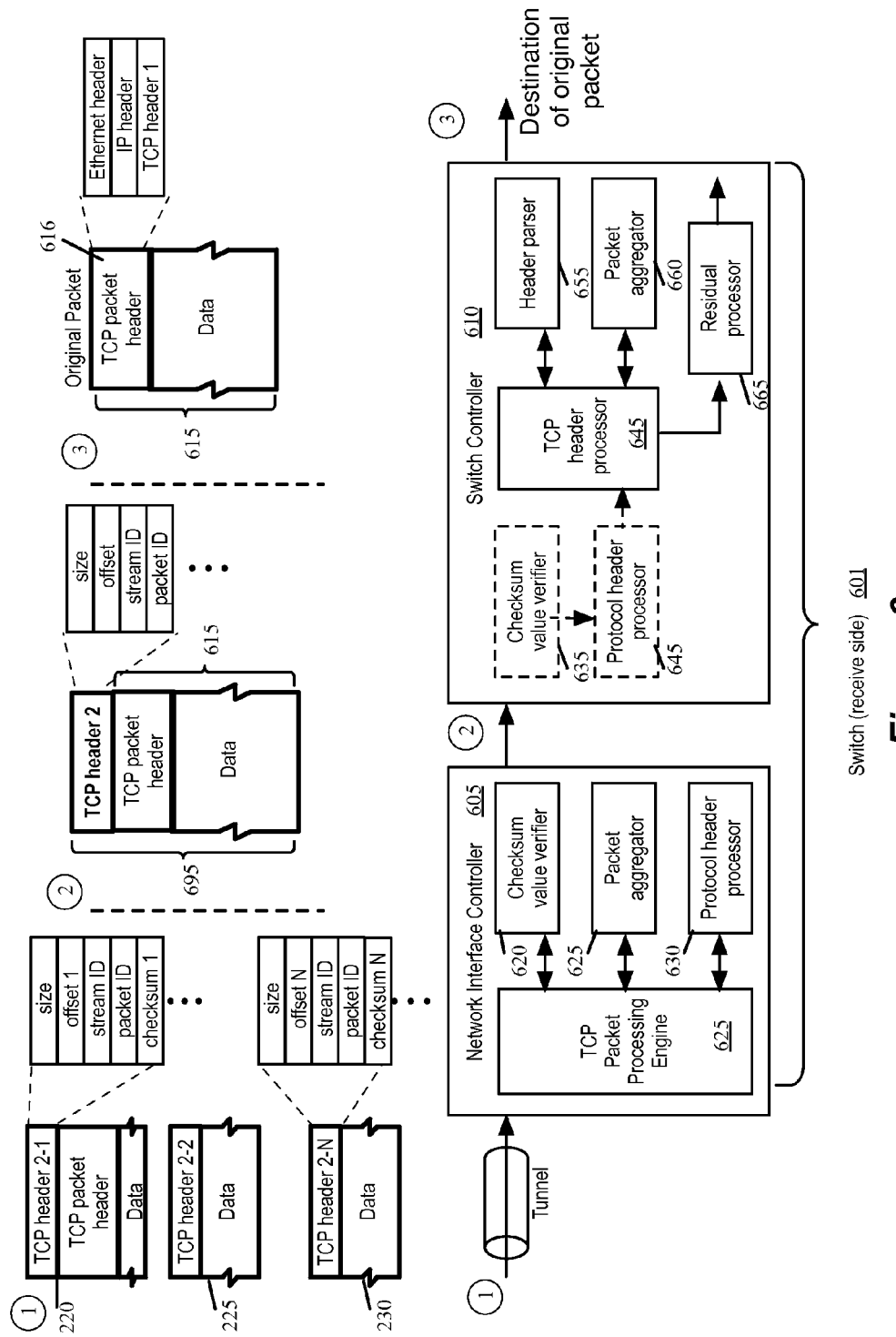
FIG. 6 conceptually illustrates that a network switch processes a set of packets that the network switch receives through a tunnel in order to reassemble an encapsulated packet.

FIG. 6 conceptually illustrates that a network switch on a receive side processes a set of packets in order to reassemble an encapsulated packet. Specifically, this figure illustrates that a NIC 605 and a switch controller 610 process the packets 220 through 230 that the switch receives in order to restore the encapsulated packet into the original form (i.e., packet 215 as described above by reference to FIG. 2).

As described above by reference to FIG. 2, the data packets 220 through 230 are the results of the processing performed by the switch controller 205 and the NIC 210 on the transmit side. Each of these packets has replicate headers with different offset and checksum values as shown by the packets depicted by the encircled number 1.

A switch 601 includes the NIC 605 and the switch controller 610. The switch 601 is similar to the switch 110 described above by reference to FIG. 1. Being on the receive side, the switch 601 processes packets from the transmit side and restore the encapsulated packet before sending the restored packet to its final destination. As shown, the NIC 605 in some embodiments includes a TCP packet processing engine 616, a checksum value verifier 620, a packet aggregator 625, and a protocol header processor 630. The TCP packet processing engine 616 performs offloadable tasks on the received packets using the checksum value verifier 620, the packet aggregator 625, and the protocol header processor 630.

The checksum value verifier 620 reads the data in each received packet and computes a checksum value using the same rule that the checksum value generator 245 used to generate a checksum value. The checksum value verifier 620 then compares the value it generated with the value specified in the TCP header of the received packet. If the values match, then the fidelity of the data in the packet is validated. Otherwise, the data of the packet is deemed corrupted and will be discarded. The switch 601 in some embodiments does not send a request to retransmit the corrupt packet to the switch on the transmit side.

The protocol header processor 630 parses (i.e., extracts information from) the replicate TCP headers of the received packets. The protocol header processor 630 then prepares the TCP header 2 that will be the header of the packet 695 that will be reassembled by the packet aggregator 625. The protocol header processor 630 also sorts out and groups the packets that have the same packet identifier values. The packet aggregator 625 aggregates the data in the received packets that have the same packet identifier values into the single larger packet 695. That is, the packet aggregator 625 does the opposite of what the packet segmentor 285 does as described above by reference to FIG. 2.

The packet 695 illustrated in FIG. 6 is the outcome of the processing performed by the NIC 605. The packet 295 includes the TCP header 2, which in turn includes the size, offset, stream identifier, and packet identifier. The TCP header 2 is encapsulating a packet 615. The packet 615 should be the same as the packet 215, which is the packet that is segmented into the packets 220 through 230. The packet 295, having been re-assembled by the NIC 605, is further processed by the switch controller 610.

The switch controller 610 takes the outcome of the processing performed by the NIC 605 and further processes the outcome in order to restore the encapsulated packet. The switch controller 610 determines the tasks to perform in order to restore the encapsulated packet. In some embodiments, the switch controller 610 inspects the outcome to make the determination. For instance, the switch controller 610 measures the size of a packet the switch controller receives from the NIC 605. When the measured size is less than the size specified in the header of the packet, the switch controller determines that the packets have not been reassembled into a larger original packet. In other embodiments, the switch controller 610 obtains information about the capabilities of the NIC 630 from the driver of the NIC 630.

The switch controller 610 includes a checksum value verifier 635, a protocol header processor 645, a TCP header processor 650, a header parser 655, a packet aggregator 660, and a residual processor 665. The checksum value verifier 635 and the protocol header processor 645 perform the offloadable tasks that the checksum value verifier 620 and the protocol header processor 630 perform, respectively, when the NIC 605 is not capable of performing the corresponding offloadable tasks. As shown, these two modules of the switch controller 610 are depicted as dotted boxes to indicate that the switch controller 610 does not use those modules.

The TCP header processor 650 uses the header parser 655 to parse the TCP header 2 that is encapsulating the packet 615. The header parser 655 reads the TCP header 2 and extracts, among other things, the size, offset value, stream identifier, and packet identifier. The extracted information is supplied to the packet aggregator 660 and residual processor 665.

The packet aggregator 660 aggregates the received packets to reassemble them into a single packet when the reassembling of the single packet has not been done by the NIC 605. In this aspect, the packet aggregator 660 functions like the packet aggregator 625, which does the opposite of what the packet segmentor 285 does. The packet aggregator 660 also verifies whether the packet 695 is properly reassembled. For instance, the packet aggregator measures the size of the packet 695 and compares the measured size with the size specified in the TCP header 2. When the size of the packet 695 is smaller than the size specified in the TCP header 2, the packet aggregator determines that the packet 695 does not include all the data that it is supposed to include. In some embodiments, the packet aggregator 660 checks the flags field of the STT header to see whether the checksum for the reassembled packet or the encapsulating header is verified to be correct by the switch on the transmit side. The flags field of an STT header will be described in detail further below.

The residual processor 665 performs several tasks that need to be performed to finalize the processing of the packets. For instance, the residual processor 665 removes the encapsulating header from the reassembled packet and discards the header. In addition, the residual processor 665 maps a header of the reassembled packet into metadata. The header is in a format that is independent from the operating system on which the switch controller is executing, while the metadata is in a format that is suitable for the operating system. By mapping the header to the metadata, the residual processor 665 converts the format of data. Examples of such conversion include byte swapping and correctly setting offsets of packet headers.

An example operation of the switch 601 will now be described. The NIC 605 receives the packets 220 through 230 and other packets from different sources (e.g., from other network nodes). The TCP packet processing engine 616 performs several offloading tasks using the checksum value verifier 620, the packet aggregator 625, and the protocol header processor 630. The checksum value verifier 620 validates the fidelity of the data in each of the received packets. In this example, none of the received packets is corrupted and the checksum values computed by the checksum value verifier 620 are identical to the checksum values specified in the TCP headers 2-1 through 2-N.

The protocol header processor 630 extracts information from the replicate TCP headers (i.e., the TCP headers 2-1 through 2-N) of the received packets. The protocol header processor 630 then prepares the TCP header 2. The protocol header processor 630 also groups the packets 220 through 230 together because those packets have the same packet identifier values. Then, the packet aggregator 625 reassembles the packets 220 through 230 into a single packet 695 using the offsets 1 through N and other information included in the TCP headers that are parsed by the protocol header processor 630.

The switch controller 610 receives the packet 695. By inspecting the packet 695, the switch controller 610 determines that the NIC 605 has already performed some of the offloadable tasks. The switch controller 610 then skips the offloadable tasks that are already performed on the received packets by the NIC 605. Then, the TCP header processor 650 parses the TCP header 2 using the header parser 655. The packet aggregator 660 determines that the received packets 220 through 230 are reassembled already. The residual processor 665 strips off the encapsulating header (i.e., the TCP header 2). The switch controller 610 then sends the restored packet 615 to the destination using the control information specified in the header of the restored packet (i.e., TCP packet header 616).

Figure 7:
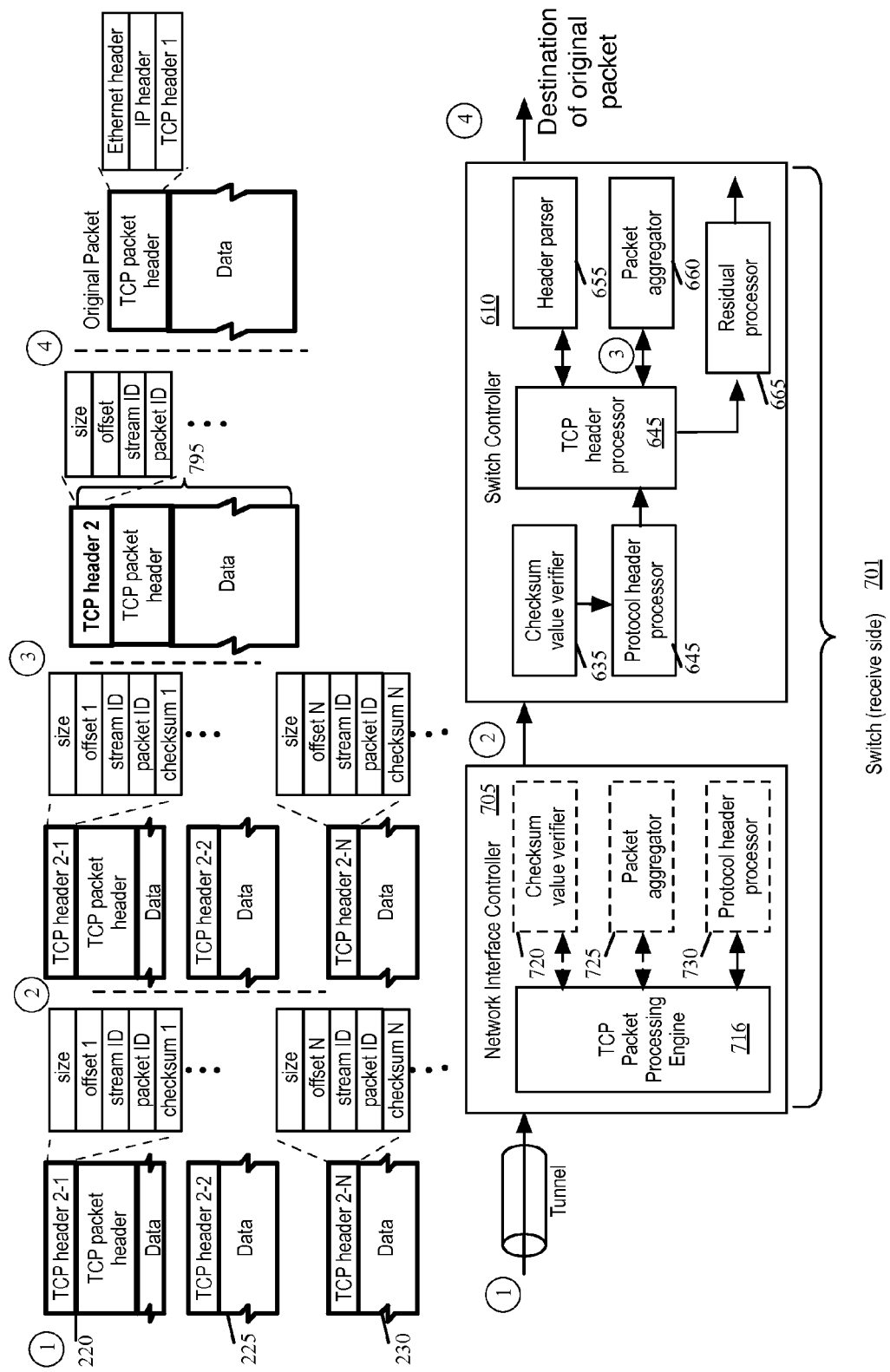
FIG. 7 conceptually illustrates that a network switch processes a set of packets the network switch receives through a tunnel in order to restore an encapsulated packet.

FIG. 7 conceptually illustrates that a network switch processes a set of packets the switch receives through a tunnel in order to restore an encapsulated packet from the set of received packets. Specifically, this figure illustrates that a NIC 705 is incapable of performing some offloadable tasks and the switch controller 610 performs those offloadable tasks to restore the encapsulated packet into the original form.

A switch 701 includes the NIC 705 and the switch controller 610. The switch 701 is similar to the switch 110 described above by reference to FIG. 1. As shown, the NIC 705 in some embodiments includes a TCP packet processing engine 716. A checksum value verifier 720, a packet aggregator 725, and a protocol header processor 730 are depicted in this figure as dotted boxes to indicate that the NIC 705 is incapable of reassembling the encapsulated packet. The TCP packet processing engine 716 performs other offloadable tasks (e.g., receive side scaling) on the received packets 220 through 230 using a receive side scaler (not shown). Receive side scaling will be described further below.

Because the NIC 705 is not capable of performing checksum value verification, the switch controller 610 performs checksum value verification. The checksum value verifier 635 reads the data in each received packet and computes a checksum value using the same rule that the checksum value generator 245 used to generate a checksum value. The checksum value verifier 635 then compares the value it generated with the value specified in the TCP header of the received packet. If the values match, then the fidelity of the data in the packet is validated. Otherwise, the data of the packet is deemed corrupted and the switch controller 610 will discard the packet.

The protocol header processor 645 parses the replicate TCP headers of the received packets 220 through 230. The protocol header processor 645 then prepares the TCP header 2 that will be the header of the packet 795 that will be reassembled by the packet aggregator 660.

As described above by reference to FIG. 6, the packet aggregator 660 aggregates the received packets to reassemble a single packet when the reassembling of the single packet has not been done. Because the NIC 705 is not capable of aggregating and reassembling the packets 220 through 230 into the single packet 795, the packet aggregator 660 performs reassembling of the packets into the original encapsulated packet. For instance, the packet aggregator 660 checks whether any packets received in a single batch are adjacent to each other and can be merged. When packets are received at a high rate, the packets typically are batched together. The packet aggregator 660 hashes some of the fields that uniquely identify a packet (i.e., a source IP address, a destination IP address, a packet identifier, etc.) and uses the hash value to lookup other packets that are segmented from the same encapsulated packet. Any packets segmented from the same encapsulated packet that has not yet fully arrived are stored until all packets segmented from the same encapsulated packet arrive or until a certain time or memory limit reaches. In some embodiments, when the time or memory limit reaches, the packet aggregator 660 discards the packets that have been stored.

As described above by reference to FIG. 6, the residual processor 665 performs several tasks that need to be performed to finalize the processing of the packets. For instance, the residual processor 665 in some embodiments combines individual pieces of data that comprise data for the reassembled packet into a single data abstraction. This single data abstraction is used when the data for the reassembled packet is needed. In some cases, the data for the reassembled packet is scattered across memory because the data was in many smaller packets that were reassembled to form one.

Different embodiments use different methods to combine the data pieces into a single data abstraction. For instance, some embodiments store a list of pointers to the data pieces along with the lengths of each data piece. When the data for the reassembled packet is needed, these embodiments access the data using the pointers and the lengths. Instead of, or in conjunction with, using the pointers and lengths, the residual processor 665 in some embodiments copies the data pieces into a single buffer. The single buffer containing data pieces serves as a single data abstraction in these embodiments. Yet in other embodiments, the residual processor 665 converts the data pieces into individual packets. This involves copying the headers (i.e., Ethernet/IP/TCP) from the beginning of the reassembled packet onto each of the individual packets and modifying those headers so that the lengths, sequence numbers, checksums, etc. are correct. In these embodiments, the residual processor 665 creates the individual packets without a list of pointers to the data pieces and without copying the data.

An example operation of the switch 601 will now be described. The NIC 705 receives the packets 220 through 230. The TCP packet processing engine 716 performs an offloading task using the protocol header processor 630. The protocol header processor 630 extracts information from the replicate TCP headers (i.e., the TCP headers 2-1 through 2-N) of the received packets. The protocol header processor 630 also groups the packets 220 through 230 together because those packets have the same packet identifier values.

The switch controller 610 receives the packets 220 through 230. By inspecting the packets, the switch controller 610 determines that most of the offloadable tasks have not been performed by the NIC 705. The checksum value verifier 635 validates the fidelity of the data in each of the received packets. In this example, none of the received packets are corrupted and the checksum values computed by the checksum value verifier 620 are identical to the checksum values specified in the TCP headers 2-1 through 2-N. The protocol header processor 645 then prepares the TCP header 2. Then the packet aggregator 660 reassembles the packets 220 through 230 into a single packet 795 using the offsets 1 through N and other information included in the TCP headers that are parsed by the protocol header processor 630.

The TCP header processor 650 then parses the TCP header 2 using the header parser 655. The packet aggregator 660 determines that the received packets 220 through 230 have not been reassembled already. The packet aggregator 660 reassembles the packets 220 through 230 into a single packet 795. The residual processor 665 then maps some of the information extracted by the header parser 655 to metadata. The residual processor 660 also strips off the TCP header 2 from the reassembled packet. In addition, the residual processor 660 creates a single data abstraction from the data pieces that comprise the data part of the reassembled packet.

Figure 8:
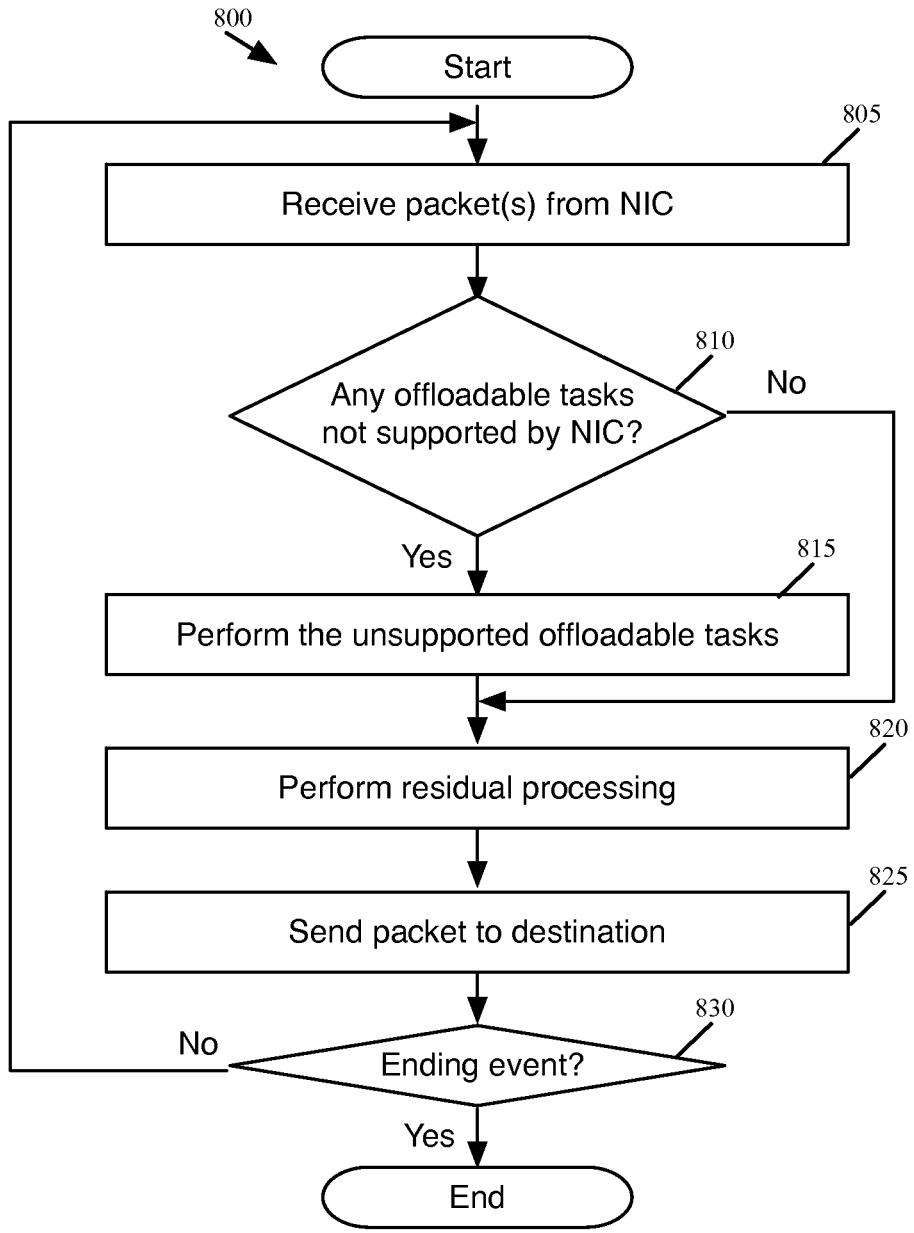
FIG. 8 conceptually illustrates a process of some embodiments for further processing data packets that are received from a NIC.

FIG. 8 conceptually illustrates a process 800 of some embodiments for further processing data packets that are received from a NIC. Process 800 in some embodiments is performed by a switch controller of a switch on a receive side such as the switch controller 610 described above by reference to FIG. 6. The switch includes the switch controller and the NIC. In some embodiments, the process starts when the switch on the receive side is set up and turned on to accept incoming packets to process and route. The process begins by receiving (at 805) a data packet from the NIC. The packet has been processed by the NIC.

Process 800 then determines (at 810) whether there are any offloadable tasks that the NIC does not support. As described above, offloadable tasks on the receive side in some embodiments include calculating and verifying checksum values, aggregating and reassembling the received packets into a single larger packet, processing replicate headers of the received packets, etc. Different embodiments determine the capabilities of the NIC differently. For instance, the process obtains information about the NIC's capabilities from a driver for the NIC in some embodiments. In other embodiments, the process determines the capabilities by inspecting the packets that are the outcome of the NIC's processing. For instance, when a packet received from the NIC is smaller than the size specified in the header of the packet, the process determines that the smaller packets have not been reassembled into a larger packet. As described above, these smaller packets are packets into which the original larger packet is segmented.

When the process determines (at 810) that there are no offloadable tasks unsupported by the NIC, the process proceeds to 820, which will be described further below. Otherwise, the process performs (at 815) the offloadable tasks that are not supported by the NIC in order to restore the original packet. For instance, when the checksum values of the received packets are not verified by the NIC, the process verifies the checksum values by computing the checksum values for the data in the smaller packets first and then comparing the checksum values specified in the headers of the smaller packets. The original packet is a packet that was segmented into the smaller packets on the transmit side. The original packet does not have the encapsulating header.

Next, the process performs (at 820) residual processing. In some embodiments, the process generates an internal representation of the original packet. To generate the internal representation, the process maps some of the information extracted from the encapsulating header. The process also lays out the original packet in memory of the switch in such a way that is most efficient to process the packet. The process also creates a single data abstraction using the data pieces that comprise the data part of the reassembled original packet.

The process then sends (at 825) the original packet to the destination according to the control information specified in the header of the original packet. Process 800 then determines (at 830) whether there has been an ending event. Some examples of ending events include shutting down the switch that includes the switch controller and the NIC. When the process determines (at 830) that an ending event has occurred, the process ends. Otherwise, the process loops back to 805 to receive another packet from the NIC.

Several more detailed embodiments are described below. Section I provides a description of a switch of some embodiments on a transmit side. Next, Section II describes a description of a switch of some embodiments on a receive side. Section III follows with a description of different combination of offloadable tasks performed by switch controller and NICs of switches on both transmit and receive sides. Finally, Section IV describes an electronic system that implements some embodiments of invention.

I. Transmit Side Switch

As described above, a switch controller of a switch on a transmit side in some embodiments encapsulates a data packet with a header of a protocol such as a TCP protocol. The packet is then delivered to a destination through a delivery network, which uses the control information specified in the encapsulating protocol. The delivery network does not use the information specified in the header of the encapsulated packet. To the delivery network, the header of the encapsulated packet is a payload to deliver. When the encapsulated packet reaches the destination that is specified in the encapsulating header, the header of the encapsulated packet is utilized to deliver the packet to a destination specified in that header.

In some embodiments, the switch controller on the transmit side specifies specific information in particular fields of the encapsulating header. The information specified in those fields of the encapsulating header that will not affect the proper delivery of the packet to a destination specified in the encapsulating header. However, these values will be interpreted by the switch controller on the receive side in different ways than the standard for the protocol in which the encapsulating header is formatted. In this manner, some embodiments ensure the proper delivery of the packet while achieving functionalities that would not be possible to achieve when the encapsulating header is interpreted according to the standard. Moreover, the switch controller can take advantage of those offloadable tasks that the NIC is capable of performing.

Some embodiments use a TCP header as an encapsulating header. One of ordinary skill in the art will recognize that headers of other protocols (e.g., UDP) may be used to apply the techniques described above.

Figure 9:
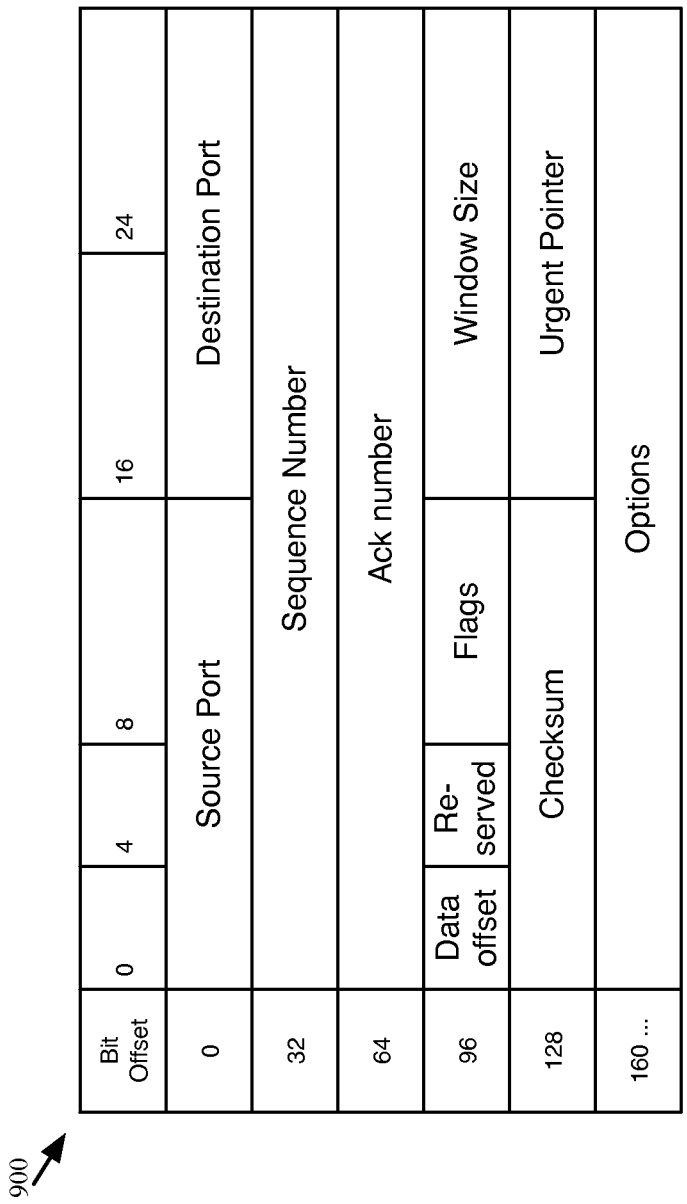
FIG. 9 illustrates a standard TCP header.

FIG. 9 illustrates a standard TCP header. This figure illustrates a standard TCP header using a table 900. The uppermost row and the leftmost column show the bit position of each field of the header.

Source port field stores a 16-bit value specifying the source port number. Destination port field stores a 16-bit value specifying the destination port number. Sequence number field stores a 32-bit value specifying the first data octet in this segment (i.e., the packet), unless SYN is present. SYN one of the six one-bit flags stored and specified in flags field. If SYN is present, the sequence number is the initial sequence number (ISN) and the first data octet is ISN+1. Acknowledgement number field stores a 32-bit value that specifies the highest sequence number the receiver of the segment has successfully received when the ACK control bit is set. The ACK control bit is one of the six one-bit flags stored and specified in flags field. Once a connection is established this is always sent.

Data offset field stores a 4-bit value that specifies where the payload begins. Specifically, the value specifies the number of 32-bit words in the TCP header. Reserved field stores a 6-bit value that must be zero. Flags field includes eight one-bit flags or control bits, which are CWR, ECE, URG, ACK, PSH, RST, SYN, and FIN. Window size field stores a 16-bit value specifying the number of data octets beginning with the one indicated in the acknowledgment number field, which the sender of this segment is willing to accept. Checksum field stores a 16-bit value that is used for error-checking of the header and payload. The checksum field also covers a pseudo IP header conceptually prepended to the TCP header. Urgent pointer field stores a 16-bit value specifying an offset from the sequence number in this segment when the URG flag is set.

Options field is an optional field. That is, this field does not have to be present in the TCP header. When present, this field has a length of a multiple of 8 bits.

As described above, some embodiments specify specific information in particular fields of a TCP header to achieve different functionalities than the functionalities provided by the standard TCP header. The next several figures illustrate specifying specific information in particular fields of a TCP header.

Figure 10:
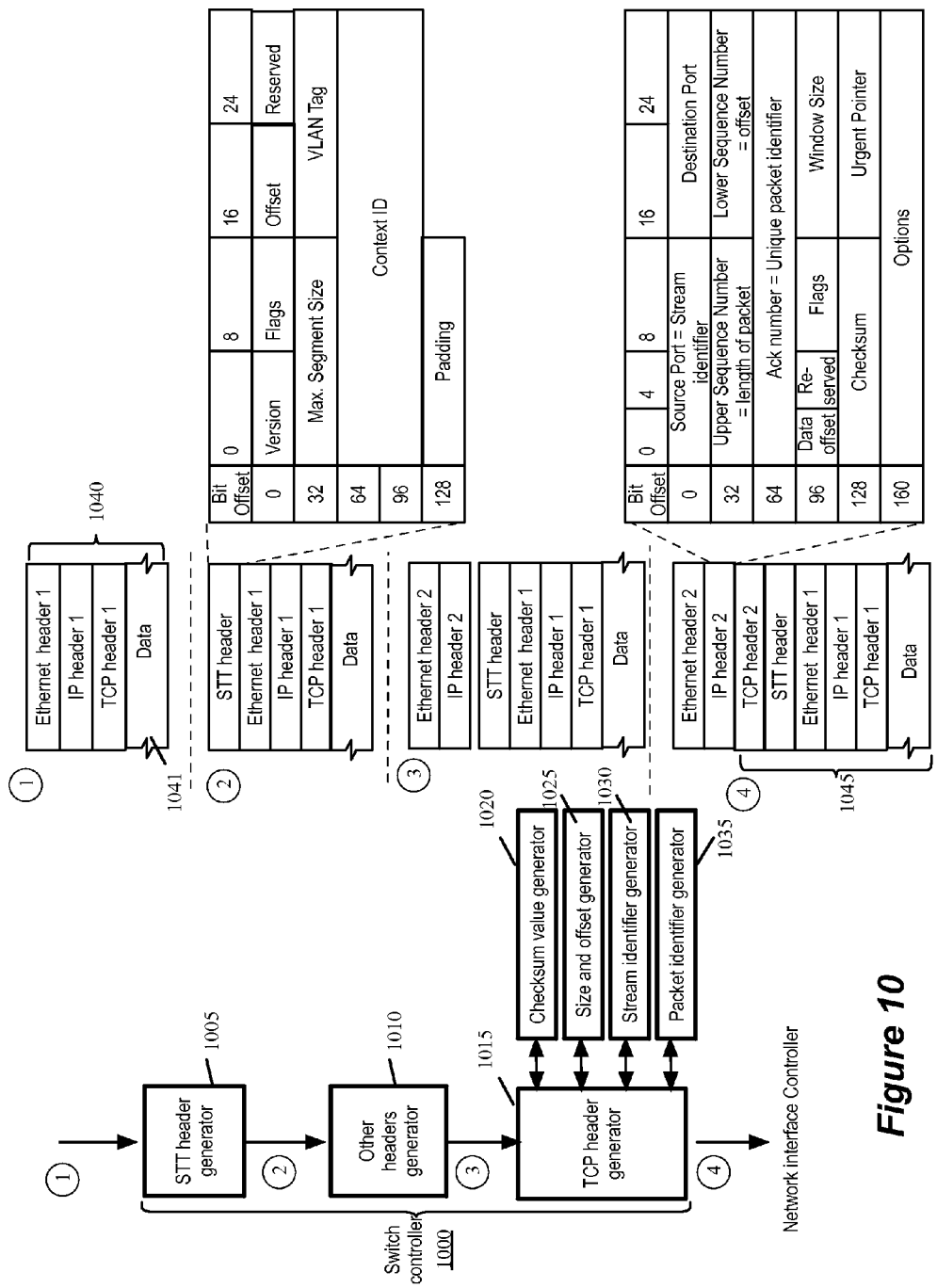
FIG. 10 conceptually illustrate that a switch controller on the transmit side of a tunnel.

FIG. 10 conceptually illustrate that a switch controller on the transmit side of a tunnel. Specifically, this figure illustrates that a switch controller 1000 generates headers and encapsulates a data packet 1040 with the generated headers in order to send the packet 1040 through a tunnel defined by the generated headers. This figure illustrates an STT header generator 1005, other headers generator 1010, and a TCP header generator 1015 of the switch controller 1000.

The switch controller 1000 is part of a network switch that is similar to the switches 105 and 201 described above by reference to FIGS. 1 and 2. The switch also includes a NIC 1200, which will be described further below by reference to FIG. 12. The switch is on the transmit side of the tunnel. That is, the switch sends an encapsulated packet to the other end of the tunnel. The other end of the tunnel is referred to as the receive side. In some embodiments, the switch sends packets to the other end without performing handshaking process.

The switch controller 1000 receives a data packet from a source. The source may be any of a switch, a router, a workstation, a server, a virtual machine, or any device that can transmit and/or receive data packets. The switch sends data packets from the source to the destinations specified in a protocol header of the received packet. To send the packets to the specified destinations, the switch may have to send the packets to another switch. The switch in some embodiments sends the received packets to the anther switch using a tunnel. As shown, the switch controller 1000 in some embodiments uses the STT header generator 1005, the other headers generator 1010, and the TCP header generator 1015 to generate headers to encapsulate the received packet 1040.

The received packet 1040 is similar to the data packet 215 described above by reference to FIG. 2. The received packet 1040 in some embodiments includes a header for a data link layer of the OSI model, a header for a network layer of the OSI model, a header for a transport layer of the OSI model. For instance, the received packet 1040 includes Ethernet header 1, IP header 1, and TCP header 1 that precedes data 1041 as shown. The received packet 1040 is an Ethernet frame with the IP header 1, the TCP header 1, and the data 1041 as a payload. These headers are used on the transmit side to deliver the frame to the destination specified in these headers.

The STT header generator 1005 generates an STT header. An STT header carries information that the switch controller on the receive side uses. An STT header includes the following several fields. As shown, an STT header includes an 8-bit version number field, which the STT header generator 1005 specifies a version number of the STT protocol. An STT header includes an 8-bit flags field in which the STT header generator 1005 specifies information about the packet that the STT header will encapsulate. Specifically, the first bit of the flags field specifies whether the checksum for the encapsulated packet has been verified to be correct or not. A value for this bit is to be specified by the switch controller on the transmit side when the switch controller on the transmit side verifies the checksum for the encapsulated packet. The second bit of the flags field specifies whether the checksum for the encapsulated packet has not been computed and contains only a checksum for the encapsulating IP header. This field is required if the NIC on the transmit side performs packet segmentation on the encapsulated packet. The third bit of the flags field specifies the version of the network link layer protocol header (e.g., an IP header) of the encapsulated packet. For instance, the third bit may indicate whether the header is of IPv4 or Ipv6. The fourth bit of the flags field specifies the type of the transport layer protocol header (e.g., a TCP header) of the encapsulated packet. For instance, the fourth bit may indicate whether the header is of TCP or UDP. In some embodiments, the last four bits of the flags field are reserved for specifying other information regarding the encapsulated packet.

An STT header includes an 8-bit offset number field in which the STT header generator 1005 specifies an offset of a header of the transport layer (i.e., L4) of the OSI model (e.g., TCP, UDP, etc.) from the start of the packet that is encapsulated by the STT header. The header of the transport layer protocol is a header of the encapsulated packet. In some cases, a header of the network layer (i.e., L3) of the OSI model for the encapsulated packet has a variable length. By specifying the offset for the L4 header of the encapsulated packet, the STT header generator 1005 allows the switch controller on the receive side to find the headers of the encapsulated packet without parsing the headers of the encapsulated packet.

An STT header also has an 8-bit reserved field. The STT header generator 1005 of some embodiments specifies zero in the reserved field. An STT header includes a 16-bit maximum segment size field. In the maximum segment size field, the STT header generator 1005 specifies the size into which the encapsulated packet should be divided if the packet needs segmentation. An STT header includes a VLAN tag field. As known in the art, a VLAN tag is a piece of data that is placed in between the fields of a protocol header in order to distinguish packets that belong to different VLAN segments. The STT header generator 1005 specifies a VLAN tag in the VLAN tag field. The VLAN tag that is specified in the VLAN tag field is used by the switch on the receive side when the switch on the receive side decapsulates the packet and sends out to the network toward the destination of the decapsulated packet.

An STT header also includes a 64-bit context ID field in which the STT header generator 1005 specifies a value that uniquely identifies a network flow behavior. A network flow behavior defines a rule for deciding what to do with a unit of network information when that unit arrives in a node on the network. An STT header also includes a 16-bit padding field, which provides proper alignment for the headers of the encapsulated packet. Specifically, the two bytes (16 bits) of padding help the headers of the encapsulated packet get aligned in multiples of four bytes because the Ethernet header of the encapsulated packet has 14 bytes. The STT header generator 1005 may use this padding field to store other information for future versions of the STT protocol.

In some embodiments, an STT header can encapsulate any type of packet. However, only certain types of packets (e.g., a TCP packet) can utilize the NIC's capabilities to perform offloadable tasks. When the encapsulated packet is of such type, an STT header includes additional information. This additional information will be used by the receive side switch when the receive side switch decapsulates the packet and sends it to the network toward the destination of the packet. In some cases when the switch controller on the transmit side does not take advantage of the NIC's capabilities to perform offloadable tasks, the STT header does not have to encapsulate only certain types of packets. Also, the STT header generator 1005 does not have to specify values for the flags field, the L4 offset field, the maximum segment size field and VLAN tag field.

The other headers generator 1010 in some embodiments generates a header for a data link layer of the OSI model and a header for a network layer of the OSI model. For instance, the other headers generator 1010 generates Ethernet header 2 and IP header 2. The switch controller 1000 prepends the generated headers to the received packet 1040. These two headers include information that identifies the opposite end of a tunnel. With this information, the switches and routers of the delivery network that the packet will traverse direct the packet to the other end of the tunnel.

The TCP header generator 1015 in some embodiments generates TCP header 2 and populates the fields of the TCP header 2 with specific information. As described above, some of the specific information is interpreted by the switch controller of the receive side in non-standard way to obtain certain results. In the source port field of the TCP header 2, the TCP header generator 1015 specifies a stream identifier. The stream identifier identifies a stream of data packets to which the packet 1040 belongs. The switch controller of the receive side may use this stream identifier for load balancing in Receive Side Scaling (RSS) and Link Aggregation Control Protocol (LACP) processing. RSS and LACP will be described further below. The TCP header generator 1015 in some embodiments uses the stream identifier generator 1030 to generate the stream identifier based on the information included in the headers of the packet 1040. For instance, the stream identifier generator 1030 uses the IP addresses in the IP header 1 and source and destination port numbers in the TCP header 1. In some embodiments, the stream identifier generator 1030 takes a hash value of such information and uses the hash value as the stream identifier. In some embodiments, the stream identifier value ranges between 32,768 and 65,535.

In the destination port field of the TCP header 2, the TCP header generator 1015 specifies a port number of the destination. Thus, the value in this field will be used as the destination port number in accordance with the standard. The switch controller on the receive side will use this value to identify protocol traffic.

In some embodiments, the TCP header generator 1015 divides the sequence number field of the TCP header 2 into two 16-bit sub-fields. The upper 16 bits will represent the combined length of the STT header and the packet 1040, which is the original Ethernet frame to be encapsulated by the TCP header 2. The lower 16 bits will represent the offset. When the original Ethernet frame is segmented into smaller frames, the TCP header 2 will be replicated and a replicate header will be prepended to each smaller frame. The lower 16 bits of this field in each replicate header will represent the offset of the data that is segmented and included in the smaller frame. The TCP header generator 1015 will limit the length value to the upper 16 bits to avoid overlap with the offset value that occupies the lower 16 bits of the sequence number field. In some embodiments, the TCP header generator 1015 uses the size and offset generator 1025 to initialize these two sub-fields. The size and offset generator 1025 sets the length in the upper sub-field and sets the lower sub-field to zero. The NIC will increment the value in the lower sub-field in each replicate header by the cumulative length.

In the acknowledgement field of the TCP header 2, the TCP header generator 1015 in some embodiments specifies a packet identifier value that uniquely identifies the original Ethernet frame (i.e., the packet 240). The NIC will copy this verbatim onto each replicate header when the NIC segments the original Ethernet frame into smaller frames. The switch on the receive side will not combine any packets with different packet identifiers. In some embodiments, the TCP header generator 1015 uses a packet identifier generator 1035 to generate the packet identifier. In some embodiments, the packet identifier generator 1035 computes the packet identifier by adding Central Processing Unit Identification (CPU ID) and per-CPU counter.

In the data offset field, the TCP header generator 1015 specifies the size of the TCP header 2 with or without options. The switch on the receive side will use the value in this field in accordance with the standard. In the reserved field, the TCP header generator 1015 puts zero in accordance with the standard. The receive side will not check this field. The TCP header generator in some embodiments does not turn on the six one-bit flags in the flags field of the TCP header 2 except the ACK control bit. However, the receive side will not check these flags. The TCP header generator in some embodiments specifies a value (e.g., 65,535) in the window size field of the TCP header 2. The receive side will not check this value.

In the checksum field of the TCP header 2, the TCP header generator 1015 specifies a checksum value of the overall packet. The overall packet is a packet (or an Ethernet frame) that encompasses the encapsulating headers (i.e., Ethernet header 2, IP header 2, and TCP header 2) and the encapsulated packet (i.e., Ethernet header 1, IP header 1, TCP header 1, and the data 1041). The TCP header generator 1015 in some embodiments does not generate checksum value for the encapsulated packet 1040. The switch controller on the receive side will not verify the checksum value for the encapsulated packet 1040. The TCP header generator 1015 in some embodiments uses the checksum value generator 1020 to generate the checksum value of the overall packet using some of the fields of the IP header 2. These fields of the IP header 2 include source and destination IP address fields and a TCP length field. The NIC will copy this checksum value into each replicate header. The NIC will also compute checksum values for the smaller frames when the NIC segments the original Ethernet frame into smaller frames.

The TCP header generator 1015 in some embodiments sets the urgent pointer of the TCP header 2 to zero. The receive side does not check this field. The TCP header generator in some embodiments includes options field in the TCP header 2 but does not set any values in the field. In these embodiments, the size of the TCP header 2 will include the size of the options field. The overall packet 1045 in some embodiments is an Ethernet frame that the switch controller 1000 sends to the NIC of the switch on the transmit side.

An example operation of the switch controller 1000 will now be described. The switch receives the packet 1040 from a source. The switch controller 1000 inspects the headers of the packet 1040 in order to figure out where to send this packet. The switch controller 1000 determines that it needs to send the packet 1040 to a second switch. The switch controller 1000 establishes a tunnel through which to send the packet to the second switch. The switch that includes the switch controller 1000 is thus on the transmit side and the second switch is the switch on the receive side.

To send the packet 1040 through the tunnel, the switch controller 1000 starts to prepare headers to encapsulate the received packet 1040. Using the STT header generator, the switch controller 1000 generates the STT header and prepends it to the packet 1040. The switch controller 1000 may use the outputs of the other headers generator 1010 and TCP header generator 1015 to populate some of the fields (e.g., the 8-bit offset number field) in the STT header. The switch controller 1000 then uses the other headers generator 1010 to generate the Ethernet header 2 and IP header 2. The other headers generator 1010 uses the information about the switch and the second switch to generate these two headers. In some embodiments, the other headers generator 1010 retrieves such information from a table (not shown) that the switch controller 1000 maintains.

Next, the switch controller 1000 uses the TCP header generator 1015 to generate the TCP header 2 and to set values for the fields of the TCP header 2. The TCP header generator 1015 in turn uses the checksum value generator 1020 to generate a checksum value for the overall packet. The checksum value generator 1020 uses the values specified in the source and destination IP address fields and the TCP length field of the IP header 2 to generate the checksum value for the overall packet.

The TCP header generator 1015 uses the size and offset generator 1025 to generate the size of the packet 1040 and the initial offset value, which is zero. The TCP header generator specifies the size in the upper 16 bits of the sequence number field of the TCP header 2. The TCP header generator 1015 sets the lower 16 bits of the sequence number field of the TCP header 2 to zero. The TCP header generator 1015 then uses stream identifier generator 1030 to generate a value that identifies the stream to which the packet 1040 belongs. The stream identifier generator 1030 takes a hash of the IP addresses and source and destination port numbers in the TCP header 1. The TCP header generator 1015 specifies the hash value in the source port field of the TCP header 2. The TCP header generator 1015 then uses the packet identifier generator 1035 to generate a packet identifier that uniquely identifies the packet 1040. The packet identifier generator 1035 in some embodiments uses the CPU ID of the CPU of the switch on the transmit side and the per-CPU counter value at the moment to generate a value. The TCP header generator 1015 specifies the generated value in the acknowledgement field of the TCP header 2.

The switch controller encapsulates the packet 1040 with the headers it generated by prepending the headers to the packet 1040. The headers and the packet 1040 make up the overall packet that the switch controller 1000 sends to the NIC of the switch of the transmit side.

Figure 11:
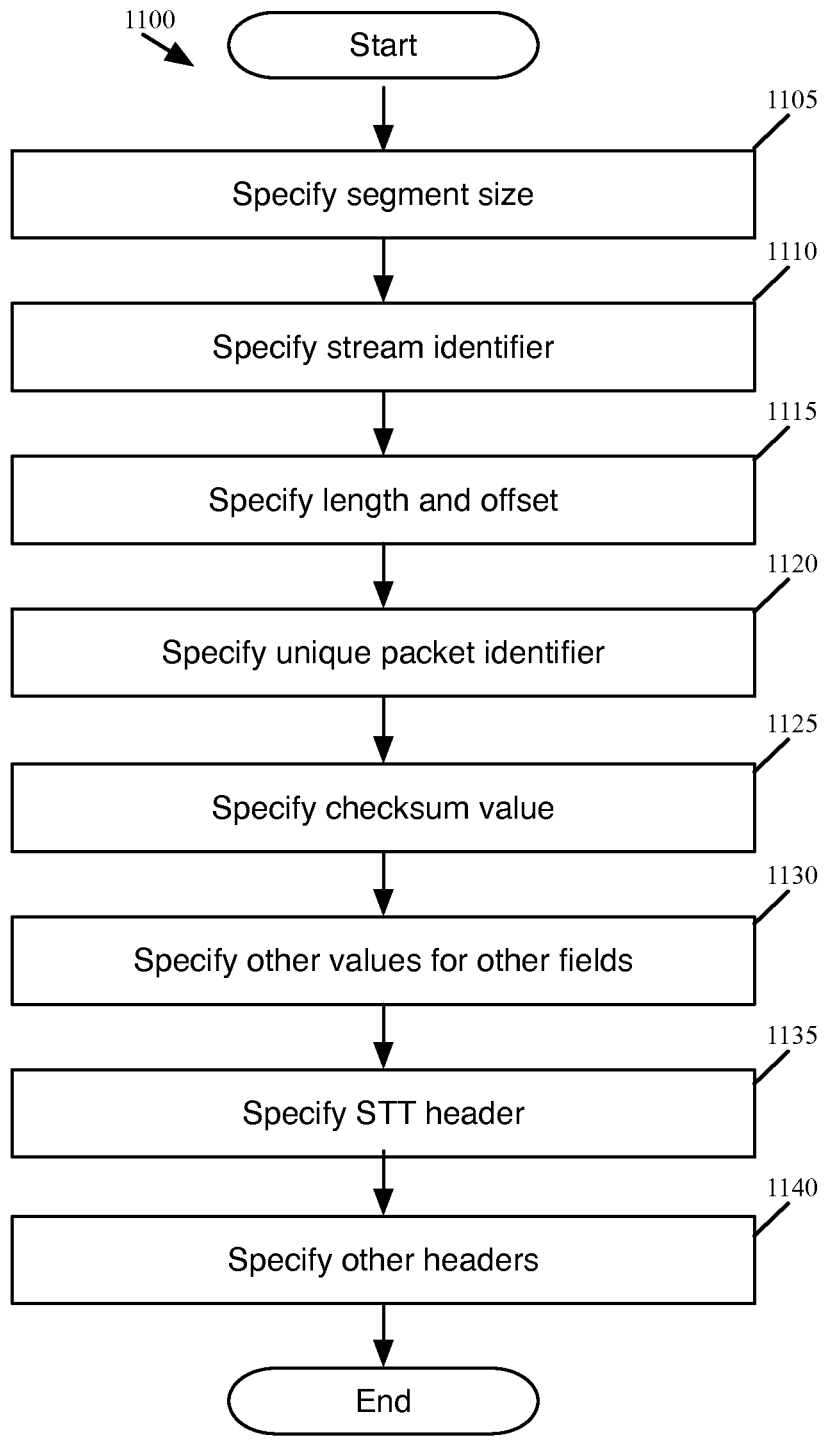
FIG. 11 conceptually illustrates a process of some embodiments for generating headers to encapsulate a data packet.

FIG. 11 conceptually illustrates a process 1100 of some embodiments for generating headers to encapsulate a data packet before sending the encapsulated packet to a NIC for further processing. Process 1100 in some embodiments is performed by a switch controller of a switch on a transmit side such as the switch controller 1000 described above by reference to FIG. 10. The switch includes the switch controller and the NIC. In some embodiments, the process starts when the switch receives a data packet to send to a destination through a tunnel. The received packet in some embodiments is an Ethernet frame having an Ethernet header and a payload. The payload of the Ethernet frame in these embodiments includes an IP header, a TCP header, and data. The process begins by specifying (at 1105) segment size for the smaller packets into which the NIC to segment the received packet. That is, the process specifies (at 1105) the size of each smaller packet for the NIC to use when the NIC breaks the received packet into smaller packets. As described above, the NIC breaks the received packet into smaller packets in order to keep the packet sizes within the maximum transmission unit (MTU) of a protocol. The protocol is of a layer in the OSI model. The MTU of the protocol specifies the largest protocol data unit that the layer can pass onwards.

Next, the process specifies (at 1110) a stream identifier to which the received packet belongs. The process in some embodiments uses information included in the IP header and the TCP header of the received packet to generate a value. For instance, the process uses the IP addresses in the IP header and source and destination port numbers in the TCP header. In some embodiments, the process takes a hash value of such information and uses the hash value as the stream identifier. In some embodiments, the stream identifier value ranges between 32,768 and 65,535. The process specifies (at 1110) in the source port field of a TCP header that the process generates to encapsulate the received packet.

The process then specifies (at 1115) length and offset values in the encapsulating TCP header. In some embodiments, the process divides the sequence number field of the TCP header into two 16-bit sub-fields. The upper 16 bits will represent the total length of the encapsulated packet. The lower 16 bits will represent the offset. When the NIC of the transmit side switch segments the encapsulated packet into smaller frames, the NIC will replicate the encapsulating TCP header and prepend a replicate header to each smaller frame. The lower 16 bits of this field in each replicate header will represent the offset of the data that is segmented and included in the smaller frame. The process limits the length value to the upper 16 bits to avoid overlap with the offset value that occupies the lower 16 bits of the sequence number field. In some embodiments, the process initializes these two sub-fields. The process sets the sequence number to be the length in the upper sub-field and sets the lower sub-field to zero. The NIC will increment the value in the lower sub-field in each replicate header by the cumulative length when the NIC segments the original Ethernet frame into smaller frames.

Process 1100 specifies (at 1120) a packet identifier value in the acknowledgement field of the encapsulating TCP header that uniquely identifies the received packet. The NIC will copy this verbatim onto each replicate header when the NIC segments the received packet into smaller packets. The switch on the receive side will not combine any packets with different packet identifiers. In some embodiments, the process computes the packet identifier by adding Central Processing Unit Identification (CPU ID) and per-CPU counter for the CPU of the switch on the transmit side.

Next, the process specifies (at 1125) a checksum value of the overall packet in the checksum field of the encapsulating TCP header. The overall packet is a packet that encompasses any encapsulating headers, including the encapsulating TCP header, and the encapsulated packet, which includes one or more headers. The process in some embodiments does not generate checksum value for the encapsulated packet (i.e., the received packet). The switch controller on the receive side will not verify the checksum value for the encapsulated packet. The process in some embodiments generates the checksum value of the overall packet using some of the fields of an IP header that the process generates and prepends to the encapsulating TCP header. These fields of the IP header include source and destination IP address fields and a TCP length field. The NIC will copy this checksum value into each replicate header. The NIC will also compute checksum values for the smaller frames when the NIC segments the original Ethernet frame into smaller frames.

The process then specifies (at 1130) other values in other fields of the encapsulating TCP header. For instance, the process specifies a port number of the destination in the destination port field of the encapsulating TCP header. The switch controller on the receive side will use this value to identify protocol traffic. The process in some embodiments sets the urgent pointer of the encapsulating TCP header to zero. The receive side does not check this field. The process in some embodiments does not specify any option values in the options field of the encapsulating TCP header.

Next, the process specifies (at 1135) an STT header. The process specifies in the STT header information that the switch controller on the receive side uses. For instance, the process includes a 64-bit value that specifies a context identifier in the STT header. The context identifier uniquely identifies a network flow behavior. The process in some embodiments also includes other data in the STT header. Those other data are described above by reference to FIG. 10.

Next, the process specifies (at 1140) other headers. The process in some embodiments prepends these headers to the encapsulating TCP header. The process in some embodiments generates a header for a data link layer of the OSI model and a header for a network layer of the OSI model. For instance, the process generates an Ethernet header and an IP header. The process prepends the generated headers to the encapsulating TCP header. The Ethernet header and the IP header include information that identifies the opposite end of a tunnel. With this information, the switches and routers of the delivery network that the packet will traverse direct the packet to the other end of the tunnel.

Figure 12:
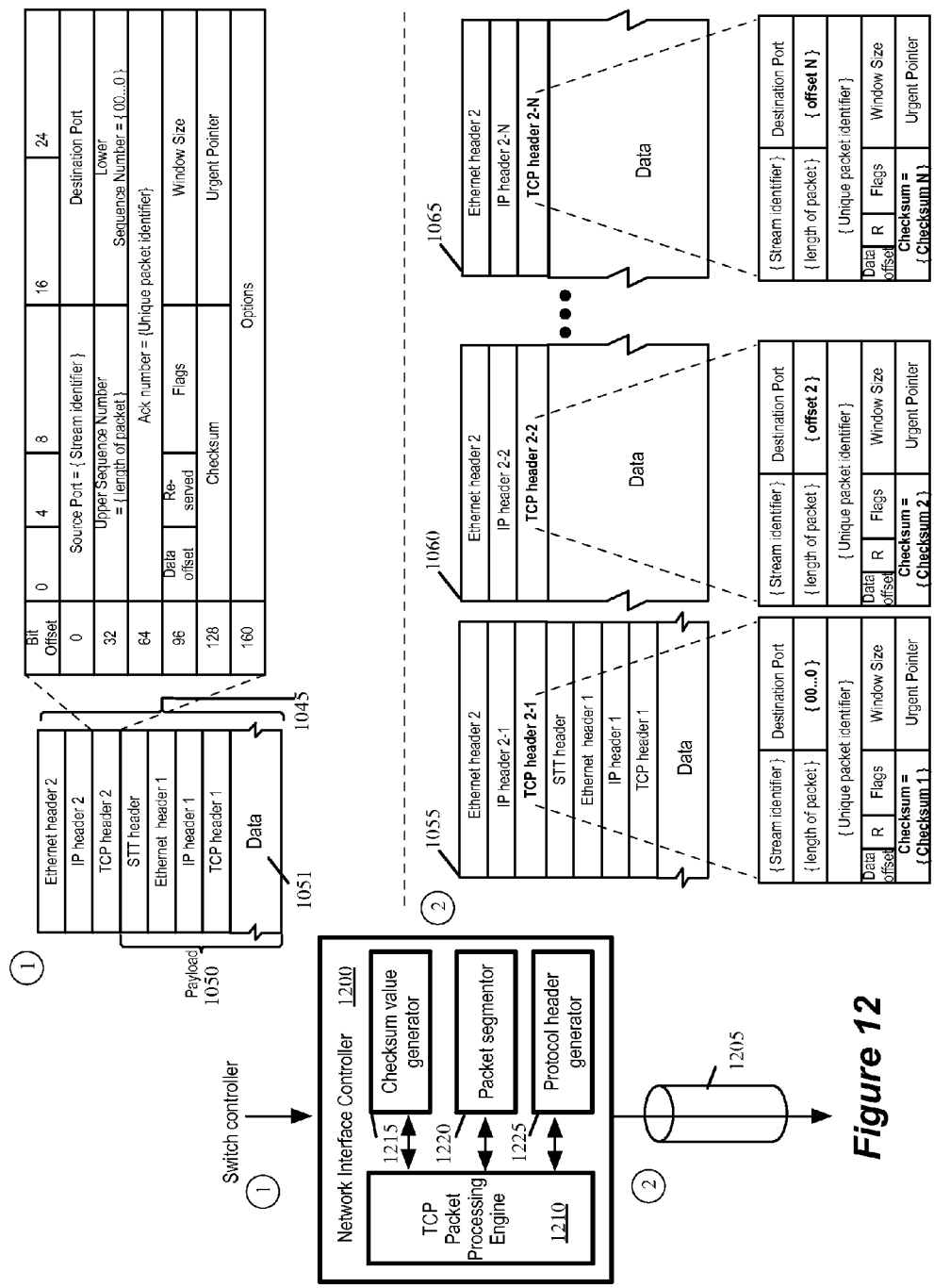
FIG. 12 conceptually illustrates that a NIC of a switch on the transmit side performs offloadable tasks that it is capable of performing.

FIG. 12 conceptually illustrates that a NIC of a switch on the transmit side performs offloadable tasks that it is capable of performing. The NIC performs these tasks in order to process further a data packet that is processed by a switch controller of the switch on the transmit side. Specifically, this figure illustrates that a NIC 1200 performs packet segmentation and checksum value generation for the packet 1045. The switch on the transmit side includes the switch controller 1000 and the NIC 1200. The switch controller 1000 and the NIC 1200 together process the packet 1040 to send it to a destination through a tunnel 1205. That is, the switch controller 1000 and the NIC 1200 encapsulates the packet 1040 with appropriate headers such that the delivery network delivers the packet to the destination using the control information included in the encapsulating headers. As shown, this figure illustrates that the NIC 1200 includes a TCP packet processing engine 1210, a checksum value generator 1215, a packet segmentor 1220, a protocol header generator 1225.

The packet 1045 is a packet that NIC 1200 receives from the switch controller 1000 described above by reference to FIG. 10. The Ethernet header 2, the IP header 2, and the TCP header 2 are prepended to payload 1050 of the packet 1045. The payload 1050 includes the STT header, the Ethernet header 1, the IP header 1, the TCP header 1, and the data 1041. The delivery network that delivers the packet 1045 to the switch on the receive side of the tunnel treats the payload 1045 as payload of the packet 1045. That is, the delivery network does not use information or data specified in the payload 1045 in order to deliver the packet 1045.

The TCP packet processing engine 1210 uses the checksum value generator 1215, a packet segmentor 1220, a protocol header generator 1225 to perform the offloadable tasks that are offloaded to the NIC from the switch controller 1000. The packet segmentor 1220 segments the packet 1045 into smaller packets so that these packets can be carried over the delivery network that requires an MTU size that is smaller than the packet 1045. The packet segmentor 1220 divides the payload 1050 into N segments. N is a number of the smaller packets into which the packet 1045 needs to be segmented in order to meet the MTU size of the delivery network. In some embodiments, the switch controller 1035 specifies a size smaller than or equal to the MTU size and directs the NIC 1200 to segment the packet 1045 in the specified size. For instance, when the payload 1050 is about 64 kilobytes long and the MTU size of the delivery network is 1500 bytes, the switch controller 1000 specifies the size of each smaller packet to be less than or equal to 1500 bytes long. Accordingly, the packet segmentor 1220 will break the payload 1050 into five packets. In some embodiments, the packet segmentor 1220 sets the PSH bit of the flags field of the last smaller packet. When the smaller packets are received by the switch on the receive side of the tunnel, this flag causes the accumulated packets in buffers to be flushed. Asserting the flag therefore improves performance by preventing reordering of the packets. Otherwise, the ACK number which will be changing may cause confusion on the receive side and cause the switch on the receive side to hold onto older packets longer than it holds the newer ones while waiting for additional segmented packets.

As shown, the packet segmentor 1220 put the STT header, the Ethernet header 1, the IP header 1, and the TCP header 1 in the smaller packet 1055, which is the first packet of the smaller packets 1055 through 1065 that are segmented from packet 1045. The packet segmentor 1220 put these headers in the smaller packet 1055 because those headers are part of the payload 1050 of the packet 1045 and the size of the headers combined is not bigger than 1500 bytes. The size of the headers is in tens of bytes. However, when the collective size of these headers is bigger than the MTU size of the delivery network or the size specified by the switch controller 1000, these headers will be segmented into different smaller packets.

The protocol header generator 1225 generates a header for each smaller packet that is segmented from the payload 1050. In some embodiments, the protocol header generator 1225 replicates the TCP header 2 for each of the smaller packets 1055 through 1065. The replicate TCP headers are TCP headers 2-1 through 2-N. The protocol header generator 1225 also increments the offset value specified in each of the TCP headers 2-1 through 2-N. The offset value for a smaller packet indicates the location of its payload from the beginning of the payload 1050 of the packet 1045 from which the smaller packet is segmented. In other words, the offset value for a smaller packet indicates the amount the payload that has been included in the previous smaller packets. For instance, the protocol header generator 1225 specifies 1461 in the TCP header 2-2 when the smaller packet 1055 includes the first 1460 bytes of the payload 1050 of the packet 1045. The protocol header generator 1225 specifies zero as offset value in the TCP header 2-1 of the first smaller packet 1055 because the data that the smaller packet 1055 includes is a beginning portion of the payload 1050 and the offset value initialized by the size and offset generator 1025 is zero. As shown, the protocol header generator 1225 does not change values of any fields in the replicate TCP headers except the offsets and the checksum values, which the checksum value generator 1215 computes and specifies as will be described below.

The protocol header generator 1225 also generates an Ethernet header and an IP header for each of the data packets 1055 through 1065. The protocol header generator 1225 replicates the Ethernet header 2 for each of the data pieces. The protocol header generator 1225 generates a different IP header for each of the data packets because an IP header includes a length field that specifies the length of its payload. The length of the payload under the IP header, which is the length of the data packet, may be different for each of the data packets 1055 though 1065. The lengths of the data packets may be different because the length of the payload 1050 of the TCP packet may not be a multiple of the size that the switch controller 1000 had specified as a maximum.

The TCP packet processing engine 1210 uses the checksum value generator 1215 to generate a checksum value for each of the smaller packets 1055 through 1065. These checksum values are for validating the fidelity of the payloads that these smaller packets carry. In order to compute these checksum values, the checksum value generator 1215 also uses the checksum values that the checksum value generator 1020 of the switch controller 1020 generated. When the receive side switch receives these smaller packets, the switch will compute checksum values for the smaller packets to validate the packets. As shown, the replicate TCP headers 2-1 through 2-N have their own checksum values, checksum 1 through N.

An example operation of the switch on the transmit side will now be described. The NIC 1200 receives the packet 1045 processed by the switch controller 1000. In this example, the size of the packet 1045 is bigger than the delivery network's MTU size. The switch controller 1000 has also specified a size for a smaller packet into which to break the packet 1045. The NIC 1200 segments the packet 1045 to conform to the specified size. The size of the payload 1050 of the packet 1045 is 64 kilobytes and the size specified by the switch controller 1000 is 10 kilobytes in this example. Therefore, the NIC 1200 segments the payload 1050 of the packet 1045 into seven smaller packets. The protocol header generator 1225 replicates the TCP header 2 of the packet 1045 and adds a replicate TCP header to each of the seven smaller packets 2-1 through 2-N with N being 7. The checksum value generator 1245 generates a checksum value for each of the smaller packets. The NIC 1200 places the STT header, the Ethernet header 1, the IP header 1, and the TCP header 1 in the first smaller packet 1055 as part of payload of the smaller packet 1055. The NIC 1200 sends the smaller packets using the information specified in each of the headers 2-1 to 2-N without using the information specified in the Ethernet header 1, the IP header 1, and the TCP header 1.

Having described switch controllers and NICs of switches on the transmit sides of tunnels, the following Section II will now describe NICs and switch controllers of switches on the receive sides of tunnels.

II. Receive Side Switch

As described above, a switch controller of a switch on a transmit side of a tunnel in some embodiments finds out offloadable tasks that a NIC of the switch is capable of performing. The switch controller on the transmit side then performs those tasks that the NIC cannot perform before sending down processed packets to the NIC on the transmit side. On the other hand, a switch controller of a switch on a receive side of a tunnel performs tasks that a NIC of the switch on the receive side did not perform. This is because the NIC on the receive side receives the packets from the transmit side and processes them before the switch controller on the receive side does.

Figure 13:
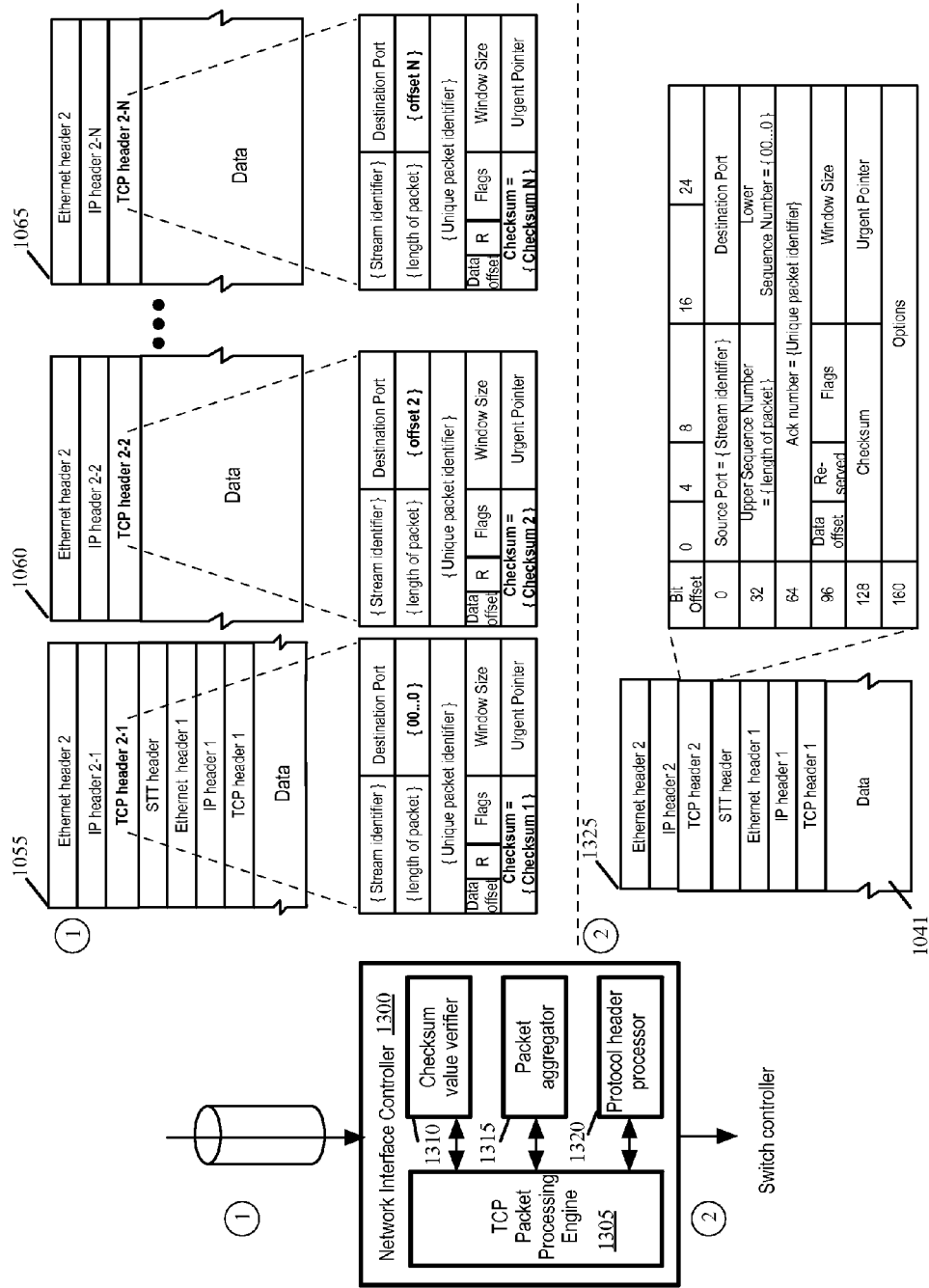
FIG. 13 conceptually illustrates that a NIC of a switch on the receive side of a tunnel performs offloadable tasks that it is capable of performing.

FIG. 13 conceptually illustrates that a NIC of a switch on the receive side of a tunnel performs offloadable tasks that it is capable of performing. The NIC performs these tasks on a set of packets the NIC receives before passing the results of its processing to a switch controller of the switch on the receive side. The NIC and the switch controller on the receive side reassembles an encapsulated packet from the set of packets. This figure illustrates that a NIC 1300 of a switch on the receive side performs a set of offloadable tasks the NIC is capable of performing in order to processes the packets 1055 through 1065 the NIC receives. The packets 1055 through 1065 are the outcome of the processing performed by the switch controller 1000 and the NIC 1200 on the transmit side of the tunnel as described above by reference to FIGS. 10 and 12.

As shown, the NIC 1300 in some embodiments includes a TCP packet processing engine 1305, a checksum value verifier 1310, a packet aggregator 1315, and a protocol header processor 1320. The TCP packet processing engine 1305 performs offloadable tasks on the received packets 1055 through 1065 using the checksum value verifier 1310, the packet aggregator 1315, and the protocol header processor 1320.

The checksum value verifier 1310 reads the data in each received packet and computes a checksum value using the same rule that the checksum value generator 1215 of the NIC 1200 on the transmit side used to generate a checksum value. The checksum value verifier 1310 then compares the value it generated with the value specified in the TCP header of the received packet. If the values match, then the fidelity of the data in the packet is validated. Otherwise, the data of the packet is deemed corrupted and will be discarded. The checksum value verifier 1310 also verifies the checksum values for the validity of the IP headers 2-1 through 2-N. When the checksum value verifier 1310 determines that any of the IP headers are corrupted, it will also discard the packet containing the corrupted headers.

The protocol header processor 1320 parses (i.e., extracts information from) the replicate TCP headers 2-1 through 2-N of the received packets 1055 through 1065. The protocol header processor 1320 then prepares the TCP header 2 that will be the header of the packet 1325 that will be reassembled by the packet aggregator 1315. The protocol header processor 1320 also sorts out and groups the packets that have the same packet identifier values. The protocol header processor 1320 also inspects the control information (e.g., the MAC and IP addresses) included in the Ethernet header 2's and IP headers 2-1 through 2-N to ensure that these packets are supposed to be delivered to this switch that includes the NIC 1300. The protocol header processor 1320 strips these two headers off each received packet.

The packet aggregator 1315 aggregates the data in the received packets that has the same packet identifier values into a single larger packet 1325. That is, the packet aggregator 1315 does the opposite of what the packet segmentor 1220 does as described above by reference to FIG. 12. The packet aggregator 1315 uses the offset values in these packets to put together the payloads of these packets in the right order.

The packet 1325 is the outcome of the processing performed by the NIC 1300. The packet 295 includes the TCP header 2. As shown, the fields of the TCP header 2 includes the values that are generated and specified by the TCP header generator 1015 as described above by reference FIG. 10. The packet 1325 also includes the STT header, Ethernet header 1, the IP header 1, and the TCP header 1, and the data 1041. The NIC 1300 sends the reassembled packet 1325 to the switch controller of the switch on the receive side for further processing. The NIC 1300 uses the value specified in the destination port field of the TCP header 2 to find out that it is the switch controller to which the NIC 1300 should sent the packet.

An example operation of the NIC 1300 will now be described. The NIC 1300 receives the packets 1055 through 1065 as well as other packets (not shown). The TCP packet processing engine 1305 performs several offloading tasks using the checksum value verifier 1310, the packet aggregator 1315, and the protocol header processor 1320. The checksum value verifier 1310 validates the fidelity of the data in each of the received packets. The checksum value verifier 1310 also verifies that the IP headers 2-1 through 2-N are not corrupted. In this example, none of the received packets are corrupted and the checksum values computed by the checksum value verifier 1310 are identical to the checksum values specified in the TCP headers 2-1 through 2-N.

The protocol header processor 1320 extracts information from the replicate TCP headers (i.e., the TCP headers 2-1 through 2-N) of the received packets. The protocol header processor 1320 then prepares the TCP header 2 with the extracted information. The protocol header processor 1320 also groups the packets 1055 through 1065 together because those packets have the same packet identifier values. Then, the packet aggregator 1315 aggregates the packets 1055 through 1065 into a single packet 1325 using the offsets 1 through N and other information included in the TCP headers that are parsed by the protocol header processor 1310. The NIC 1300 sends the reassembled packet 1325 to the switch controller of the switch on the transmit side for further processing.

Figure 14:
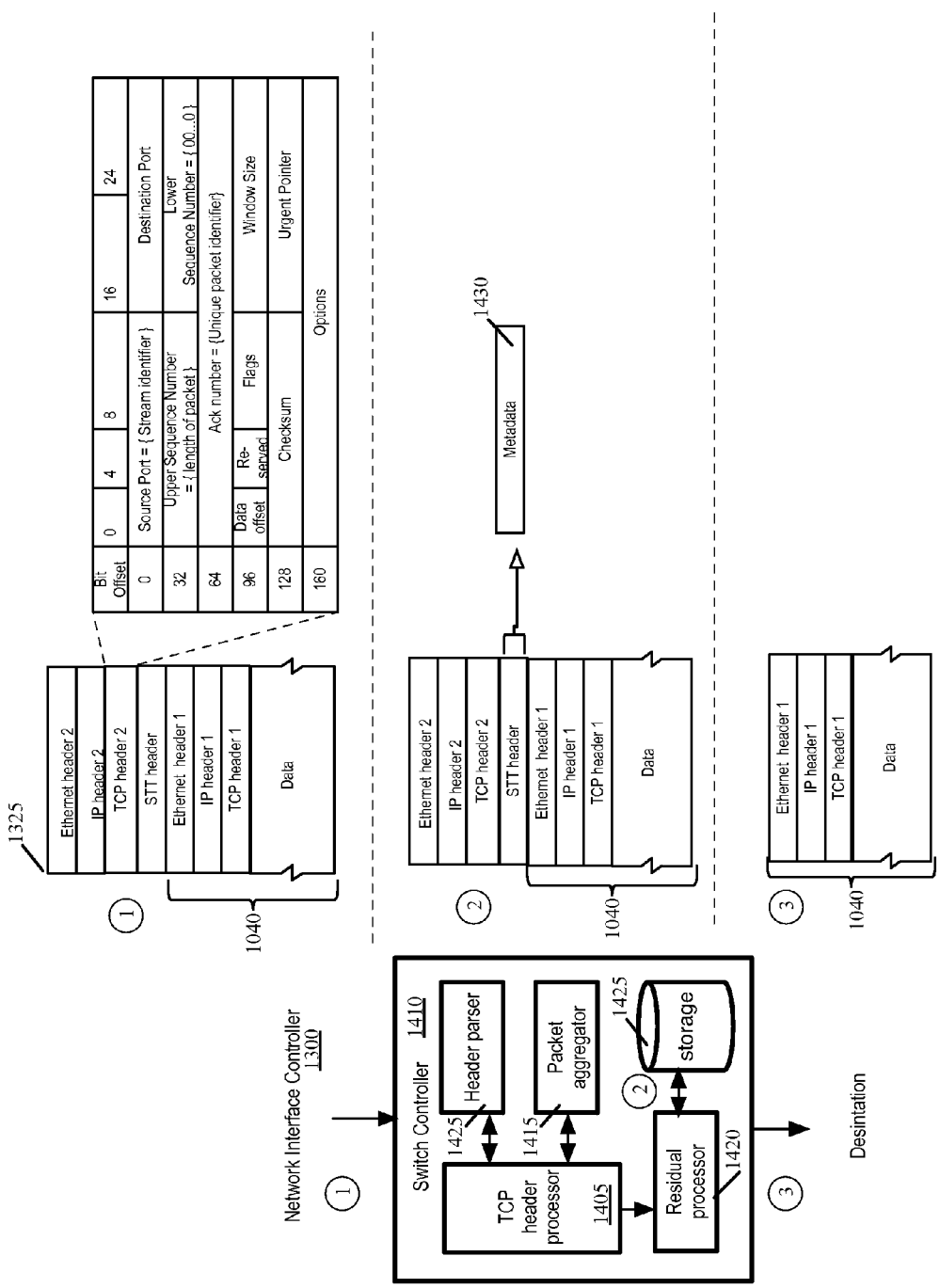
FIG. 14 conceptually illustrates a switch controller of a switch on the receive side of a tunnel that receives packets processed by a NIC of the switch and processes the packets further.

FIG. 14 conceptually illustrates a switch controller of a switch on the receive side of a tunnel that receives packets processed by a NIC of the switch and processes the packets further. Specifically, this figure illustrates that a switch controller 1400 of a switch on the receive side of a tunnel processes the packet 1325 that the switch controller receives from the NIC 1300 described above by reference to FIG. 13. This figure illustrates that the switch controller 1400 in some embodiments includes a TCP header processor 1405, a header parser 1410, a packet aggregator 1415, a residual processor 1420, and storage 1425.

The switch controller 1400 takes the outcome of the processing performed by the NIC 1300 and further processes the outcome in order to restore the encapsulated packet. The switch controller 1300 determines the tasks left to perform in order to restore the encapsulated packet. In some embodiments, the switch controller 1400 inspects the outcome to make the determination. For instance, the switch controller 1400 measures the size of a packet the switch controller receives from the NIC 1300. When the measured size is less than the size specified in the encapsulating TCP header of the packet, the switch controller determines that the packets have not been aggregated into the larger original packet. In some embodiments, the switch controller 1400 obtains information about the capabilities of the NIC 1300 from the driver of the NIC 1300.

The TCP header processor 1405 uses the header parser 1410 to parse the TCP header 2 of the packet 1325. The header parser 1410 reads and extracts the values specified in the fields of the TCP header 2. The header parser 1410 extracts the stream identifier value from the source port field of the TCP header 2. The header parser 1410 extracts the length of the original Ethernet frame that is encapsulated by the TCP header 2 from the upper 16 bits of the sequence number field of the TCP header 2. The header parser 1410 extracts the unique identifier that identifies the packet from the acknowledgement field of the TCP header 2. In some embodiments, the header parser 1410 does not extract values specified in the fields that will not be needed for processing the packet 1325 further. For instance, the header parser 1410 will not extract the window size value specified in the window size field of the TCP header 2. In other embodiments, the header parser extracts all values in the all fields of the TCP header 2 but the switch controller 1400 will ignore those values that are unnecessary in processing the packet 1325.

The packet aggregator 1415 aggregates the received packets to reassemble the original Ethernet frame when the reassembling has not been done. In this aspect, the packet aggregator 1415 functions similarly as the packet aggregator 1315, which does the opposite of what the packet segmentor 1220 does. The packet aggregator 1415 in some embodiments also verifies whether the packet 1325 is properly reassembled. For instance, the packet aggregator measures the size of the packet 1325 and compares the measured size with the size specified in the TCP header 2 (i.e., the size of the original Ethernet frame). When the size of the packet 1325 is smaller than the size specified in the TCP header 2, the packet aggregator 1415 determines that the packet 695 does not include all the data that it is supposed to include.

The residual processor 1420 performs several tasks that need to be performed to finalize the processing of the packets. For instance, the residual processor 1420 removes the encapsulating headers (e.g., Ethernet header 2, IP header 2, TCP header 2) from the reassembled packet and discards the header. In addition, the residual processor 1420 in some embodiments maps the STT header of the reassembled packet into metadata. The STT header is in a format that is independent from the operating system on which the switch controller is executing. The metadata is in a format that is suitable for the operating system on which the switch controller is executing. By mapping the header to the metadata, the residual processor 1420 converts format of data. Examples of such conversion include byte swapping and correctly setting offsets of packet headers. The residual processor 1420 uses the information specified in the STT header when mapping the STT header to the metadata. The residual processor 1420 in some embodiments checks the second bit of the flags field of the STT header. When the second bit indicates that the checksum value for the data of the encapsulated packet (i.e., the reassembled packet) was computed, the residual processor 1420 checks the first bit of the flags field to determine whether the checksum in the reassembled packet (i.e., the checksum in the TCP header 1) is verified to be correct or not. (Specifically, the first bit of the flags field specifies whether the checksum for the encapsulated packet has been verified to be correct or not.)

An example operation of the switch controller 1400 will now be described. The switch controller 1400 receives the packet 1325 from the NIC 1300. The switch controller 1400 determines that some of the offloadable tasks are already performed by the NIC 1300 by inspecting the packet 1325. The switch controller 1400 then skips checksum value verification and packet aggregation, which have already been performed by the NIC 1300 as described above by reference to FIG. 13. Then, the TCP header processor 1405 parses the TCP header 2 of the packet 1325 using the header parser 1410. The packet aggregator 1415 verifies that the packet 1325 is reassembled properly. The residual processor 1420 then maps some of the information specified in the TCP header 2 and the STT header of the packet 1325 to the metadata 1430. The residual processor 1420 arranges the Ethernet header 1, the IP header 1, and the TCP header 1 in a set of adjacent locations of the storage 1425 and the data 1041 of the encapsulated packet 1040 in another set of adjacent locations of the storage 1425 as shown. The switch controller 1400 then sends the restored packet 1040 to the destination using the control information specified in the headers of the packet 1040.

Figure 15:
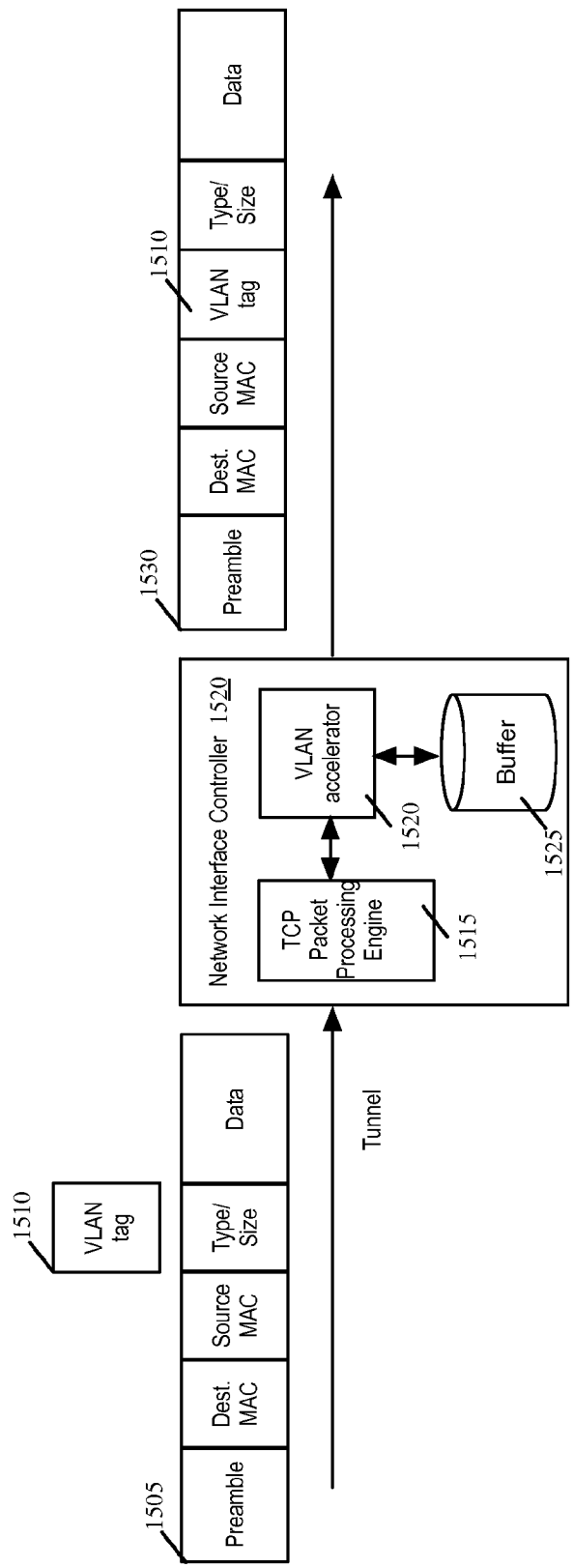
FIG. 15 conceptually illustrates that a NIC of a switch on the transmit side of a tunnel performs Virtual Local Area Network (VLAN) acceleration.

FIG. 15 conceptually illustrates that a NIC of a switch on the transmit side of a tunnel performs Virtual Local Area Network (VLAN) acceleration. Specifically, this figure illustrates that a NIC 1505 places a VLAN tag 1510 in between the fields of an Ethernet header 1505. As shown, the NIC 1500 includes a TCP packet processing engine 1515, a VLAN accelerator 1520, and a buffer 1525.

As known in the art, a VLAN tag is a piece of data that is placed in between the fields of a protocol header in order to distinguish packets that belong to different VLAN segments. In some cases, one or more VLAN tags need to be placed in between the fields of a protocol. Usually, network switches places VLAN tags in the headers of packets that the switches route. In order to place the tags in between the fields of a protocol, the switches first copy and place in a memory location a first set of fields that is before the tags being placed. The switches then copy the tags and place after the copied first set. Finally, the switches copy the second set of fields and place the second set after the tags. As such, it takes up CPU cycles and memory spaces of the switch to place VLAN tags in this manner. Thus, this affects the performance of the switch, especially when most of the functionalities of the switch are implemented in software (as opposed to, e.g., dedicated circuits).

Some NICs are capable of performing VLAN tagging. When the NIC of a switch is capable of placing VLAN tag in between fields of a protocol, the switch controller of a switch can offload this task to the NIC. As described above, a NIC is hardware (e.g., with circuits and memory space to perform specific tasks). Thus, a NIC can perform this task quicker than a switch controller, which may be implemented in software. Moreover, the computing resources such as CPU cycles and memory space are saved and the switch performance improves as a result. In this aspect, having the NIC to place the tags in between the fields of a protocol header "accelerates" the performance of a switch and is dubbed as "VLAN acceleration."

The Ethernet header 1505 is a typical Ethernet header known in the art. It includes a preamble field, a destination MAC field, a source MAC field, a type/size field, and data. The switch controller of the switch sends the Ethernet header and the VLAN tag 1510 to the NIC 1500 for the NIC to perform VLAN acceleration. The Ethernet header 1510 in some embodiment is part of a packet that the switch controller sends to the NIC 1500, such as the Ethernet header 2 of the packet 1045 described above by reference to FIG. 10.

The NIC 1500 is similar to the NICs 210 and 1200 described above by reference to FIGS. 2 and 12. The TCP packet processing engine 1515 is also similar to the TCP packet processing engine 275 and 1210. In addition, the TCP packet processing engine 1515 uses the VLAN accelerator 1520 to perform VLAN acceleration. The VLAN accelerator 1520 in some embodiments uses the buffer 1525 store and copy different data pieces of the Ethernet header 1505 and the VLAN tag 1510. The VLAN accelerator 1520 prepares an Ethernet header 1525 which includes the VLAN tag 1510 between its source MAC field and Type/Size field.

As described above, an STT header includes a VLAN tag field that stores a VLAN tag. When the packet encapsulated by an STT header arrives at a switch on the receive side of a tunnel, the switch on the receive side decapsulates the encapsulated packet and sends the packet to the network towards the destination of the decapsulated packet. When the NIC of the switch on the receive side is capable of performing VLAN acceleration, the VLAN tag that is included in the STT header is used by the NIC.

An example operation of the NIC 1500 will now be described. The NIC 1500 receives the Ethernet header 1505 and the VLAN tag 1510. The TCP packet processing engine then uses the VLAN tag 1510 to generate a new Ethernet header that will include the VLAN tag 1510 in between its fields. The VLAN accelerator 1520 first copies the preamble field, the destination MAC field, and the source MAC field into in a location of the buffer 1525. The VLAN accelerator then copies the VLAN tag in a location of the buffer 1525 that is adjacent to the source MAC field in order to append the tag 1510 to the end of the source MAC field. The VLAN accelerator then copies the type/size field and the data of the Ethernet header 1505 in a location of the buffer 1500 that is adjacent to the location to which the VLAN tag is copied. As a result, the buffer 1525 has an Ethernet header that includes a copy of the VLAN tag 1510 in between its fields. The TCP packet processing engine 1515 then prepends this new Ethernet header 1530 in place of the Ethernet header 1505.

Figure 16:
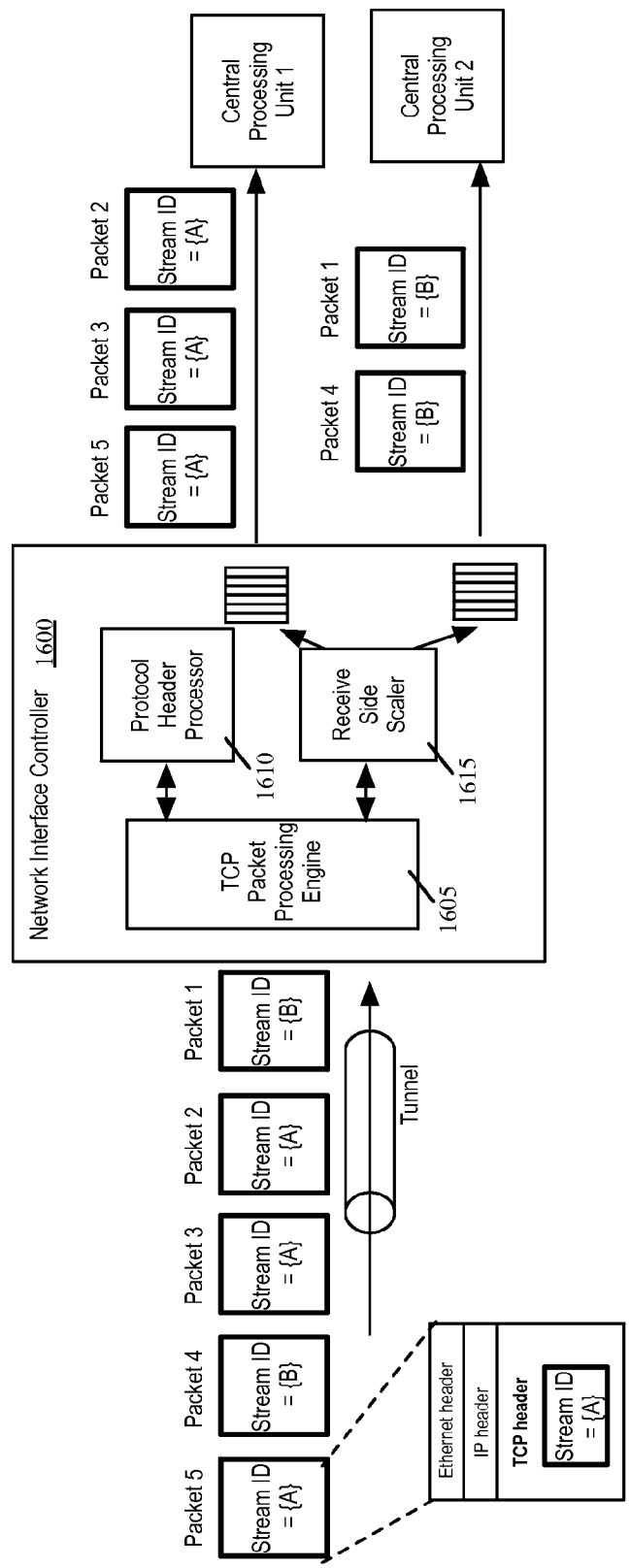
FIG. 16 conceptually illustrates that a NIC of a switch on the receive side of a tunnel performs a receive side scaling (RSS).

FIG. 16 conceptually illustrates that a NIC of a switch on the receive side of a tunnel performs receive side scaling (RSS). Specifically, this figure illustrates that a NIC 1600 receives packets 1-5, groups the packets based on the source identifier values, and assigns the groups to different central processing units (CPUs) of the switch. The NIC 1600 is part of the switch on the receive side. As shown, the NIC 1600 includes a TCP packet processing engine 1605, a protocol header processor 1610, and a receive side scaler 1615.

Receive side scaling is distributing received packets to different processing units so that the packets are processed in parallel. Some NICs are capable of performing receive side scaling. In most cases, it is better to distribute packets that belong to the same stream to the same processing unit. Thus, some NICs generate stream identifiers based on the control information included in the headers of a packet and uses the generated stream identifiers to distribute the packets.

The packets 1-5 come from the transmit side of the tunnel. In some cases, each of the received packets is in the form of Ethernet frame having an Ethernet header, an IP header, and a TCP header. These packets are processed and prepared by the switch on the transmit side. As described above, a switch on the transmit side in some embodiments specifies a stream identifier in the source port field of the TCP header of a packet. Each of the packets includes a value that identifies a stream to which the packet belongs in the source port field of its TCP header. As shown, the packets 1 and 4 have the same stream identifier values and thus belong to the same stream. The packets 2, 3, and 5 have the same stream identifier values and belong to the same stream. However, because the packets are from the same switch, the packets have identical IP headers and identical destination port numbers in their TCP headers.

The NIC 1600 is similar to the NICs 605 and 1300 described above by reference to FIGS. 6 and 13. The TCP packet processing engine 1605 is also similar to the TCP packet processing engine 615 and 1305. The protocol header processor 1610 is also similar to the protocol header processors 630 and 1320. The NIC 1600 receives packets from the tunnel. The TCP packet processing engine 1605 uses the protocol header processor to parse the headers of the received packets. The TCP packet processing engine 1605 uses the receive side scaler 1615 to perform receive side scaling.

The receive side scaler 1615 in some embodiments uses IP addresses and source and destination port numbers to compute values that identify the streams to which the received packets belong. In some embodiments, the receive side scaler 1615 takes a hash of the IP addresses and source destination port numbers to use as the stream identifier. Because the packets 1-5 are coming from the transmit side of the tunnel, the headers in these packets are mostly identical even though the payloads of these packets contain encapsulated packets having different sources and belonging to different streams. Thus, the values stored in the source port fields of the TCP headers in some embodiments help identifying the streams to which the encapsulated packets belong. A stream identifier value that the receive side scaler computes for a packet is different than the stream identifier value specified in the TCP header of that packet because the receive side scaler 1615 uses IP addresses and the destination port number to compute the value. However, the computed value will be still unique to the stream to which the encapsulated packet belongs because the value specified in the source port number is unique to the stream. The receive side scaler assigns the received packets to different CPUs of the switch based on the stream identifiers that the receive side scaler computed.

An example operation of the NIC 1600 will now be described. The NIC receives from the tunnel the packets 1-5. The TCP packet processing engine 1605 parses the headers of the packets 1-5 using the protocol header processor 1610. For each received packet, the receive side scaler 1615 takes a hash of the IP addresses, the source and destination port numbers specified in the IP header, and the TCP header of the packet. The receive side scaler 1615 uses the hash vale as the stream identifier to which the packet belongs. The receive side scaler 1615 then assigns the packet to a CPU. As a result, the packets 1 and 4 are assigned to CPU 2 and the packets 2, 4, and 5 are assigned to CPU 1.

Figure 17:
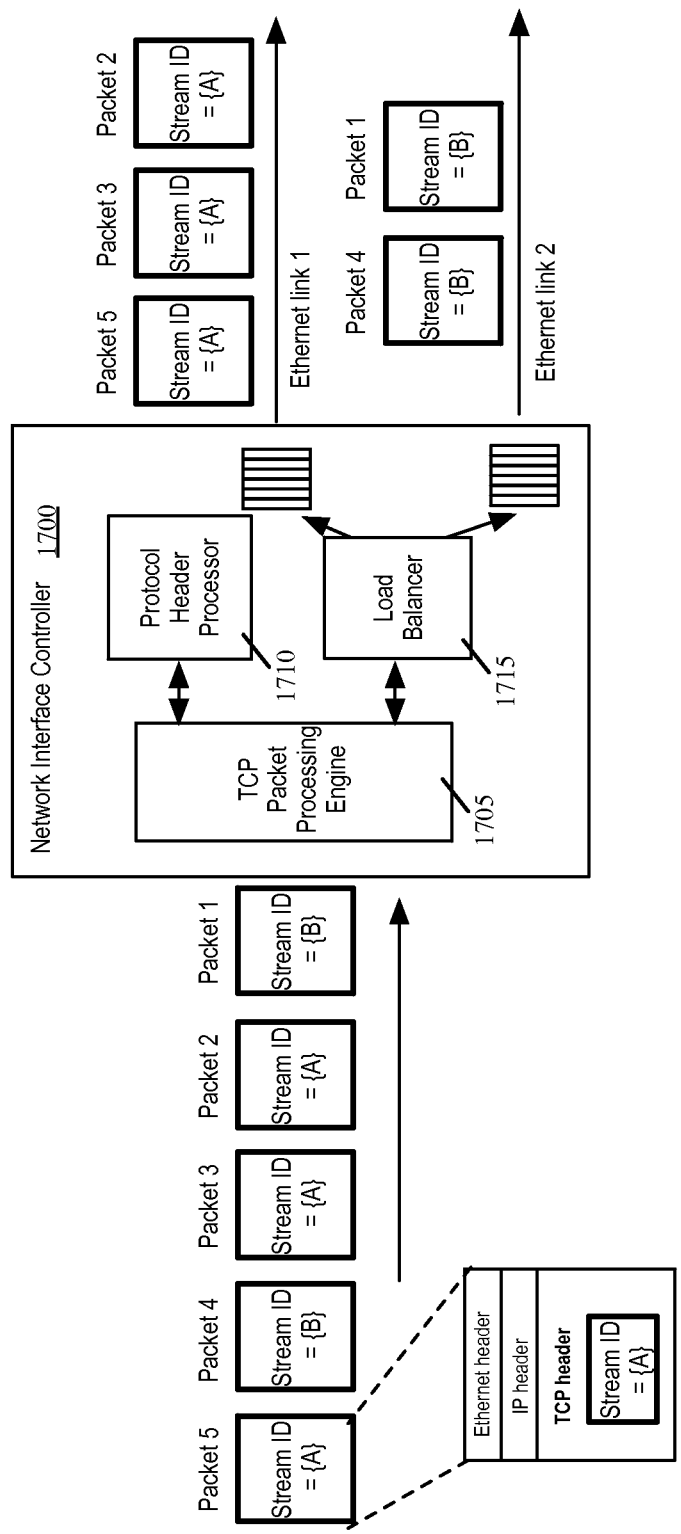
FIG. 17 conceptually illustrates that a switch distributes packets to several links that are aggregated to serve as a single link.

FIG. 17 conceptually illustrates that a switch distributes packets to several links that are aggregated to serve as a single link. Specifically, this figure illustrates that a switch 1700 receives packets 1-5, groups the packets based on the source identifier values, and assigns the groups to different links (e.g., Ethernet links), which the switch aggregated to send out packets. The switch 1700 may be a switch that receives packets from a first switch on the transmit side of a tunnel and sends the packets to a second switch on the receive side of a tunnel. As shown, the switch 1700 includes a TCP packet processing engine 1705, a protocol header processor 1710, and a load balancer 1715.

Link aggregation technique, as known in the art, is use of multiple Ethernet network cables/ports in parallel to increase the link speed beyond the limits of any one single cable or port. The links set up for the cables/ports are conceptually aggregated as a single link that has the bandwidth that is an aggregate of the bandwidths of the individual links. A switch that implements the link aggregation technique receives packets and distributes the packets evenly to the links when sending out the received packets. That is, the switch performs load-balancing for the links the switch uses to send out the packets.

The packets 1-5 come from the network. In some cases, each of the received packets is in the form of Ethernet frame having an Ethernet header, an IP header, and a TCP header. These packets are processed and prepared by the network node (e.g., a switch on the transmit side of a tunnel). As described above, a switch on the transmit side in some embodiments specifies a stream identifier in the source port field of the TCP header of a packet. Each of the packets includes a value that identifies a stream to which the packet belongs in the source port field of its TCP header. As shown, the packets 1 and 4 have the same stream identifier values and thus belong to the same stream. The packets 2, 3, and 5 have the same stream identifier values and belong to the same stream. However, because the packets are from the same switch, the packets have identical IP headers and identical destination port numbers in their TCP headers.

The TCP packet processing engine 1705 is similar to the TCP packet processing engine 615 and 1305 described above by reference to FIGS. 6 and 13. The protocol header processor 1710 is also similar to the protocol header processors 630 and 1320. The NIC 1700 receives packets from the tunnel. The TCP packet processing engine 1705 uses the protocol header processor 1710 to parse the headers of the received packets. The TCP packet processing engine 1705 uses the load balancer 1715 to distribute packets to the links that are established between the switch 1700 and another network node (e.g., a switch on the receive side of a tunnel).

The load balancer 1715 in some embodiments uses IP addresses and source and destination port numbers to compute values that identify the streams to which the received packets belong. In some embodiments, the load balancer 1715 takes a hash of the IP addresses and source destination port numbers to use as the stream identifier. When the packets are coming from a switch on a transmit side of a tunnel, the switch 1700 of some embodiments uses the values stored in the source port fields of the TCP headers as stream identifiers. The load balancer 1715 assigns the received packets to different links based on the stream identifiers.

An example operation of the switch 1700 will now be described. The switch receives from the tunnel the packets 1-5. The TCP packet processing engine 1705 parses the headers of the packets 1-5 using the protocol header processor 1710. For each received packet, the load balancer 1715 takes a hash of the IP addresses and the source and destination port numbers specified in the IP header and the TCP header of the packet. The load balancer 1715 uses the hash vale as the stream identifier to which the packet belongs. The load balancer 1715 then assigns the packet to a link. As a result, the packets 1 and 4 are sent through the Ethernet link 2 and the packets 2, 4, and 5 are sent through the Ethernet link 1.

Figure 18:
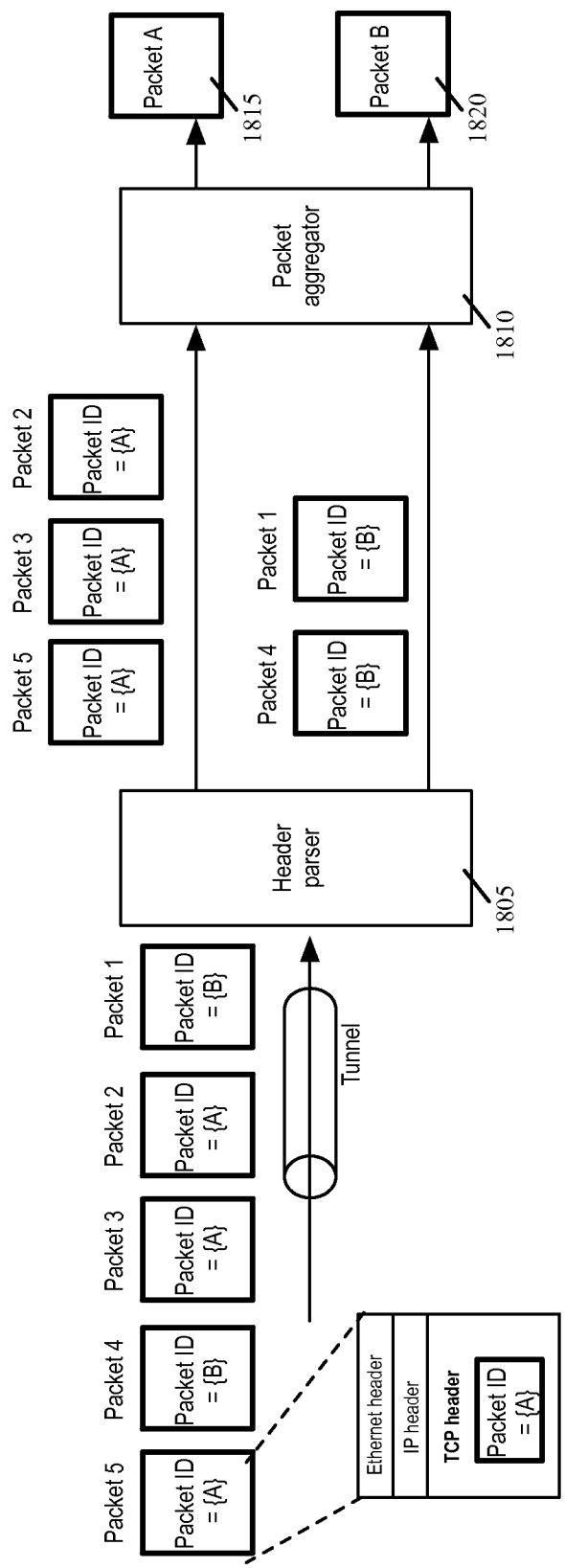
FIG. 18 conceptually illustrates that a switch on a receive side of a tunnel sorts packets the switch receives based on packet identifiers included in the headers of packets.

FIG. 18 conceptually illustrates that a switch on a receive side of a tunnel sorts packets the switch receives based on packet identifiers included in the headers of packets. Specifically, this figure illustrates that a packet aggregator 1810 reassembles two packets 1815 and 1820 from five received packets 1-5.

As described above, a switch on the transmit side of a tunnel segments an original packet into several smaller packets to meet the MTU size of the delivery network in some embodiments. A switch on the receive side of the tunnel reassembles the original packet from the several smaller packets. In some cases, smaller packets that are segmented from different original packets are mixed en route to the switch on the receive side. In order to reassemble the original packets properly, the switch on the receive side need to group the smaller packets based on the original packets from which the smaller packets are segmented. In some embodiments, the switch on the transmit side specifies in the acknowledgment field of the TCP header a packet identifier that identifies the original packet that a smaller packet is segmented from.

The packets 1-5 are segmented from two original packets. A switch (not shown) on the receive side of a tunnel segmented the two original packets into packets 1-5. The switch on the receive side specified packet identifiers in the acknowledgement fields of the TCP headers of the packets 1-5. As shown, the packets 1 and 4 include packet identifier values for original packet B. The packets 2, 3, and 5 include packet identifier values for original packet A.

A header parser 1805 and the packet aggregator 1810 are part of the switch on the receive side of the tunnel. In some embodiments, the header parser 1805 and the packet aggregator 1810 are part of a switch controller of the switch when a NIC of the switch is not capable of reassembling the original packets. In other embodiments, the header parser 1805 and the packet aggregator 1810 are part of the NIC of the switch when the NIC is capable of assembling reassembling the original packets. As such, the header parser 1805 and the packet aggregator 1810 are similar to the protocol header processor 1320 and the packet aggregator 1315, respectively, in some embodiments. The protocol header processor 1320 and the packet aggregator 1315 are described above by reference to FIG. 13. In other embodiments, the header parser 1805 and the packet aggregator 1810 are similar to the header parser 1410 and the packet aggregator 1415, respectively. The header parser 1410 and the packet aggregator 1415 are described above by reference to FIG. 14.

The header parser 1805 parses the TCP headers of the received packets. The header parser 1805 extracts the packet identifier value from each received packet and groups the packets with the same packet identifier values together. The packet aggregator 1810 reassembles an original packet from the packets in the same group.

An example operation of the header parser 1805 and the packet aggregator 1810 will now be described. The switch on the receive side of the tunnel receives the packets 1-5. The header parser 1805 extracts values from the fields of the headers of the received packets. For each received packet, the header parser 1805 uses the packet identifier of the received packet to identify the original packet from which this received packet is segmented. The header parser 1805 groups together packets 1 and 4 because those packets have the same packet identifier values. The header parser 1805 groups together packets 2, 3, and 5 because those packets have the same packet identifier values. The packet aggregator 1810 then combines the packets 1 and 4 into packet B. The packet aggregator 1810 combines the packets 2, 3, and 5 into packet A.

Figure 19:
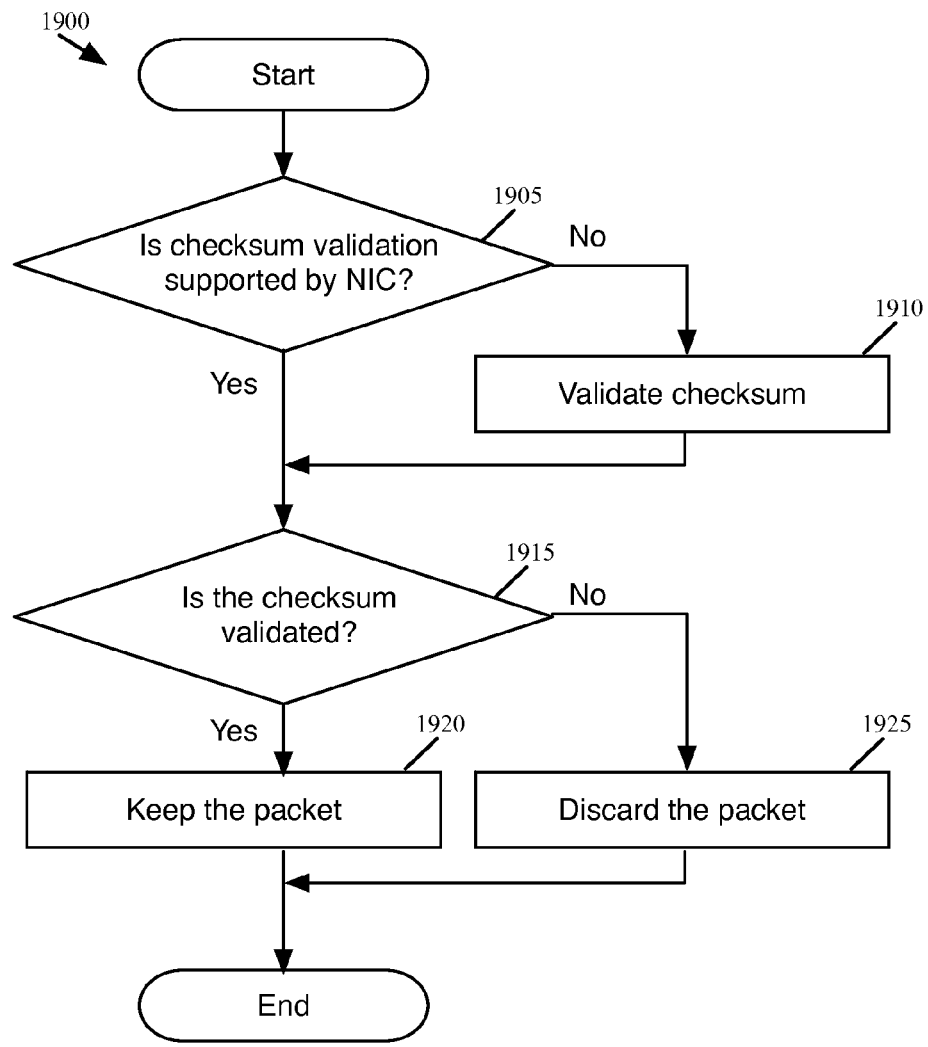
FIG. 19 conceptually illustrates a process 1900 of some embodiments for verifying checksum values.

FIG. 19 conceptually illustrates a process 1900 of some embodiments for verifying checksum values. Process 1900 in some embodiments is performed by a switch controller of a switch on a receive side of a tunnel such as the switch controller 1400 described above by reference to FIG. 14. The switch includes a NIC and the switch controller. In some embodiments, the process starts when the switch controller receives a packet processed by the NIC from the NIC.

The process begins by determining (at 1905) whether the NIC supports checksum validation. That is, the process determines whether the NIC is capable of performing checksum validation task on the packets that the NIC receives. Different embodiments determine the capabilities of the NIC differently. For instance, the process obtains information about the NIC's capabilities from a driver for the NIC in some embodiments. In some such embodiments, the process may inspect flags that indicate whether the checksum values are good or bad or whether the checksum validation was supported by the NIC. The flags are passed up to the process from the driver in these embodiments. The process uses those flags to determine whether the checksum validation was supported.

When the process determines (at 1905) that the NIC supports checksum validation, the process proceeds to 1915, which will be described further below. Otherwise, the process performs checksum validation. The process inspects the headers of a received packet and computes checksum that cover different parts of the packet. Different parts of the packet that the computed checksum covers include the payload of the packet, the IP header of the packet, the TCP or UDP header of the packet, etc.

Next, process 1900 determines (at 1915) whether the checksum is valid. That is, the process determines whether the packet is corrupted or not. When the process determines (at 1915) that the checksum is not valid, the process in some embodiments discards (at 1925) the packet. When the process determines (at 1915) that the checksum is valid, the process keeps (at 1920) the packet for any further processing. Then, the process ends.

III. Examples of Performing Different Combinations of Offloadable Tasks

As described above, a switch controller of a switch offloads those offloadable tasks that a NIC of the switch is capable of performing in some embodiments. The switch controller performs those offloadable tasks that the NIC cannot perform.

The following several figures illustrate several different combinations of offloadable tasks performed by switch controllers and NICs.

Figure 20:
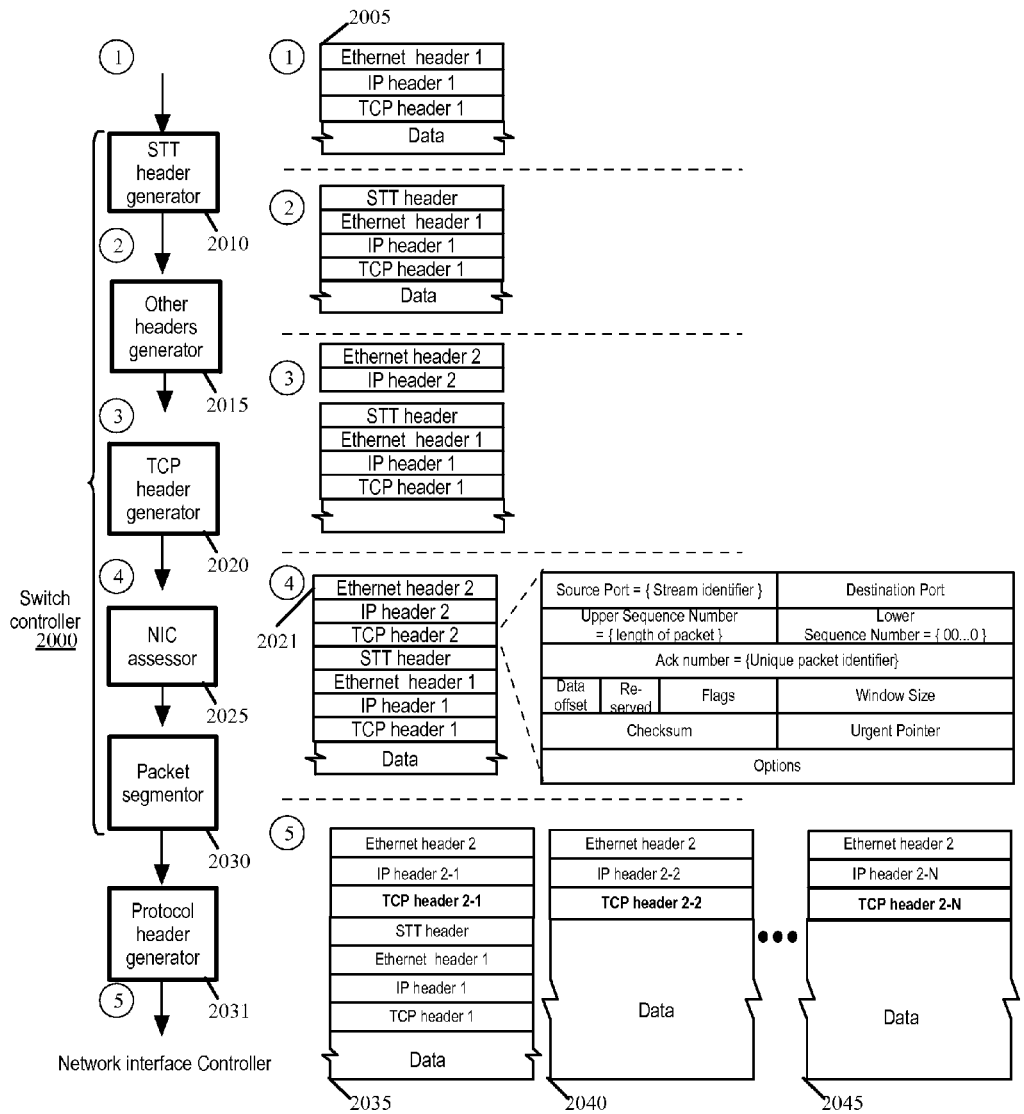
FIG. 20 conceptually illustrates that a switch controller of a switch on the transmit side of a tunnel that prepares headers of different protocols with which to encapsulate a data packet.

FIG. 20 conceptually illustrates that a switch controller of a switch on the transmit side of a tunnel that prepares headers of different protocols with which to encapsulate a data packet. Specifically, this figure illustrates that a switch controller 2000 of a switch performs an offloadable task that a NIC of the switch is not capable of performing. The switch that includes the switch controller 2000 and the NIC is on the transmit side of a tunnel. Thus, the switch controller 2000 and the NIC process a data packet 2005 and transmit the processed result to the tunnel.

The data packet 2005 is similar to the data packet 1040 described above by reference to FIG. 10. The switch controller 2000 is similar to the switch controller 1000 described above by reference to FIG. 10. The switch controller 1000 uses a STT header generator 2010, an other headers generator 2015, and a TCP header generator 2020 to generate headers that will encapsulate a data packet to send through the tunnel. The switch controller 1000 uses a NIC assessor 2025 to identify those offloadable tasks that the NIC of the switch is capable of performing. When switch controller 1000 determines that the NIC of the switch is not capable of performing packet segmentation, the switch controller 1000 uses a packet segmentor 2030 to segment the packet 2005 into smaller chucks of data. The switch controller 1000 uses a packet segmentor 2031 to generate replicate TCP headers to prepend to those smaller chunks of data.

The STT header generator 2010, the other headers generator 2015, and the TCP header generator 2020 are similar to the STT header generator 1005, the other headers generator 1010, and the TCP header generator 1015, respectively, described above by reference to FIG. 10. An STT header, Ethernet header 2, IP header 2, and TCP header 2 that these generators generate are similar to the STT header, the Ethernet header 2, the IP header 2, and the TCP header 2 described above by reference to FIG. 10.

The NIC assessor 2025 determines which of the offloadable tasks that the NIC of the switch is capable of performing. In some embodiments, the NIC assessor obtains information regarding the NIC's capabilities from a driver for the NIC 210 may provide information regarding the NIC's capabilities.

The packet segmentor 2030 breaks payload of a TCP packet with a TCP header that the TCP header generator 2020 generated. The packet segmentor 2030 breaks the payload of the TCP packet into smaller pieces of data so that these pieces of data can be carried over the network with the headers that will be prepended to each of these pieces by the NIC of the switch. The packet segmentor 2030 determines the size of each smaller piece based on the MTU size of the delivery protocol.

The protocol header generator 2031 is similar to the protocol header generator 1225 described above by reference to FIG. 12. The protocol header generator 2031 generates a header to prepend to each of the data pieces that the packet segmentor 2030 generated. In some embodiments, the protocol header generator 2031 replicates the TCP header 2 for each of the data pieces. The replicate TCP headers are TCP headers 2-1 through 2-N. The protocol header generator 2031 also increments the offset value specified in each of the TCP headers 2-1 through 2-N. The offset value for a data piece indicates the location of the data piece from the beginning of the payload of the TCP packet that the packet segmentor 2030 had broken into the data pieces. In other words, the offset value for a data piece indicates the amount of the payload that has been included in the previous data pieces. For instance, when the first data piece includes the first 1460 bytes of the payload of the TCP packet 2021 excluding the headers, the protocol header generator 2031 specifies about 1460 in the TCP header 2-2 for the first data piece. The protocol header generator 2031 specifies zero as offset value in the TCP header 2-1 because the data that the first data piece includes is a beginning portion of the payload of the TCP packet 2021 and the offset value initialized by the TCP header generator 2020 is zero.

The protocol header generator 2031 also generates an Ethernet header and an IP header for each of the data pieces. The protocol header generator 2031 replicates the Ethernet header 2 for each of the data pieces. The protocol header generator 2031 generates a different IP header for each of the data pieces because an IP header includes a length field that specifies the length of the payload. The length of the payload under the IP header, which is the length of the data piece, may be different for each of the data pieces. The lengths of the data pieces may be different because the length of the payload of the TCP packet is not a multiple of the size that the switch controller 2000 had specified as a maximum. The protocol header prepends the replicate headers to each of the data pieces.

An example operation of the switch controller 2000 will now be described. The switch receives the packet 2005 from a source. The switch controller 2000 inspects the headers of the packet 2005 in order to figure out where to send this packet. The switch controller 2000 determines that it needs to send the packet 2005 to a second switch. The switch controller 2000 establishes a tunnel through which to send the packet to the second switch. The switch that includes the switch controller 2000 is thus on the transmit side and the second switch is the switch on the receive side. To send the packet 2005 through the tunnel, the switch controller 2000 starts to prepare headers to encapsulate the received packet 2005. Using the STT header generator, the switch controller 2000 generates the STT header and prepends it to the packet 2005. The switch controller 2000 then uses the other headers generator 2015 to generate the Ethernet header 2 and IP header 2 shown in FIG. 20. The other headers generator 2015 uses the information about the switch and the second switch to generate these two headers. In some embodiments, the other headers generator 2015 retrieves such information from a table (not shown) that the switch controller 2000 maintains.

Next, the switch controller 2000 uses the TCP header generator 2020 to generate the TCP header 2 and to set values for the fields of the TCP header 2. The TCP header generator 2020 generates a checksum value for the IP header 2 in this example. The TCP header generator 2020 uses the values specified in the source and destination IP address fields and the TCP length field of the IP header 2 to generate the checksum value for the IP header 2.

The TCP header generator 2020 generates the size of the packet 2005 and the initial offset value, which is zero. The TCP header generator 2020 specifies the size in the upper 16 bits of the sequence number field of the TCP header 2. The TCP header generator 2020 sets the lower 16 bits of the sequence number field of the TCP header 2 to zero. The TCP header generator 2020 then generates a value that identifies a stream to which the packet 2005 belongs. The TCP header generator 2020 takes a hash of the IP addresses and source and destination port numbers in the TCP header 1. The TCP header generator 2020 specifies the hash value in the source port field of the TCP header 2. The TCP header generator 2020 then uses the packet identifier generator 1035 to generate a packet identifier that uniquely identifies the packet 2005. The TCP header generator 2020 in some embodiments uses the CPU ID of the CPU of the switch on the transmit side and the per-CPU counter value at the moment to generate a value. The TCP header generator 2020 specifies the generated value in the acknowledgement field of the TCP header 2.

The switch controller 2000 uses the NIC assessor 2025 to identify offloadable tasks that the NIC of the switch is not capable of performing. The NIC assessor 2025 obtains capability information of the NIC of the switch from the driver of the NIC. In this example, the obtained information indicates that the NIC is not capable of performing packet segmentation. That is, the NIC of the switch will not generate smaller packets from the packet that the switch controller 2000 will send.

The switch controller 2000 then uses the packet segmentor 2030 to break the payload of the TCP packet encapsulated by the TCP header 2 into smaller pieces of data. The payload includes the STT header, the Ethernet header 1, the IP header 1, the TCP header 1, and the data 2006. The switch controller 2000 sets the maximum size of each data piece as 1500 bytes minus the size of the headers that the NIC will prepend to the piece in this example. The size of the payload of the TCP packet is 64 kilobytes in this example. Accordingly, the packet segmentor 2030 breaks the payload of the TCP packet into five smaller pieces of data.

The protocol header generator 2031 replicates the TCP header 2 and adds a replicate TCP header to each of the data pieces. The protocol header generator 2031 generates IP headers 2-1 through 2-N using the IP header 2 and the lengths of the data pieces. The protocol header generator 2031 prepends the generated IP headers to the data pieces. The protocol header generator 2031 replicates the Ethernet header 2 for each of the data pieces and prepends the replicate Ethernet headers to data pieces. As a result, the data pieces had turned into data packets 2035 through 2045.

Figure 21:
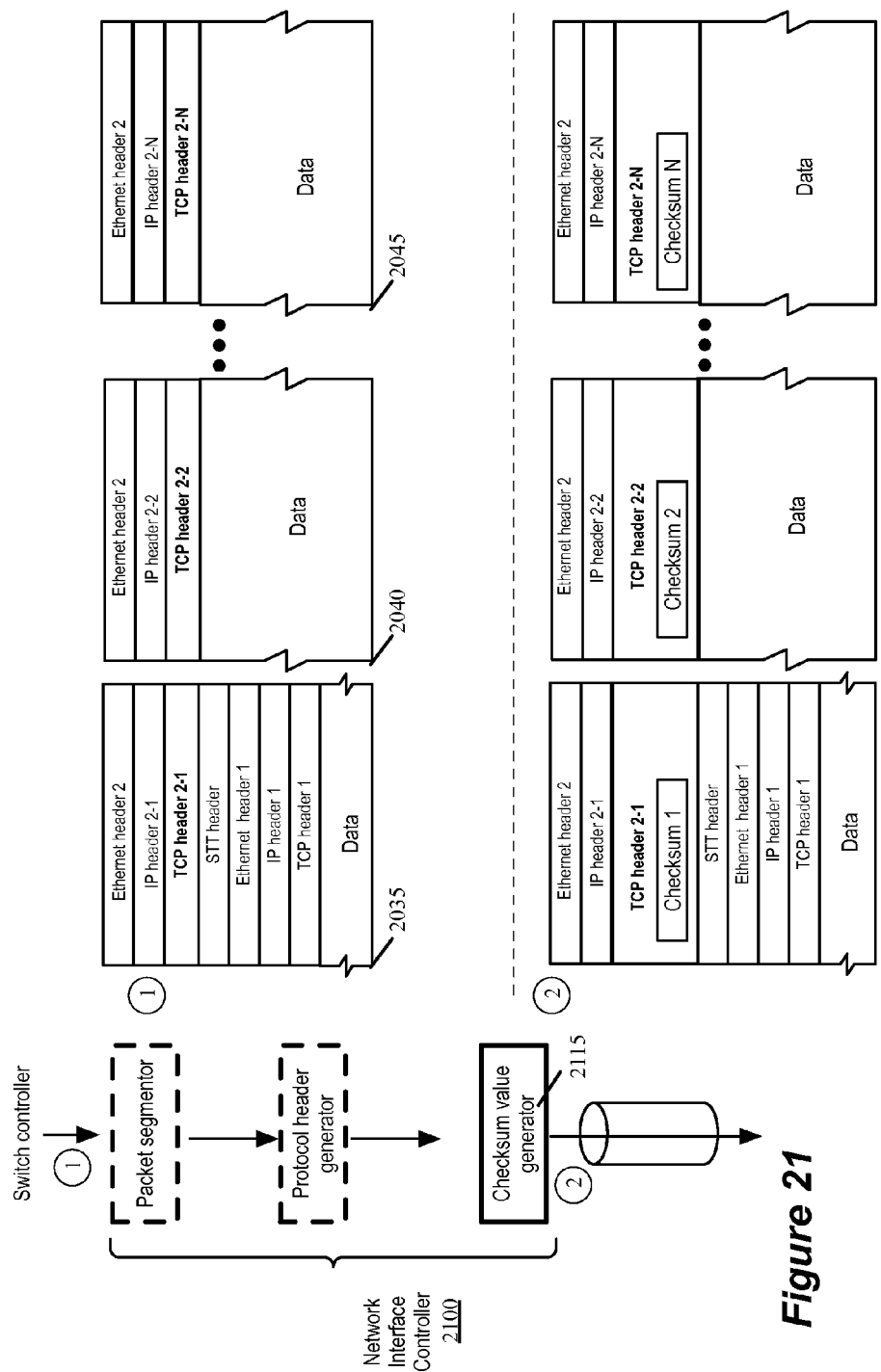
FIG. 21 conceptually illustrates that a NIC of a switch on the transmit side performs offloadable tasks that it is capable of performing.

FIG. 21 conceptually illustrates that a NIC of a switch on the transmit side performs offloadable tasks that it is capable of performing. The NIC performs these tasks in order to process further a data packet that is processed by a switch controller of the switch on the transmit side. Specifically, this figure illustrates that a NIC 2100 computes and places checksums for packets 2035 through 2045. The switch on the transmit side includes the switch controller 2000 and the NIC 2100. The switch controller 2000 and the NIC 2100 together process the packet 2005 to send it to a destination through a tunnel. That is, the switch controller 2000 and the NIC 2100 encapsulate the packet 2005 with appropriate headers such that the delivery network delivers the packet to the destination using the control information included in the encapsulating headers. As shown, the NIC 2100 includes a checksum value generator 2115.

The data packets 2035 through 2045 are data pieces generated by the switch controller 2000 and are sent down to the NIC 2100 from the switch controller 2000 as described above by reference to FIG. 20. The NIC 2100 uses the checksum value generator 2115 to perform the offloadable tasks that are offloaded to the NIC by the switch controller 2000. As discussed above, different NICs have different sets of offloadable tasks that the NICs can perform. The NIC 2100 does not perform packet segmentation because it is not capable of performing packet segmentation.

The NIC 2100 uses the checksum value generator 2115 to generate a checksum value for each of the data packets 2035 through 2045. These checksum values are for validating the fidelity of the payloads that these packets carry. The checksum values may also be used to check the fidelity of the replicate TCP headers. As shown, the replicate TCP headers 2-1 through 2-N have their own checksum values, checksum 1 through N.

An example operation of the switch on the transmit side will now be described. The NIC 2100 receives the data packets 2035 through 2045 processed by the switch controller 2000 through a bus. The checksum value generator 2115 generates a checksum value for each of the data packets 2035 through 2045. The NIC 2100 sends the packets 2035 through 2045. That is, the NIC 2100 sends the packets using the information specified in the headers encapsulating the data packets 2035 through 2045 without using the information specified in the Ethernet header 1, the IP header 1, and the TCP header 1.

Figure 22:
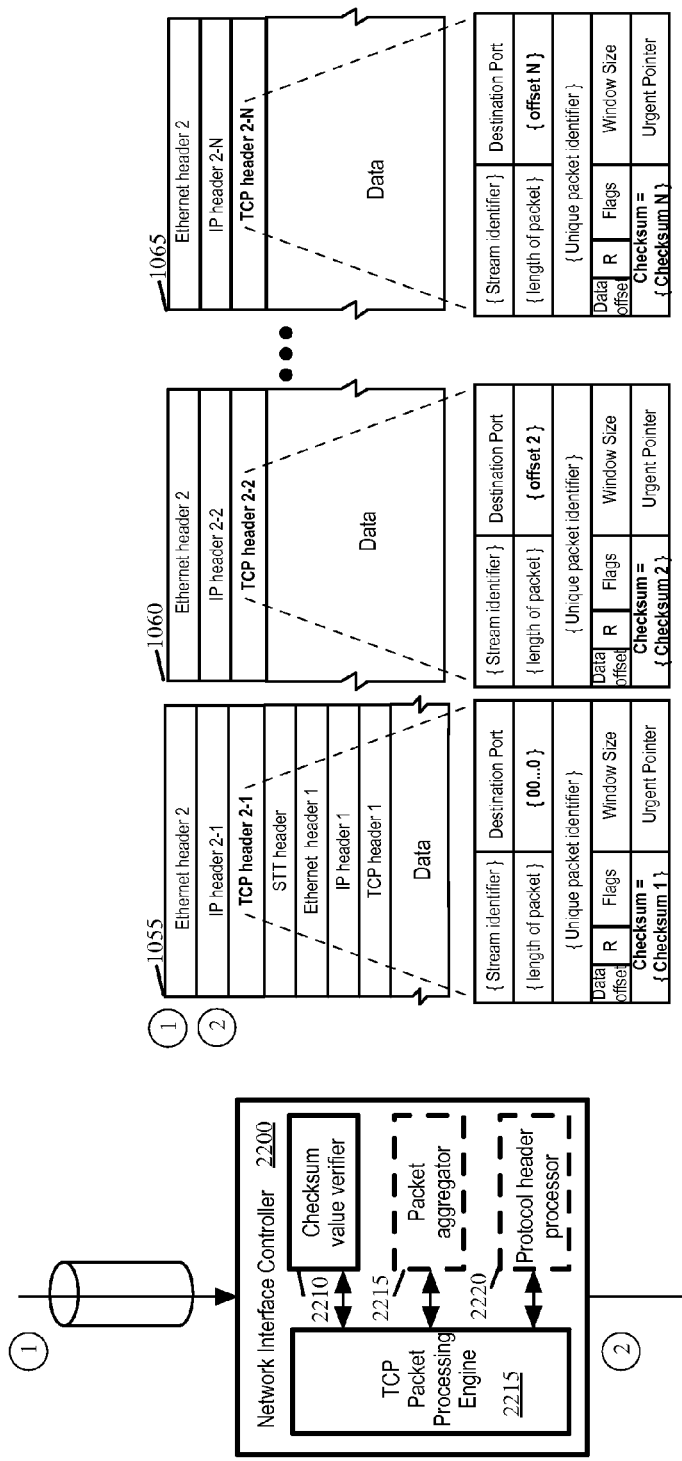
FIG. 22 conceptually illustrates that a NIC of a switch on the receive side of a tunnel does not perform those offloadable tasks that it is not capable of performing.

FIG. 22 conceptually illustrates that a NIC of a switch on the receive side of a tunnel does not perform those offloadable tasks that the NIC is not capable of performing. This figure illustrates that a NIC 2200 of a switch on the receive side only performs checksum validation on the packets 1055 through 1065 that the NIC 2200 receives. The packets 1055 through 1065 are the outcome of the processing performed by the switch controller 1000 and the NIC 1200 on the transmit side of the tunnel as described above by reference to FIGS. 10 and 12.

As shown, the NIC 2200 in some embodiments includes a TCP packet processing engine 2215 and a checksum value verifier 2210. A packet aggregator 2215 and a protocol header processor 2220 are depicted as dotted boxes in this figure to indicate that the NIC 2200 is not capable of performing packet aggregation. The TCP packet processing engine 2205 uses the checksum value verifier 2210 to perform checksum value verification. The checksum value verifier 2210 reads the data in each received packet and computes a checksum value using the same rule that the checksum value generator 1215 of the NIC 1200 on the transmit side used to generate a checksum value. The checksum value verifier 2210 then compares the value it generated with the value specified in the TCP header (i.e., the TCP header 2-1, 2-2, or 2-N) of the received packet. If the values match, then the fidelity of the data in the packet is validated. Otherwise, the data of the packet is deemed corrupted and will be discarded in some embodiments. The checksum value verifier 2210 also verifies the checksum values for the validity of the IP headers 2-1 through 2-N. When the checksum value verifier 2210 determines that any of the IP headers are corrupted, it will also discard the packet containing the corrupted headers.

An example operation of the NIC 2200 will now be described. The NIC 2200 receives the packets 1055 through 1065 as well as other packets (not shown). The TCP packet processing engine 2205 uses the checksum value verifier 2210 to perform checksum value verification. The checksum value verifier 2330 validates the fidelity of the data in each of the received packets. In this example, none of the received packets 1055 through 1065 are corrupted and the checksum values computed by the checksum value verifier 2310 are identical to the checksum values specified in the TCP headers 2-1 through 2-N. The NIC 2200 sends through a bus the resulting TCP packets 1055 through 1065 to the switch controller of the switch on the receive side.

Figure 23:
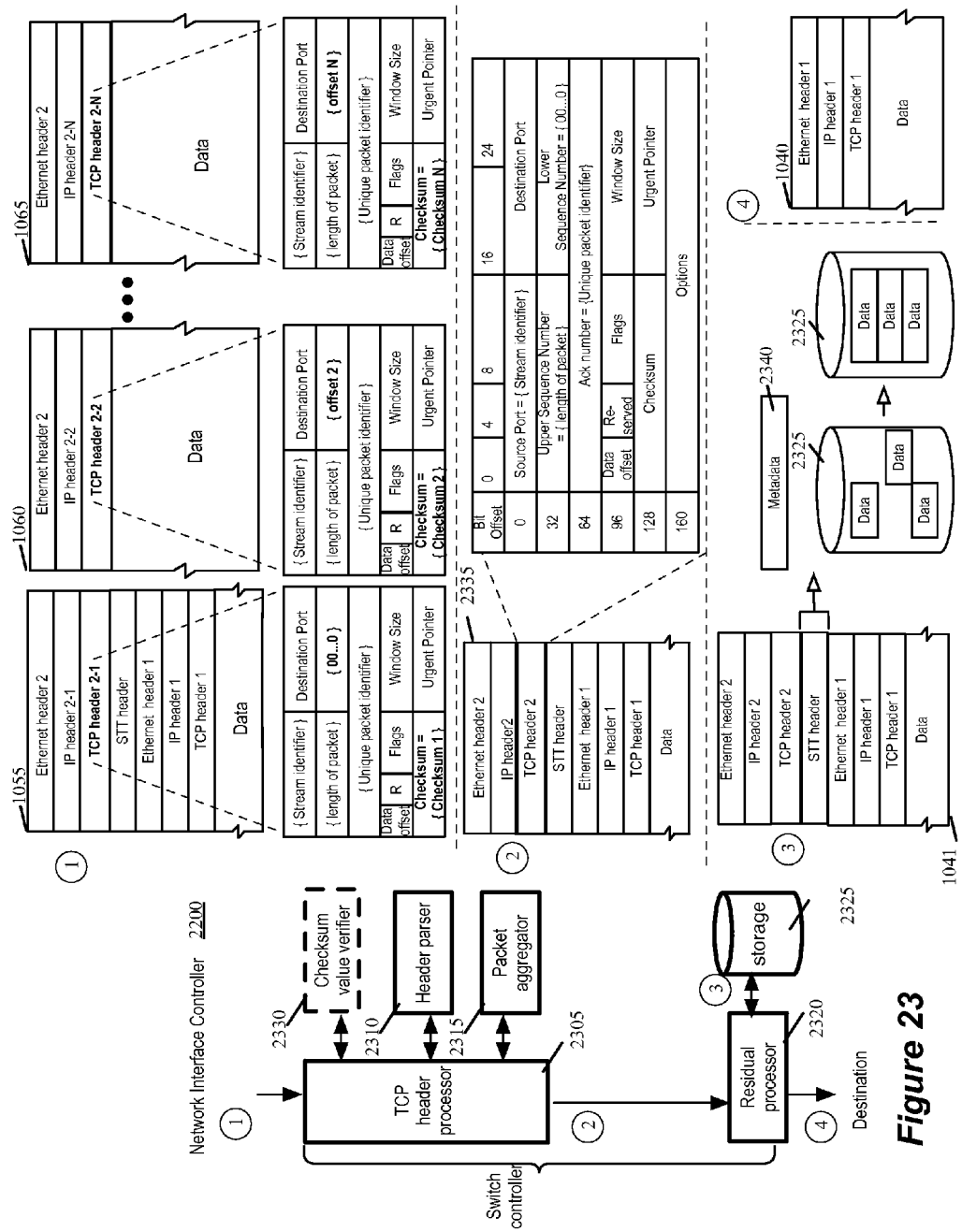
FIG. 23 conceptually illustrates a switch controller of a switch on the receive side of a tunnel that receives packets processed by a NIC of the switch and processes the packets further.

FIG. 23 conceptually illustrates a switch controller of a switch on the receive side of a tunnel that receives packets processed by a NIC of the switch and processes the packets further. Specifically, this figure illustrates that a switch controller 2300 of a switch on the receive side of a tunnel processes the packets 1055 through 1065 that the switch controller receives from the NIC 2200 described above by reference to FIG. 22. This figure illustrates that the switch controller 2300 in some embodiments includes a TCP header processor 2305, a header parser 2310, a packet aggregator 2315, and a residual processor 2320.

The switch controller 2300 takes the outcome of the processing performed by the NIC 2200 and further processes the outcome in order to restore the encapsulated packet. The switch controller 2300 determines the tasks left to perform in order to restore the encapsulated packet. In some embodiments, the switch controller 2300 inspects the outcome to make the determination. For instance, the switch controller 2300 measures the size of a packet that the switch controller receives from the NIC 2200. When the measured size is less than the size specified in the encapsulating TCP header (i.e., TCP header 2-1, 2-2, or 2-N) of the packet, the switch controller 2300 determines that the packet has not been aggregated into the larger original packet. In some embodiments, the switch controller 2300 obtains information about the capabilities of the NIC 2200 from the driver of the NIC 2200.

The TCP header processor 2305 uses the header parser 2310 to parse the TCP headers 2-1 through 2-N of the packets 1055 through 1065. The header parser 2310 reads and extracts the values specified in the fields of the TCP headers 2-1 through 2-N. The header parser 2310 extracts the stream identifier values from the source port fields of the TCP headers. The header parser 2310 extracts the length of the original Ethernet frame that is encapsulated by the TCP headers 2-1 through 2-N from the upper 16 bits of the sequence number fields of the TCP headers. The header parser 2310 extracts the unique identifiers that identify the packets from the acknowledgement fields of the TCP headers. In some embodiments, the header parser 2310 does not extract values specified in the fields that will not be needed for processing the packets 1055 through 1065 further. For instance, the header parser 2310 will not extract the window size values specified in the window size fields of the TCP headers 2-1 through 2-N. In other embodiments, the header parser extracts all values in the all fields of the TCP headers but the switch controller 2300 will ignore those values that are unnecessary in processing the packets 1055 through 1065.

The packet aggregator 2315 aggregates the received packets 1055 through 1065 to reassemble the original Ethernet frame when the reassembling has not been done. That is, the packet aggregator 2315 does the opposite of what the packet segmentor 1220 does as described above by reference to FIG. 12. In this aspect, the packet aggregator 2315 functions similarly as the packet aggregator 1315 described above by reference to FIG. 13, which does the opposite of what the packet segmentor 1220 does.

The residual processor 2320 is similar to the residual processor 1420 described above by reference to FIG. 14. The residual processor 2320 performs several tasks that need to be performed to finalize the processing of the packets. For instance, the residual processor 2320 removes the encapsulating headers (e.g., Ethernet header 2, IP header 2, TCP header 2) from the reassembled packet and discards those headers.

In addition, the residual processor 2320 in some embodiments maps the STT header of the reassembled packet into metadata 2340. The STT header is in a format that is independent from the operating system on which the switch controller is executing. The metadata is in a format that is suitable for the operating system on which the switch controller is executing. By mapping the header to the metadata, the residual processor 2320 converts the format of data. Examples of such conversion include byte swapping and correctly setting offsets of packet headers. The residual processor 2320 uses the information specified in the STT header when mapping the STT header to the metadata.

The residual processor 2320 in some embodiments checks the second bit of the flags field of the STT header. When the second bit indicates that the checksum value for the data of the encapsulated packet (i.e., the reassembled packet) was computed, the residual processor 2320 checks the first bit of the flags field to determine whether the checksum in the reassembled packet (i.e., the checksum in the TCP header 1) is verified to be correct or not.

The residual processor 2320 in some embodiments combines individual pieces data that comprises data 1041 for the reassembled packet into a single data abstraction. This single data abstraction is used when the data for the reassembled packet is needed. As shown, in some cases, the data for the reassembled packet is scattered across memory (e.g., storage 2325) because the data was in many smaller packets that were reassembled to form one. Different embodiments use different methods to combine the data pieces into a single data abstraction. For instance, some embodiments store a list of pointers to the data pieces along with the lengths of each data piece. When the data for the reassembled packet is needed, these embodiments access the data using the pointers and the lengths. Instead of, or in conjunction with, using the pointers and lengths, the residual processor 2320 in some embodiments copies the data pieces into a single buffer. The single buffer containing data pieces serves as a single data abstraction in these embodiments. Yet in other embodiments, the residual processor 2320 converts the data pieces into individual packets. This involves copying the headers (i.e., Ethernet/IP/TCP) from the beginning of the reassembled packet onto each of the individual packets and modifying those headers so that the lengths, sequence numbers, checksums, etc. are correct. In these embodiments, the residual processor 2320 creates the individual packets without a list of pointers to the data pieces and without copying the data.

An example operation of the switch controller 2300 will now be described. The switch controller 2300 receives the packets 2220 through 2230 from the NIC 2200. The switch controller 2300 determines that some of the offloadable tasks are not performed by the NIC 2200 by inspecting the received packets.

Then, the TCP header processor 2305 parses the TCP headers 2-1 through 2-N using the header parser 2310. Then, the packet aggregator 2315 aggregates the packets 1055 through 1065 into a single packet 2335 using the offsets 1 through N and other information included in the TCP headers that are parsed by the protocol header processor 2310. The residual processor 2320 then maps some of the information specified in the STT header of the packet 2335 to the metadata 2340. In addition, the residual processor 2320 creates a single data abstraction from the data pieces that comprise the data part of the reassembled packet. In this example, the residual processor 2320 copies the data pieces into a single buffer. Also, the residual processor removes the removes Ethernet header 2, IP header 2, TCP header 2, and the STT header from the reassembled packet 2335 and discards those headers. The switch controller 2300 then sends the restored packet 1040 to the destination using the control information specified in the headers of the packet 1040.

IV. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 24:
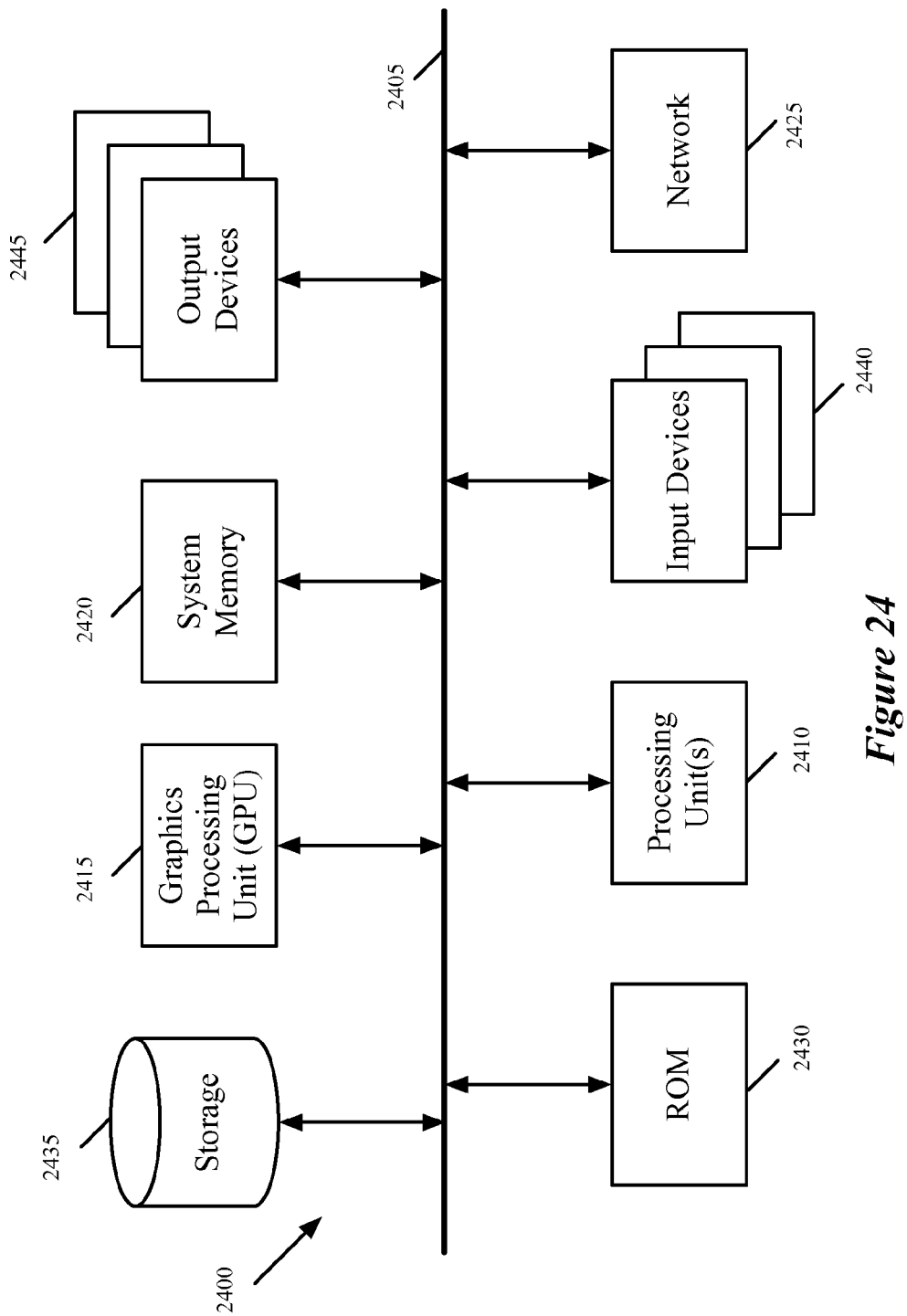
FIG. 24 illustrates an electronic system with which some embodiments of the invention are implemented.

FIG. 24 conceptually illustrates an electronic system 2400 with which some embodiments of the invention are implemented. The electronic system 2400 may be a computer (e.g., a desktop computer, personal computer, tablet computer, etc.), phone, PDA, or any other sort of electronic device. Such an electronic system includes various types of computer readable media and interfaces for various other types of computer readable media. Electronic system 2400 includes a bus 2405, processing unit(s) 2410, a graphics processing unit (GPU) 2415, a system memory 2420, a network 2425, a read-only memory 2430, a permanent storage device 2435, input devices 2440, and output devices 2445.

The bus 2405 collectively represents all system, peripheral, and chipset buses that communicatively connect the numerous internal devices of the electronic system 2400. For instance, the bus 2405 communicatively connects the processing unit(s) 2410 with the read-only memory 2430, the GPU 2415, the system memory 2420, and the permanent storage device 2435.

From these various memory units, the processing unit(s) 2410 retrieves instructions to execute and data to process in order to execute the processes of the invention. The processing unit(s) may be a single processor or a multi-core processor in different embodiments. Some instructions are passed to and executed by the GPU 2415. The GPU 2415 can offload various computations or complement the image processing provided by the processing unit(s) 2410. In some embodiments, such functionality can be provided using CoreImage's kernel shading language.

The read-only-memory (ROM) 2430 stores static data and instructions that are needed by the processing unit(s) 2410 and other modules of the electronic system. The permanent storage device 2435, on the other hand, is a read-and-write memory device. This device is a non-volatile memory unit that stores instructions and data even when the electronic system 2400 is off. Some embodiments of the invention use a mass-storage device (such as a magnetic or optical disk and its corresponding disk drive) as the permanent storage device 2435.

Other embodiments use a removable storage device (such as a floppy disk, flash memory device, etc., and its corresponding disk drive) as the permanent storage device. Like the permanent storage device 2435, the system memory 2420 is a read-and-write memory device. However, unlike storage device 2435, the system memory 2420 is a volatile read-and-write memory, such as random access memory. The system memory 2420 stores some of the instructions and data that the processor needs at runtime. In some embodiments, the invention's processes are stored in the system memory 2420, the permanent storage device 2435, and/or the read-only memory 2430. For example, the various memory units include instructions for processing multimedia clips in accordance with some embodiments. From these various memory units, the processing unit(s) 2410 retrieves instructions to execute and data to process in order to execute the processes of some embodiments.

The bus 2405 also connects to the input and output devices 2440 and 2445. The input devices 2440 enable the user to communicate information and select commands to the electronic system. The input devices 2440 include alphanumeric keyboards and pointing devices (also called "cursor control devices"), cameras (e.g., webcams), microphones or similar devices for receiving voice commands, etc. The output devices 2445 display images generated by the electronic system or otherwise output data. The output devices 2445 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 24, bus 2405 also couples electronic system 2400 to a network 2425 through a network adapter (not shown). In this manner, the computer can be a part of a network of computers (such as a local area network ("LAN"), a wide area network ("WAN"), or an Intranet, or a network of networks, such as the Internet. Any or all components of electronic system 2400 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 5, 8, 11, and 19) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. At a first device comprising a network interface controller (NIC), a method of processing data packets from the first device to a second device that connects to the first device through a tunnel that is established through a network coupled to said first device, said method comprising:
   receiving a first data packet that is to be transmitted through the tunnel and that is in a first data packet format that comprises a first packet header associated with the tunnel; and
   encapsulating the first data packet with a second packet header of a second packet format in order to offload the segmentation of the first data packet to the NIC, wherein the NIC receives the first data packet in the second packet format, segments the first data packet into one or more packet segments as the NIC is configured to segment data packets in the second packet format into one or more segments, and transmits each segment through the network to another device.

2. The method of claim 1, wherein the encapsulating comprises specifying the second packet header based on a transport layer protocol, and wherein at least one header field in the second packet header is used differently than as defined by the transport layer protocol.

3. The method of claim 2, wherein the transport layer protocol is Transmission Control Protocol (TCP).

4. The method of claim 3, wherein the TCP acknowledgement field is re-purposed to specify a packet identifier rather than an acknowledgment number.

5. The method of claim 1 further comprising generating the second header of the second packet format using information included in the first data packet, wherein the information included in the first packet includes at least one of a source Internet Protocol (IP) address, a destination IP address, a source port number, and a destination port number.

6. The method of claim 3, wherein the TCP sequence number field is re-purposed to identify at least one of a length of the first packet and an offset value of the first packet.

7. The method of claim 1, wherein encapsulating comprises specifying a maximum size of the packet segments into which the NIC is to segment the first data packet.

8. The method of claim 1, wherein the NIC computes a checksum value for each of the packet segments.

9. The method of claim 8 further comprising sending the encapsulated data packet to the NIC without computing the checksum value for the encapsulated data packet.

10. A non-transitory machine readable medium storing a program for processing data packets from a first device comprising a network interface card (NIC) to a second device that connects to the first device through a tunnel that is established through a network coupled to the first device, the program comprising sets of instructions for:
receiving a first data packet that is to be transmitted through the tunnel and that is in a first data packet format that comprises a first packet header associated with the tunnel; and
encapsulating the first data packet with a second packet header of a second packet format in order to offload the segmentation of the first data packet to the NIC, wherein the NIC receives the first data packet in the second packet format, segments the first data packet into one or more packet segments as the NIC is configured to segment data packets in the second packet format into one or more segments, and transmits each segment through the network to another device.

11. The non-transitory machine readable medium of claim 10, wherein the NIC is configured to perform a first set of processing tasks, including the segmentation, on the first data packet in the second packet format in order to accelerate the processing of data packets by the first device, the program further comprising sets of instructions for:
identifying a second set of processing tasks that the NIC is not capable of performing; and
performing the identified second set of processing tasks on the first data packet.

12. The non-transitory machine readable medium of claim 11, wherein the first and second sets of processing tasks comprise computing a checksum value for the first data packet, sending a set of references to packet segments of the first data packet, and inserting a virtual local area network (VLAN) tag into the first data packet.

13. The non-transitory machine readable medium of claim 10, wherein the second device does not request for re-transmission of missing or corrupted packet segments.

14. The non-transitory machine readable medium of claim 10, wherein the second device restores the first data packet and sends the restored first data packet to a destination machine by using information included in the first data packet.

15. The non-transitory machine readable medium of claim 14, wherein the first and second devices are both configured by at least one network controller associated with the network.

16. The non-transitory machine readable medium of claim 14, wherein the program further comprises a set of instructions for generating the second header of the second packet format using information included in the first data packet.

17. The non-transitory machine readable medium of claim 16, wherein the set of instructions for encapsulating the first data packet comprises a set of instructions for specifying, in the second header, an identifier of a data stream to which each segment of the first data packet belongs.

18. The non-transitory machine readable medium of claim 16, wherein the set of instructions for encapsulating the first data packet comprises a set of instructions for specifying, in a field of the second header, a length of data encapsulated by the second header.

19. The non-transitory machine readable medium of claim 16, wherein the set of instructions for encapsulating the first data packet comprises a set of instructions for specifying in the second header an offset value for each segment of the first packet.

20. The non-transitory machine readable medium of claim 16, wherein the set of instructions for encapsulating the first data packet comprises a set of instructions for specifying in the second header an identifier that uniquely identifies the first data packet.

21. A computing device comprising:
a network interface controller (NIC):
at least one processing unit;
a storage storing a program for execution by the at least one processing unit, said program comprising (i) a first module for receiving a first data packet that is to be transmitted through a tunnel to a second device and that is in a first data packet format that comprises a first packet header associated with the tunnel; and (ii) a second module for encapsulating the first data packet with a second packet header of a second packet format in order to offload the segmentation of the first data packet to the NIC,
wherein the NIC receives the first data packet in the second packet format, segments the data packet into one or more packet segments as the NIC is configured to segment data packets in the second packet format into one or more segments, and transmits each segment through the network to the second device.

22. The computing device of claim 21 further comprising a third module for identifying whether the NIC is specifically configured to process data packets of the first packet format for accelerated processing.

23. The computing device of claim 21, wherein the program further comprises a third module for generating the header of the second packet format using information included in the first data packet, the header comprising a set of headers that includes a particular header that is specified based on a Transmission Control Protocol (TCP) header.

24. The computing device of claim 21, wherein each packet segment is sent to the second device through the tunnel, wherein the second device uses the second header in a way that is different than a standardized way of using a TCP header.

25. The computing device of claim 21, wherein a second data packet received at the computing device is stored in the computing device as a plurality of packet segments, wherein to accelerate packet processing, the NIC is configured to piece together the plurality of packet segments into the second data packet.

26. The computing device of claim 21, wherein to accelerate packet processing, the NIC is configured to insert a virtual local area network (VLAN) tag in the first data packet, wherein the second module is further for sending a VLAN tag to the NIC in order for the NIC to insert the VLAN tag sent to the NIC into the first data packet.

\* \* \* \* \*